United States Patent [19]

Azuma et al.

[11] Patent Number: 4,937,601
[45] Date of Patent: Jun. 26, 1990

[54] WINDING AND REWINDING APPARATUS

[75] Inventors: Yoshihiko Azuma; Takehiro Katoh; Yasuteru Yamano; Masayasu Hirano; Hiroshi Ootsuka; Takeshi Egawa; Masaaki Nakai; Toshihiko Ishimura; Naohiro Kageyama, all of Osaka, Japan

[73] Assignee: Minolta Camera Kabushiki Kaisha, Osaka, Japan

[21] Appl. No.: 337,637

[22] Filed: Apr. 13, 1989

[30] Foreign Application Priority Data

| Apr. 15, 1988 [JP] | Japan | 63-94365 |
| Apr. 15, 1988 [JP] | Japan | 63-94366 |
| Apr. 16, 1988 [JP] | Japan | 63-93653 |
| Apr. 16, 1988 [JP] | Japan | 63-93654 |

[51] Int. Cl.$^5$ .............................................. G03B 1/12
[52] U.S. Cl. ................................................. 354/173.1
[58] Field of Search ................ 354/173.1, 173.11, 214, 354/217

[56] References Cited

U.S. PATENT DOCUMENTS

| 4,324,469 | 4/1982 | Harney | 354/214 |
| 4,679,926 | 7/1987 | Suzuki et al. | 354/217 X |
| 4,728,975 | 3/1988 | Ohara et al. | 354/173.1 |

Primary Examiner—Michael L. Gellner
Attorney, Agent, or Firm—Burns, Doane, Swecker & Mathis

[57] ABSTRACT

A winding and rewinding apparatus for a camera comprises a winding mechanism, a detector, a rewinding mechanism, a selector and a controller. The winding mechanism winds the film frame by frame, and the detector detects the completion of exposure of the roll of film which is wound by the winding mechanism. The rewinding mechanism rewinds the film automatically in response to the detection of the detecting means. The selector includes a selecting switch which is operable manually, for selecting in response to the operation of the selecting switch one of a first mode in which the operation of the rewinding mechanism is permitted and a second mode in which the operation of the rewinding mechanism is inhibited irrespective of the detection of the detector. The controller controls the rewinding mechanism in accordance with the mode selected by the selecting switch. According to such arrangement, the user can select a manual rewinding mode or an automatic rewinding mode by a simple operation.

10 Claims, 48 Drawing Sheets

Fig. 14(b)
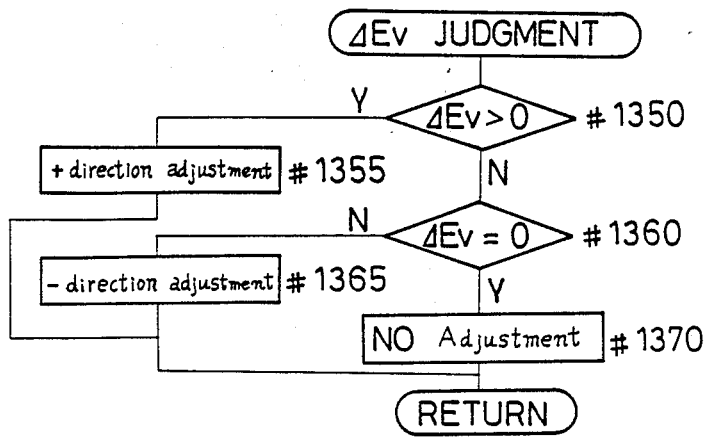
Fig. 15
Fig. 16
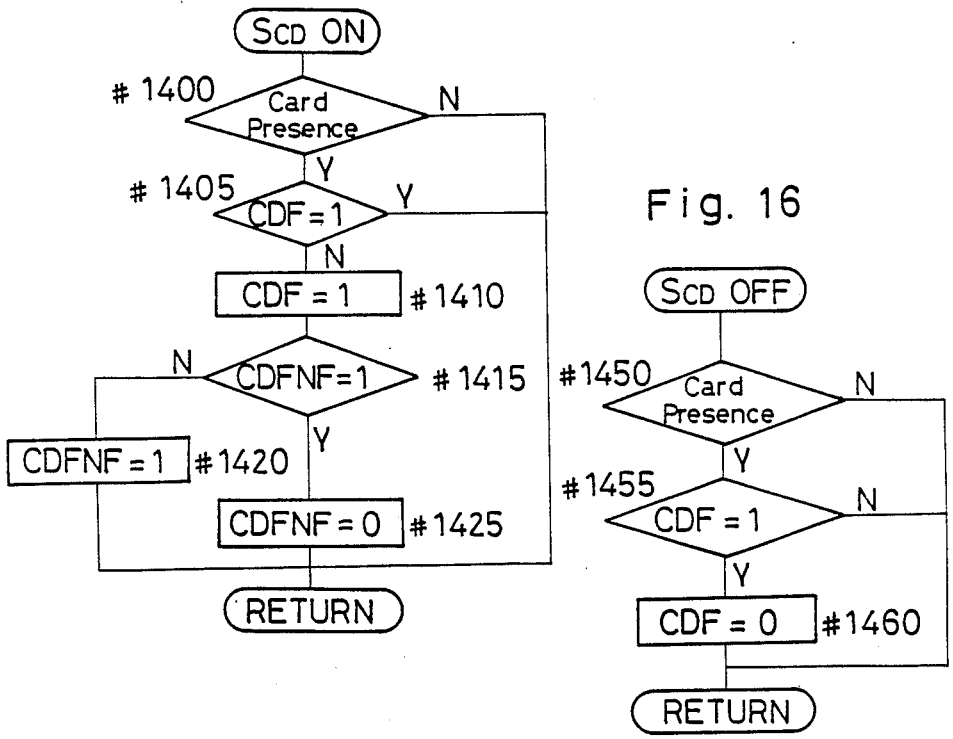

WINDING AND REWINDING APPARATUS

BACKGROUND OF THE INVENTION

1. Field of the Invention

The present invention relates to an apparatus for a camera to automatically wind and rewind a film to a film cassette in the camera.

2. Description of the Prior Art

U.S. Pat. No. 4,679,926 discloses such an apparatus in which the motored rewinding of the film is started by a switch operation of the camera user.

Another apparatus is disclosed in U.S. Pat. No. 4,324,469 in which the film is wound frame by frame by a motor, and, when a preset number of frames have been wound up, the rewinding starts automatically. The film rewinding stops when the whole film is wound into the film cassette or patrone (full rewinding), or leaving a small amount of the leading end of the film out of the patrone (tag rewinding). The user can select one of the two rewinding modes, that is, full rewinding or tag rewinding, by a manual switch.

Further, U.S. Pat. No. 4,728,975 teaches an apparatus including both the manual rewinding start mechanism as disclosed U.S. Pat. No. 4,678,926 and the automatic rewinding mechanism as disclosed in U.S. Pat. No. 4,324,469. Either the manual or automatic rewinding mechanism is selected according to data stored in an Electrically Erasable Programmable Read Only Memory (EEPROM or E²PROM) provided in the camera. The data is previously written in the E²PROM using an external device.

SUMMARY OF THE INVENTION

An object of the present invention is to provide an apparatus in which a camera user can select either rewinding mode without using such an external device. That is, the user can select a manual rewinding mode or an automatic rewinding mode by a very simple operation.

Another object of the present invention is to further allow the user to select either of the full rewinding mode and the tag rewinding mode. This selection is also made without an exterval device.

These and other objects are achieved by an apparatus for winding and rewinding a casette loaded film of a camera including the following elements, means for winding the film frame by frame;

means for detecting the completion of exposure of the roll of film which is wound by the winding means;

means for rewinding the film automatically in response to the detection of the detecting means;

first selecting means, including a first selecting member which is operable manually, for selecting in response to the operation of the first selecting member one of a first mode in which the operation of the rewinding means is permitted and a second mode in which the operation of the rewinding means is inhibited irrespective of the detection of the detecting means; and means for controlling the rewinding means in accordance with the mode selected by the first selecting means.

BRIEF DESCRIPTION OF THE DRAWINGS

These and other objects and features of the present invention will become apparent from the following description taken in conjunction with preferred embodiment thereof with reference to the accompanying drawings, throughout which like parts are designated by like reference numerals, and in which:

FIG. 6 is a flowchart showing a routine performing photometry, AF, display, exposure control and the like.

FIG. 13, FIG. 14(a), FIG. 14(b), FIG. 15, FIG. 16, FIG. 17 and FIG. 18 are flowcharts showing specific setting routines relating to various keys.

DETAILED DESCRIPTION OF THE PREFERRED EMBODIMENT

Hereinafter, description is made on an embodiment constructed in accordance with the present invention in reference to drawings. In the following description, chiefly the whole system of controlling a camera by means of IC cards is described. A winding and rewinding apparatus for a film is also described therein.

Figure 1:
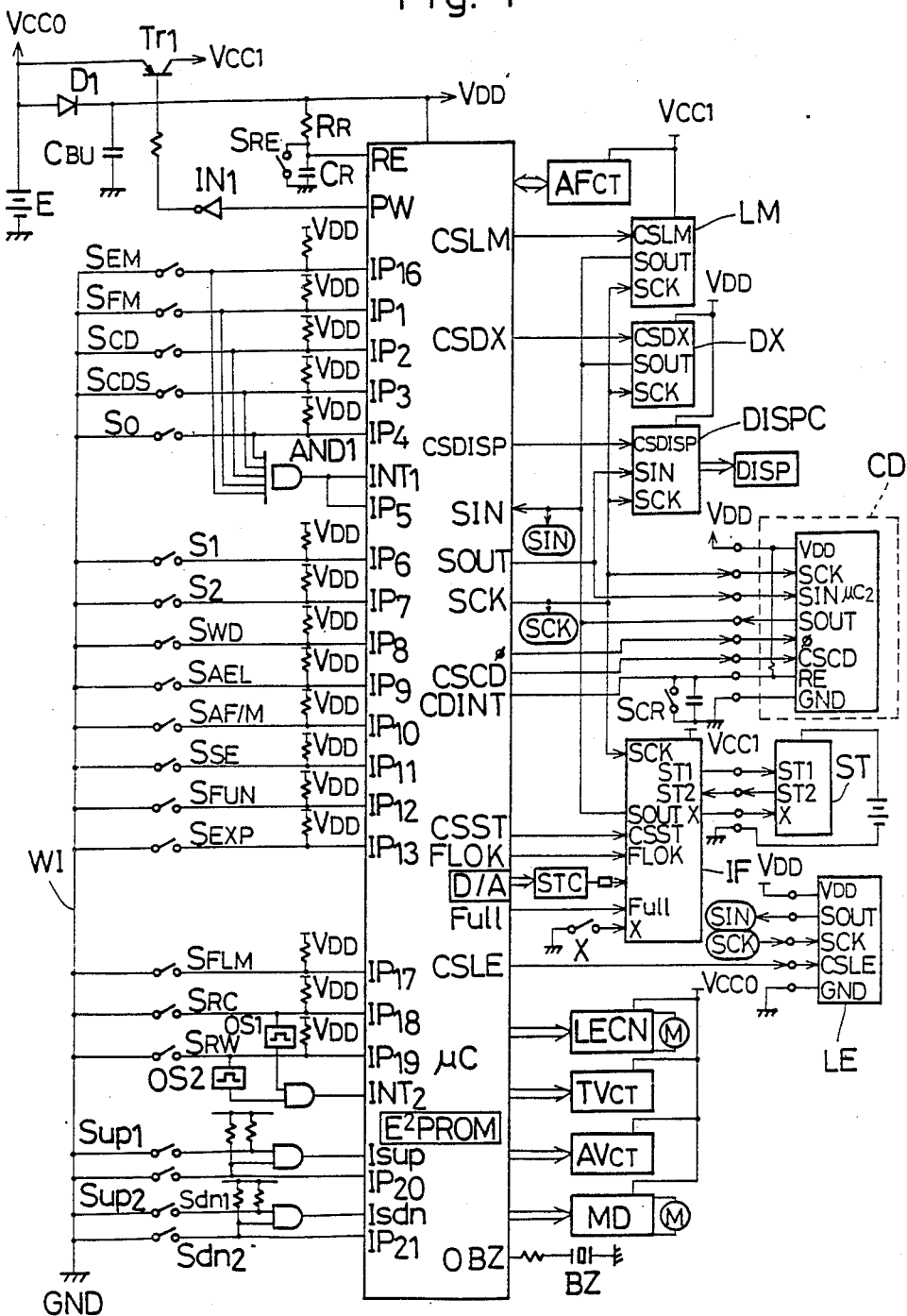
FIG. 1 is a circuit diagram of a camera system constructed in accordance with the present invention.

FIG. 1 is a circuit block diagram of a camera system of this embodiment. In this FIG. 1, a micro-computer $\mu C$, which is provided in a camera body CB shown in FIG. 39, performs control and various calculations of the camera. The micro-computer $\mu C$ comprises an Electronic Erasable Programable Read Only Memory so-called EEPROM or E$^2$PROM (hereinafter referred to as E$^2$PROM) to be able to write and read freely inside it.

A focus condition detecting circuit AFct detects the focus condition, which includes a Charge Coupled Device (hereinafter referred to as CCD), integration controlling circuit for controlling integration of charge produced in CCD and an analog-digital converting circuit, and obtains information of subjects from three distance measuring areas as described later, and converts this information from analog value to digital value to output it to the micro-computer $\mu C$. Hereinafter "from analog value to digital value" is referred to as A-D.

A light measuring circuit LM performs measure of light for four areas as described later, and A-D converts the measured light values to give them to the micro-computer $\mu C$ as luminance information. A display controlling circuit DISPC receives display data and a display controlling signal from the micro-computer $\mu C$ and causes a display part DISP to perform a predetermined display.

Figure 39:
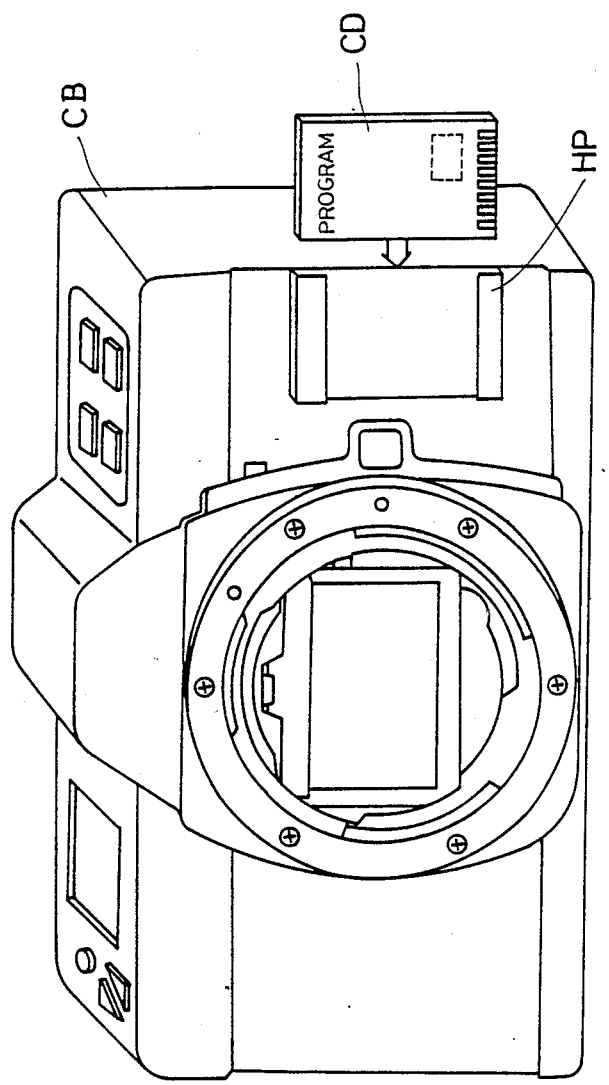
FIG. 39 is a perspective view showing the IC card attaching structure of the camera body.

In this embodiment, IC cards include two kinds of cards; a mode setting card for setting the mode of the camera and a program card for determining an exposure, and only one of them can be attached to the camera. FIG. 39 shows an arrangement in which IC card CD is attachable to the camera body CB through a card holding portion HP formed on the camera body CB. IC card CD is electrically connected to the camera body CB when it is attached to the camera body. The camera controls a specific mode or an exposure program based on the IC card attached thereto. On this control, detailed description is made later. An interface IF is installed between the micro-computer $\mu C$ of the camera and an electric flash apparatus ST. A light adjusting circuit STC is provided which receives light reflected by subjects which comes through an interchangeable lens as taking lens at flashlight emission, and stops the flashlight emission when exposure quantity reaches an adequate value. A lens circuit LE is installed in a lens, which outputs information peculiar to an interchangeable lens to the micro-computer $\mu C$ of the camera. A lens drive controlling circuit LECN drives the taking lens based on information on focus condition detection. A shutter controlling circuit TV$_{CT}$ controls a shutter based on a control signal from the micro-computer $\mu C$. A diaphragm aperture controlling circuit AV$_{CT}$ controls the diaphragm aperture based on a control signal from the micro-computer $\mu C$. A motor controlling circuit MD controls winding-up and rewinding of a film based on a control signal from the micro-computer $\mu C$. A buzzer BZ is provided for raising an alarm when the shutter speed becomes a speed causing blurring. Symbol E designates a battery for a power supply, symbol D$_1$ designates a diode for blocking reverse current, and symbol C$_{BU}$ designates a large-capacity condenser for backing up the micro-computer $\mu C$. Symbols R$_R$ and C$_R$ designate a resistor and a condenser for resetting the micro-computer $\mu C$ when attaching the battery, respectively. Symbol Tr$_1$ designates a transistor for supplying power to the above-described circuits.

Next, description is made for switches. A battery attachment switch S$_{RE}$ is turned to OFF when the battery is attached. In accordance with turn OFF of the switch S$_{RE}$, a signal changing from the "L" level to the "H" level is applied to a terminal RE of the micro-computer $\mu C$, and thereby the micro-computer $\mu C$ is triggered to execute a resetting routine as described later. A exposure mode changing switch S$_{EM}$ normally opens. The exposure mode is changed by operating both this switch S$_{EM}$ and an up switch Sup or both the switch S$_{EM}$ and a down switch Sdn as described later. A function changing switch S$_{FM}$ normally opens. A change of function (for example, change-over between continuous-shot and one-shot) is performed by operating this switch S$_{FM}$, the up switch Sup and the down switch Sdn. Wherein, the continuous-shot means that focus condition is kept in infocus condition, so that the exposure is carried out with infocus condition continuously even after infocus condition is once obtained. And, one-shot means that infocus condition is once obtained and lens position is kept after once infocus condition. A card function enable/disable switch S$_{CD}$ comprises a switch which is normally opened. This switch S$_{CD}$ is operated to change-over enable and disable of the card function when the card is attached to the camera.

A card data setting switch S$_{CDS}$ normally opens. This switch S$_{CDS}$ is operated to perform the change of another mode setting or setting of data required for the function respectively during the attachment of the mode setting card or the function card (program card) to the camera.

A photometric switch S$_O$ is operated to perform operations of photometry, display of various data proceeded to the other operation of automatically-focusing (hereinafter referred to as AF). This switch S$_O$ is turned ON by just touching operation button (not illustrated). Out of the above-mentioned switches, when one switch is turned to ON, the micro-computer $\mu C$ executes an interrupt flow INT$_1$ in FIG. 3 as described later. An AF switch S$_1$ is operated to start AF operation. This switch S$_1$ is turned to ON by depressing a first stroke of the above-mentioned operation button. A release switch S$_2$ is operated when a photographing operation is performed, and it is turned to ON by depressing a second stroke (deeper than the first stroke) of the above-mentioned operation button. A one-frame switch S$_{WD}$ is turned to ON by winding up one frame of a film. An AE locking switch S$_{AEL}$ for performing AE lock (exposure value lock) is a normally-opened push type switch. A focus condition adjusting mode changing-over switch S$_{AF/M}$ performs change-over between AF and manual focus condition adjustment.

A normally-opened change data selecting switch S$_{SE}$ is operated to select data to be changed. A normally-opened change data enable/disable changing-over switch $S_{FUN}$ is operated to change-over enable/disable of the data selected by the change data selecting switch $S_{SE}$ where the mode setting card is attached and the data setting mode is set. A normally-opened exposure mode combination selecting switch $S_{EXP}$ is operated to select a combination of the exposure modes where the mode setting card is attached and the data setting mode is set. A film detecting switch $S_{FLM}$ is operated to detect whether or not a film has been loaded till a certain place. This switch $S_{FLM}$ is arranged on the film rail surface in the vicinity of a spool chamber, being turned to OFF when the film exists at this place.

A rear lid close detecting switch $S_{RC}$ is turned to ON when the rear lid is closed and is turned to OFF when opened, and by turning this switch to ON, the micro-computer $\mu C$ executes an interrupting routine as described later. A rewinding switch $S_{RW}$ for starting rewinding of the film is turned to ON when it is operated, and the interrupting routine as described later is executed, and when the rear lid is opened, it is turned to OFF. An IC card attachment switch $S_{CR}$ is turned to OFF when an IC card CD is attached to the camera. A micro-computer $\mu C_2$ of the IC card CD is reseted when the switch $S_{CR}$ is turned to OFF. A so-called x contact X is turned to ON after completing first-curtain running of the shutter, and is turned to OFF on charging the shutter.

Up switches $Sup_1$ and $Sup_2$ performs change-over of data to be changed or addition, and down switches $Sdn_1$ and $Sdn_2$ performs changeover thereof or subtraction. Except for change of the diaphragm aperture value or change of the shutter speed when the exposure mode is the manual mode (M mode), the above-mentioned respective switches $Sup_1$, $Sup_2$, $Sdn_1$ and $Sdn_2$ become parallel switches, and the up function is achieved by depressing either of the up switches $Sup_1$ and $Sup_2$, and the down function is achieved by depressing either of the down switches $Sdn_1$ and $Sdn_2$. When the diaphragm aperture value or the shutter speed is changed in the M mode, the switches $Sup_1$ and $Sdn_1$ carry out the up/down functions of the diaphragm aperture value, and the switches $Sup_2$ and $Sdn_2$ carry out the up/down functions of the shutter speed, respectively. In addition, where the up switch Sup is referred, either of the switches $Sup_1$ and $Sup_2$ is indicated, and similarly where the down switch Sdn is referred, either of the switches $Sdn_1$ and $Sdn_2$ is indicated. An operation of the up switch Sup or the down switch Sdn is detected by that a terminal Isup or a terminal Isdn has become the "L" level, respectively.

In FIG. 1, a line WI connected in common with the above-mentioned respective switches is connected to a ground potential point GND.

Table 1 shows the above-described respective switches and the functions thereof in the lump.

Next, prior to making description on operation of the camera of this embodiment, description is made for two kinds of IC cards used here, namely, the mode setting card and the program card.

(I) Mode setting card

This IC card purposes to provide a camera responding to the intention and photographing technique of a photographer by selecting the functions necessary for the photographer (or the functions considered unnecessary are deleted) from among the many functions (controllable functions) possessed by the camera or by taking the alternative of the functions. Also, since the unnecessary functions can be omitted by this feature, the camera has a simplified and good operability for the photographer. Next, description is made for this card and the contents of the display performed relating thereto.

First, selections of the functions of this IC card include, (i) selection of four functions, (ii) selection of the exposure modes, (iii) selection of the functions of the AE lock button, and the like.

Figure 2A:
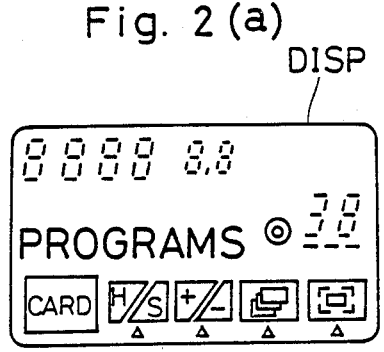
FIGS. 2(a) to 2(u) are views of displaying forms in a display part of the camera.
Figure 2B:
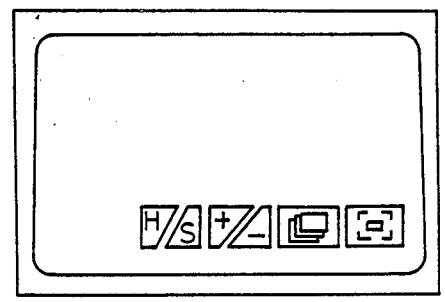
Figure 2C:
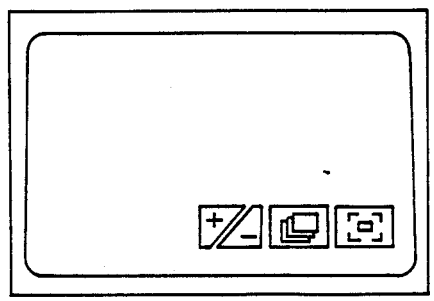

Then, four functions in the above-mentioned item (i) are, (a-1) highlight reading/shadow reading exposure function, (a-2) exposure adjusting function, (a-3) film winding-up mode changing-over function (continuous-shot/one-shot), and (a-4) spot AF/multi-spot AF changing-over function, and the functions required for the photographer can be selected from among these functions. Then, for the display relating to this selection, the contents as shown in FIG. 2(b) are prepared among all the contents of display as shown in FIG. 2(a). In FIG. 2(b), the contents disposed from left correspond to the functions of (a-1) through (a-4). Where the photographer does not require only the highlight reading/shadow reading exposure function (a-1), display is performed as shown in FIG. 2(c).

Figure 2D:
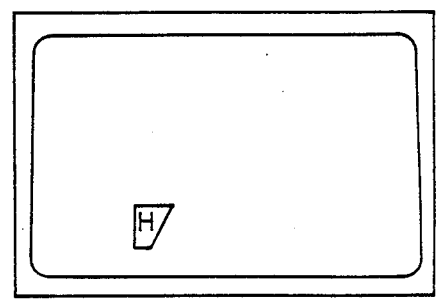
Figure 2E:
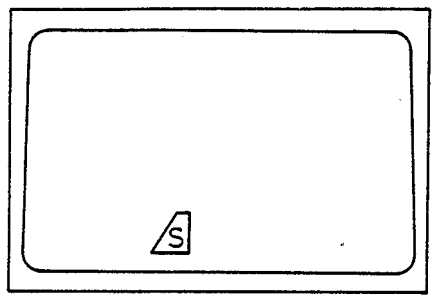
Figure 2F:
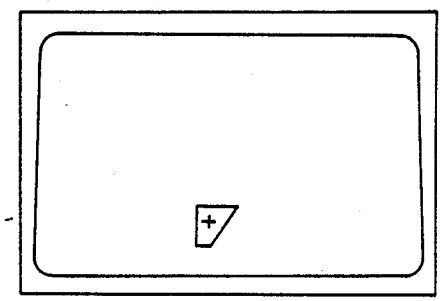
Figure 2G:
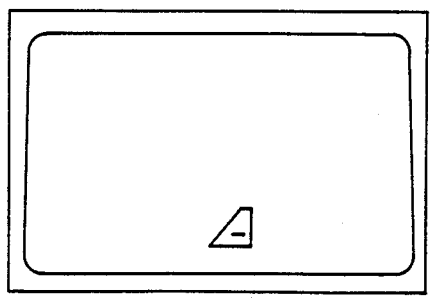
Figure 2H:
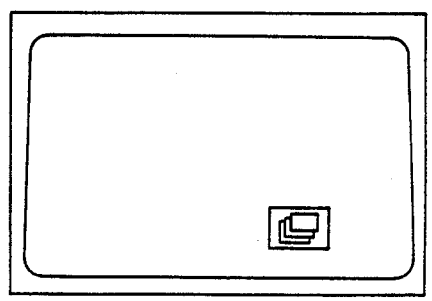
Figure 2I:
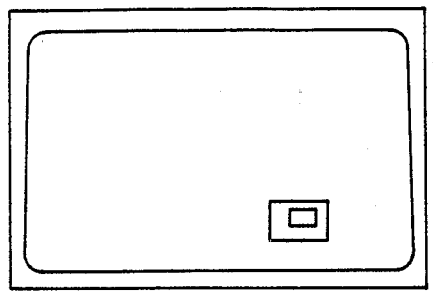
Figure 2J:
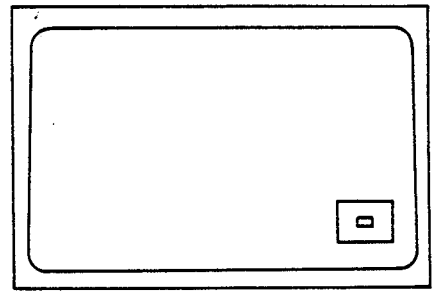
Figure 2K:
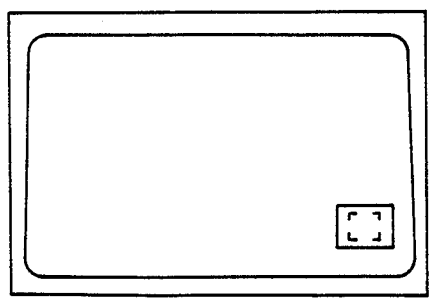

Displays relating to the use or change-over of the function are as follows:

Highlight reading ... FIG. 2(d)
Shadow reading ... FIG. 2(e)
Exposure adjustment+direction ... FIG. 2(f)
Exposure adjustment−direction ... FIG. 2(g)
Continuous-shot mode ... FIG. 2(h)
One-shot mode ... FIG. 2(i)
Spot AF ... FIG. 2(j)
Multi-spot AF ... FIG. 2(k)

Figure 2L:
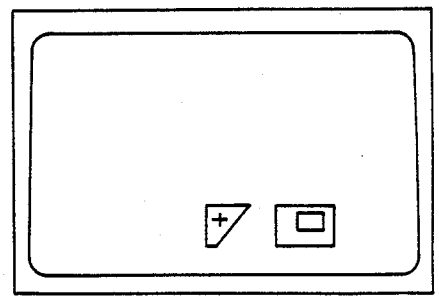

In addition, relating to continuous-shot/one-shot and spot AF/multi-spot AF, either one of the functions (for example, continuous-shot) is selected as original functions even if change-over is impossible. However, display is not performed because change-over is impossible. A display as shown in FIG. 2(l) shows that the exposure adjusting function and the film winding-up mode changing-over function are selected, and control of the exposure adjustment to +direction and the one-shot mode are performed.

Next, the exposure modes relating to the selection of the exposure modes in the above-mentioned item (ii) include, (b-1) Program mode (P mode),
(b-2) Diaphragm aperture priority mode (A mode),
(b-3) Manual mode (M mode), and
(b-4) Shutter priority mode (S mode), and the P mode is incorporated without fail as a base mode, and combinations of the remaining three modes (A, M and S modes) can be selected. Accordingly, there are eight combinations as follows:

| P | A | M | S |
|---|---|---|---|
| P |   | M | S |
| P | A |   | S |
| P | A | M |   |
| P | A |   |   |
| P |   |   | S |
| P |   | M |   |
| P |   |   |   |

Figure 2M:
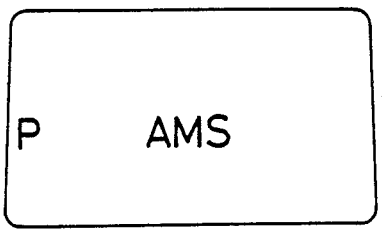
Figure 2N:
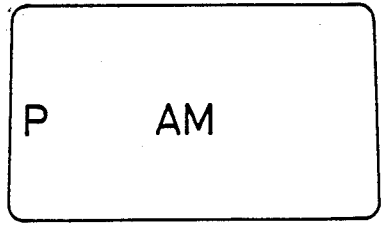
Figure 2O:
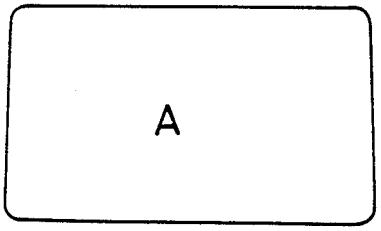
Figure 2P:
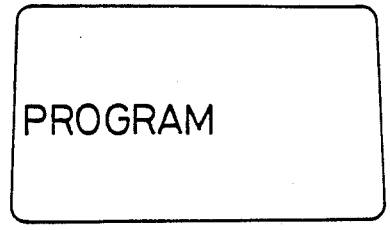

Then, as to the display, among four modes (PROGRAM is represented by P) in FIG. 2(m), a display of the selected combination is performed, for example, as shown in FIG. 2(n) at mode setting, and a display of one selected exposure mode (FIG. 2(o) A mode selection) is performed at photographing. "PROGRAM" is displayed in the case of the P mode (FIG. 2(p)).

Figure 2Q:
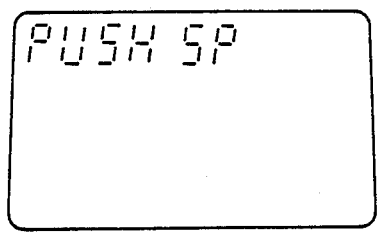
Figure 2R:
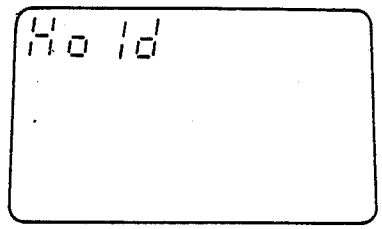

Next, selections of the functions of the AE lock button in the above-mentioned item (iii) include, (c-1) power hold of the camera in the AE-locked state during a push of the AE lock button, and (c-2) AE-locked state by a push of the AE lock button, and release of the AE-locked state by re-push of the AE lock button or by OFF of power hold, and no display of this selection is performed at normal photographing, but display is made based on the card, displays in the cases of (c-1), (c-2) are performed as shown in FIG. 2(q) and FIG. 2(r), respectively.

Figure 2S:
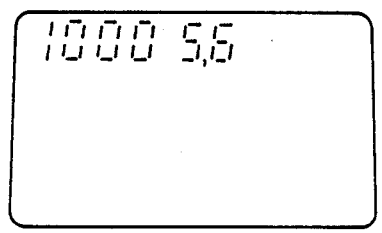
Figure 2T:
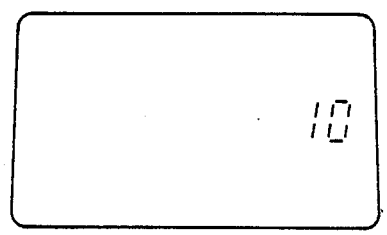

In addition, in this portion, normally the shutter speed and the diaphragm aperture value are displayed as shown in FIG. 2(s). In FIG. 2(s), numeral "1,000" represents the shutter speed, and numeral "5.6" represents the diaphragm aperture value. Next, alternatives of the functions include, (d-1) count-up or count-down of a film counter, (d-2) auto-return or non-auto-return at the completion of the film winding, (d-3) film leader part is wound into a patrone chamber or left outside the cassette or the patrone chamber at the completion of rewinding, and (d-4) operation or non-operation of a blurring warning buzzer BZ.

and 16 combinations of the above items are considered, and each number is given to each combination as shown in Table 2, and a display is performed as shown in FIG. 2(t) in the cases of setting and others. At normally photographing, this portion becomes to display a film counter.

(II) Program card

The program card performs control of an exposure program made for the purpose of photographing at a high shutter speed without causing a blurring for a moving subject at a bright place. In addition, the program card performs various controls of the camera (detailed description thereon is made later).

Next, description is made for operation of the camera based on flowcharts of the micro-computer $\mu C$ as shown in drawings and detailed description is made for each part of the flowcharts as required.

DESCRIPTION FOR THE OPERATION

Figure 3:
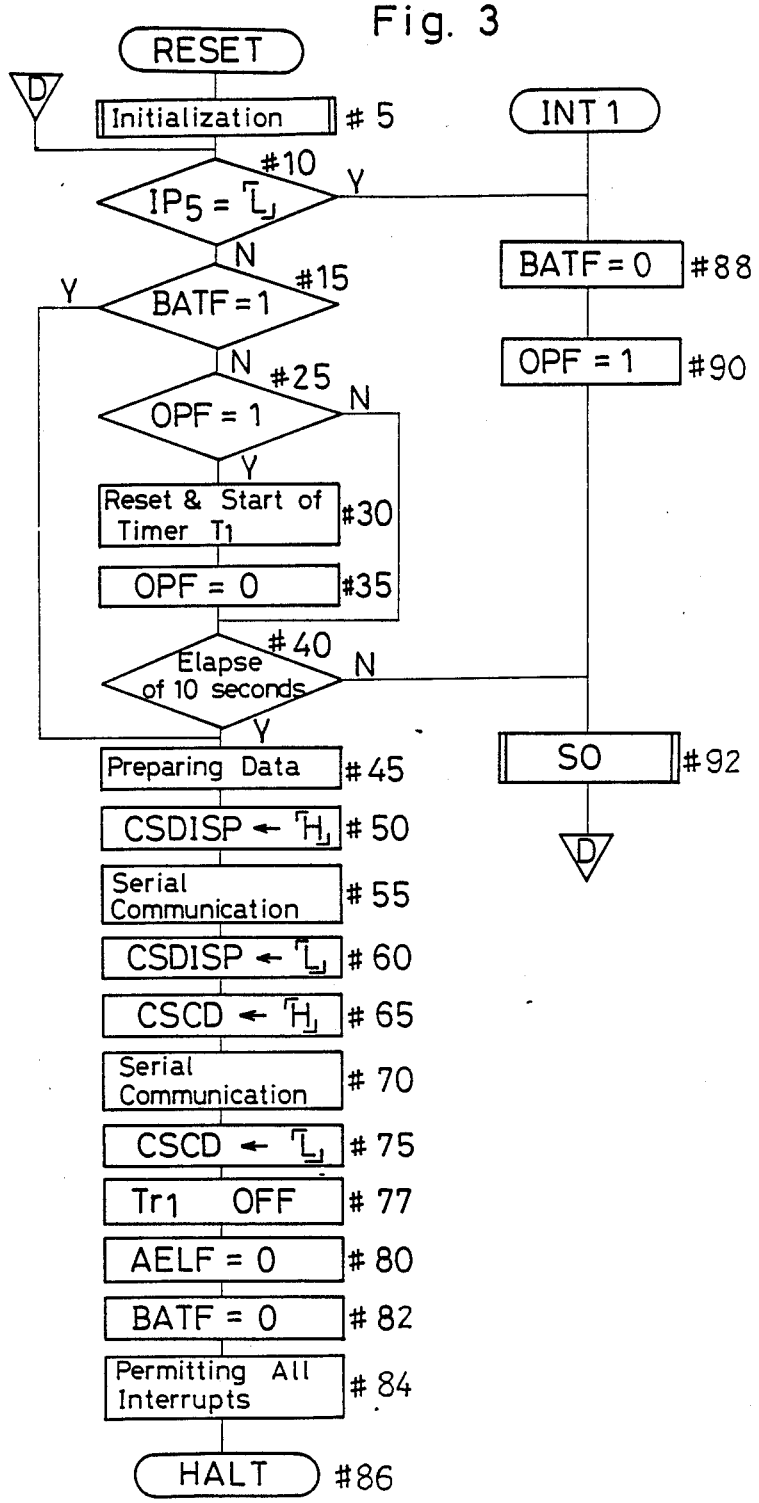
FIG. 3 is a flowchart showing a routine of resetting of the camera when the battery is attached.
Figure 4:
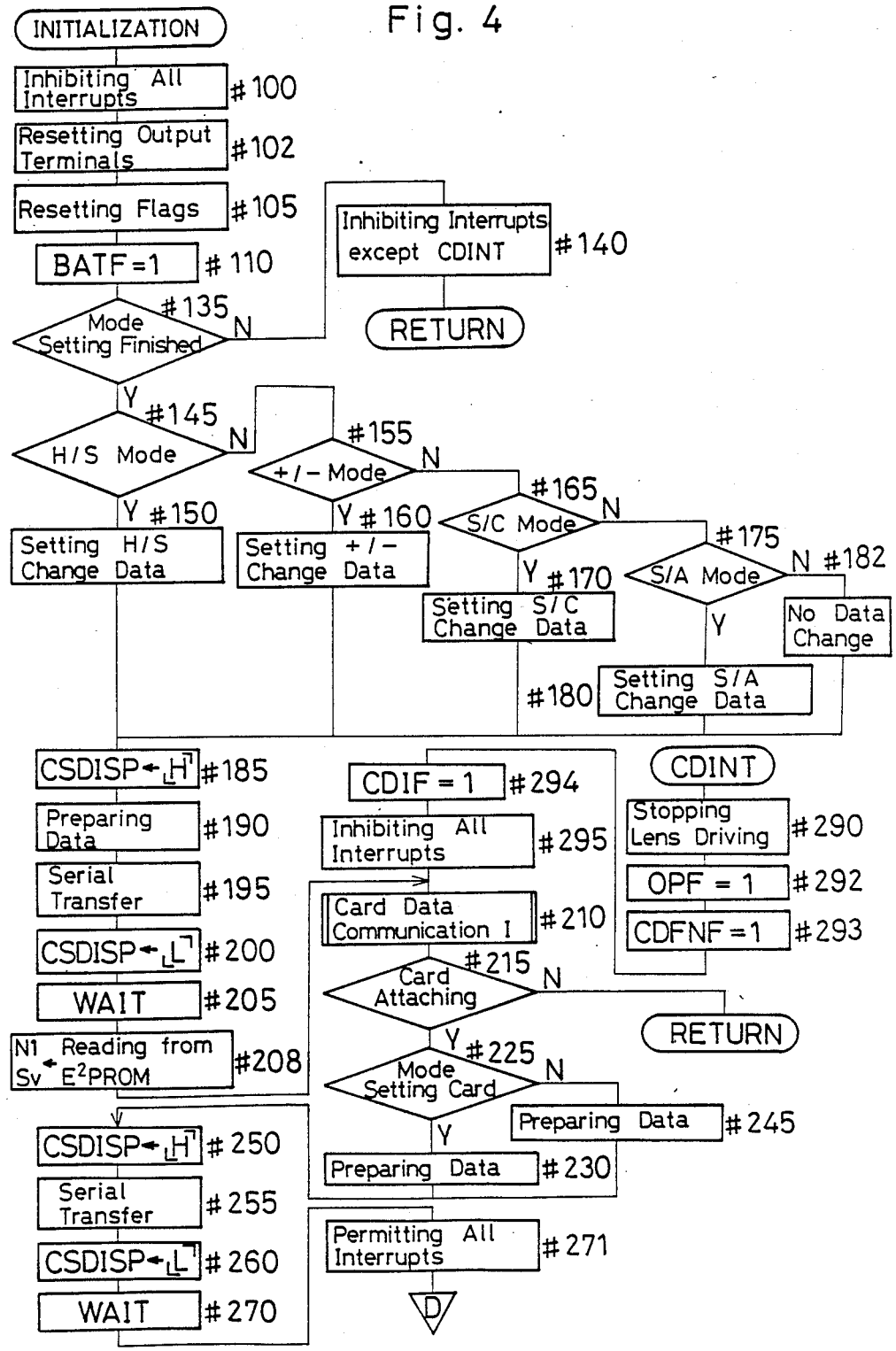
FIG. 4 is a flowchart showing a routine of initialization in FIG. 3.

When a battery E is attached to the camera body, the battery attachment switch $S_{RE}$ is turned to OFF, and a signal changing from the "L" level to the "H" level is inputted to a terminal RE. A clock oscillator, which is provided in the micro-computer $\mu C$, is enabled in response to the entry of the signal, and a clock signal thereof is sent also to the IC card CD from the micro-computer $\mu C$ through a terminal $\phi$. Then, the micro-computer $\mu C$ executes a routine RESET as shown in FIG. 3. In this routine, first, the micro-computer $\mu C$ performs initialization due to the attachment of the battery (see step #5). FIG. 4 shows this subroutine.

In FIG. 4, first, the micro-computer $\mu C$ inhibits all interrupts to this flow, and resets all output terminals thereof to the "L" level (#100 and #102). Also, it resets all flags in a random access memory (hereinafter referred to as RAM) prepared in the micro-computer $\mu C$ (#105) and sets a flag BATF showing attachment of the battery (#110). Thereby, the exposure mode is set to the P mode, the spot (S)/multi-spot AF (A) is set to the multi-spot AF mode (A), and the one-shot (S)/continuous shot (C) is set to the one-shot mode (S), and the mode not performing exposure adjustment and highlight (H)/shadow (S) is set. Table 3 shows the contents of this function data.

Next, it is detected by checking up the content of the $E^2PROM$ (content of $MSb_4$ as described later) whether or not the mode setting card out of the above-described two kinds of the IC cards has been attached once and mode setting has been already performed. Then, if the setting has not been made, interrupts except an interrupt CDINT due to an attachment of the IC card are inhibited (#135, #140), and thereafter processing returns. If the mode setting has been made, which mode has been set is found out from the contents of the $E^2PROM$ (contents of $MSb_0$–$MSb_3$ as described later), and display of the change data is determined.

It is detected whether or not the modes have been set in a sequence of the highlight/shadow mode (H/S mode), the exposure adjusting mode ($\pm$mode), the one-shot/continuous-shot changing-over mode (S/C mode), and the spot/multi-spot AF changing-over mode (S/A mode), and if modes have been set, change data of a mode which has been set is set (#145–#182). Table 4 and Table 5 show setting mode data of the $E^2PROM$ and change data of the RAM, respectively. As to the display, the above-mentioned steps (#145–#182) are equivalent to positioning of a cursor as described later.

Next, control for sending data to a display controlling circuit DISPC is executed to display these setting modes. First, a terminal CSDISP is set to the "H" level, data communication is informed to the display controlling circuit DISPC, data is prepared, and serial communication is performed, and when data transfer is completed, the terminal CSDISP is set to the "L" level, and a signal representing completion of the serial communication is coupled to the display controlling circuit DISPC (#185–#200).

Figure 2U:
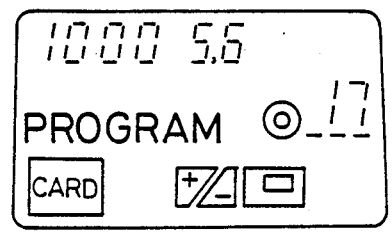

Here, brief description is made on the operation in the case of serial communication. First, the clock signal is outputted from a serial clock terminal SCK in response to an instruction of serial communication. In synchronism with a rise of this clock signal, the output side outputs data by one bit, and in synchronism with a fall thereof, the input side inputs the data by one bit. By repeating this operation as required, the predetermined data is obtained. FIG. 2(u) shows an example of display in the normal photographing state.

The contents of display include, in an example shown in FIG. 2(u), the shutter speed [1000], the diaphragm aperture value [5.6], the AE mode [PROGRAM], the count of film frames (it also indicating presence or absence of film) [17], and the function mode (it is indicated with figures shown on the lowest area). It is sufficient for the operation to prepare one byte (eight bits, 256 kinds) for each content of display. The display controlling circuit DISPC inputs these signals and decodes them to perform a predetermined display. Now, for setting the data by IC card, the following data are required, that is, a bit $MSb_5$ in the $E^2PROM$ for display area of the shutter speed and the diaphragm aperture value, bits $MSb_6$–$MSb_8$ in the $E^2PROM$ for display of the AE mode, bits $MSb_9$–$MSb_{12}$ for display of the frame count of the film, bits $MSb_0$–$MSb_4$ for the function mode, and bits $CDb_0$–$CDb_2$ for display of change data.

The micro-computer μC processes these data, and gives them to the display controlling circuit DISPC as display control data.

Figure 34A:
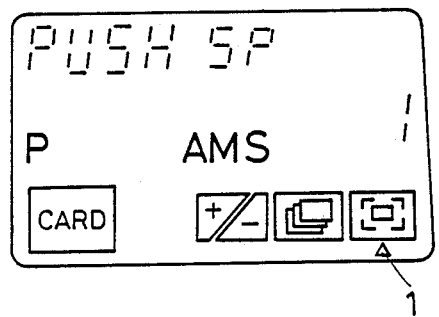
FIGS. 34(a) to 34(c) are views showing examples of display when the card is attached.

FIG. 34(a) shows an example of display which is displayed on a display portion DISP in such a manner. In this FIG. 34(a), a triangle 1 designates a cursor.

The micro-computer μC waits for 0.5 second in step #205 of FIG. 4, and executes this display for 0.5 second. Then, it reads the contents of the quantity of film frames $N_1$ ($MSb_{13}$–$MSb_{18}$) and a film speed Sv ($MSb_{19}$–$MSb_{24}$) stored in the $E^2PROM$, and transfers them into storage portions of the quantity of film frames $N_1$ and the film speed Sv of the RAM. Thereafter, it performs a card data communication I to determine attachment or non-attachment of the IC card and the kind of IC card (#210).

Figure 5A:
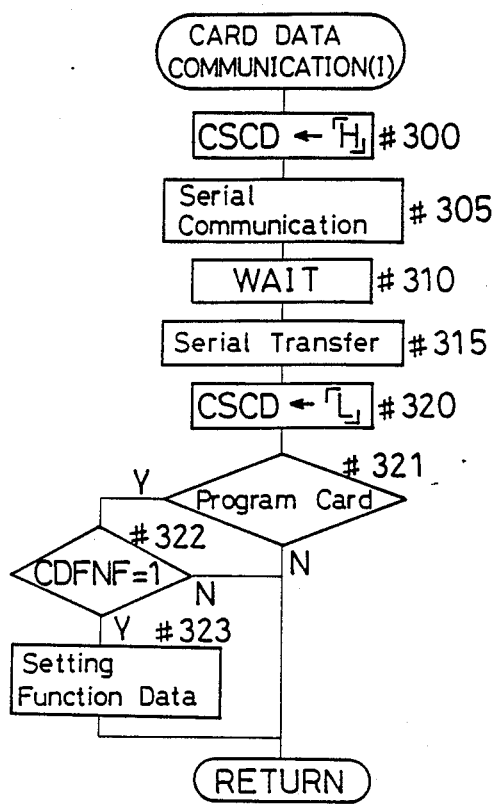
FIGS. 5(a) to 5(c) are flowcharts of data communications (I) to (III) between the camera and an IC card attached thereto respectively.

FIG. 5(a) shows a subroutine of this card data communication I. In this FIG. 5(a), first, a terminal CSCD is set to the "H" level to inform the IC card CD of the communication with the IC card CD, and the data outputting mode is set, and data showing the data communication I (refer to Table 6) is sent to the IC card CD by serial transfer (#300 and #305).

The micro-computer μC waits for a predetermined time required for the IC card CD to input this data, prepare required data and output it (#310). Then, data are serially sent from the IC card CD to the micro-computer μC (#315), and therefore the micro-computer μC operates in the inputting mode. On completing this serial transfer, the terminal CSCD is set to the "L" level (#320).

Next, the kind of the IC card is discriminated in step #321. Here, in the case of the mode setting card, data show only the kind of the IC card and therefore processing returns immediately. However, in the case of the program card, data contain function data showing either one of each of continuous/one shot of the AF mode (detailed description is made later), spot/multi-spot of the AF zone, spot/multi-spot of the photometric zone or data showing that specifying is not made particularly (to be set by the photographer), so, judgment is made on whether or not the card function has been selected (#322). When the card function has been selected (CDFNF=1), data setting is made by re-writing bits $Fb_2$, $Fb_8$ and $Fb_{12}$ of the function data (#323), and processing returns. On the other hand, when the card function has not been selected, processing returns without re-writing the data.

Figure 34B:
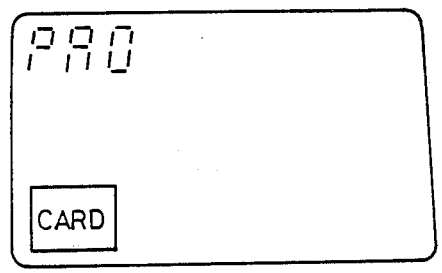
Figure 34C:
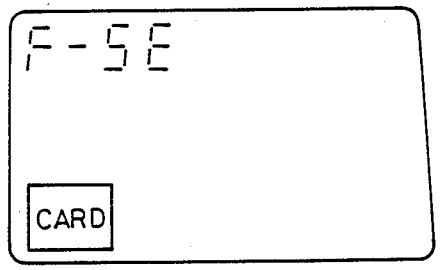

Reverting to FIG. 4, in step #215, the micro-computer μC judges from the inputted data (refer to Table 7) whether or not the IC card has been attached, and when it has not been attached ($CKb_0=0$), processing returns without displaying the kind of the IC card. When the IC card has been attached ($CKb_0=1$), the micro-computer μC judges the kind of the IC card, and in the case of the mode setting card ($CKb_1$–$CKb_6=00_H$, here, $H$ shows a hexadecimal number), it prepares display data ($CKb_0$–$CKb_6$) for this data card (#230), while in the case of the program card ($CKb_1$–$CKb_6=01_H$), it prepares display data ($CKb_0$–$CKb_6$) for program card (#245). In addition, in these cases, the above-mentioned data $CKb_1$–$CKb_6$ and IC card attachment data $CKb_0$ are set respectively as display data of the shutter speed displaying part, and display data except those data are turned to "0" (not set). These display data are sent to the display controlling circuit DISPC (#250–#260), being displayed for predetermined time (0.5 second). FIGS. 34(b) and 34(c) show examples of display in these cases. FIG. 34(b) shows a display when the program card is attached, and FIG. 34(c) shows a display when the mode setting card is attached. Here, characters "PRO" and "F-SE" depend on the above-mentioned bits $CKb_1$–$CKb_6$, and character "CARD" depends on $CKb_0$.

The micro-computer μC waits for predetermined time for this display (#270), and thereafter permits all interrupts (#271), proceeding to step #10 in FIG. 3.

In FIG. 3, after completing the above-mentioned initialization (#5), in step #10, judgment is made by the level of a terminal $IP_5$ on whether or not any of the exposure mode changing switch $S_{EM}$, the function changing switch $S_{FM}$, the card function enable/disable switch $S_{SD}$, the card data setting switch $S_{CDS}$ and the photometric switch $S_O$ is turned to ON. Where none of the above-mentioned switches is turned to ON ($IP_5$="H"), in step #15, further judgment is made on whether or not the battery attachment flag BATF has been set, and where it has been set, it is assumed that processing comes to this step without performing anything after attaching the battery, and processing jumps to step #45, and the micro-computer μC performs control of erasure of display and stop of the operation by the IC card CD according to the flow in the step #45 and the following steps. First, all data $CKb_0$–$CKb_6$ related to the display are turned to "0" (not set), and the data thereof is sent to the display controlling circuit DISPC (#45–#60). Accordingly, the display is wholly erased. It is also possible that an instruction for whole erasure is supplied against the display controlling circuit DISPC, and in response to this, the display controlling circuit DISPC erases the whole display.

The micro-computer μC, as described above, sends the erasing data to the display controlling circuit DISPC, and thereafter sends a sleep sign (instruction of temporarily disabling the IC card) signal to the IC card CD (#65–#75). As shown in Table 6, this sleep sign is constituted by that both of bits $Csb_0$ and $Csb_1$ become 1.

Thereafter, a transistor $Tr_1$ is turned off by turning a terminal PW to "L", a flag AELF showing AE lock and the flag BATF showing bettery attachment are reset respectively, all interrupts are permitted, and processing halts (#77–#86). In addition, the clock oscillator is disabled also by this halt.

In the above-mentioned step #10, if one of the five switches $S_{EM}$, $S_{FM}$, $S_{CD}$, $S_{CDS}$ and $S_O$ has been turned to ON, processing proceeds to step #88, and the flag BATF showing battery attachment is reset, and in the next step #90, a flag OPF showing that one of the above-mentioned five switches has been operated is set, and a routine SO is executed, and processing returns to step #10. The routine SO performs photometry, AF, display, exposure control and the like, and detailed description thereon is made later.

In step #10, when none of the above-mentioned five switches has been turned to ON and the battery is not attached (BATF=0), judgment is made on whether or not the flag OPF, which is set where processing has passed through the routine SO once, has been set (#15, #25). When this flag has been set, a timer $T_1$ for power hold is reset and started, and the flag OPF is reset (#30, #35). Here, the reason why the timer $T_1$ is reset and started (#30) is that power hold must be extended by predetermined time considering a possible second turn-on of the switch although processing has passed through the routine #92 once from step #10 through steps #88 and #90, and at present none of the above-mentioned five switches has been depressed. And the reason why the flag OPF is reset at step #35 is to show that processing has passed through step #30. After step #35, processing proceeds to step #40.

In step #25, when the flag OPF has not been set, processing skips steps #30 and #35 and proceeds to step #40. Whether or not 10 seconds have elapsed from the start of the above-mentioned timer is detected in step #40, and where 10 seconds have elapsed, processing proceeds to step #45 and the subsequent steps, and performs erasing of the display and disabling of the IC card CD. Where 10 seconds have not elapsed, processing goes to step #110, for repeating the routine SO.

Next, description is made for control of the camera when the IC card CD is attached. When the IC card is attached, a signal turning from the "L" level to the "H" level is inputted to a terminal CDINT of the micro-computer $\mu C$, and an interrupt routine CDINT as shown in FIG. 4 is executed. Then, when processing enters this routine, the micro-computer $\mu C$ stops lens driving and sets the flag OPF to hold power (#290, #292). Then, it sets a flag CDFNF to forcedly add the card function (#293), and sets a flag CDIF so as not to perform the display of the kind of the card in display control as described later (#294). Next, to preferentially display the kind of the attached card, other interrupts to this flow are all inhibited in step #295, and processing proceeds to step #210. In the flow on and after the step #210, as described above, the kind of the IC card is displayed for predetermined time as shown in FIG. 34(b) or 34(c), and thereafter the state of permitting all interrupts is set, and processing returns to the former flow (step #30 in FIG. 3). When any one of the switches $S_{EM}$, $S_{FM}$, $S_{CD}$, $S_{CDS}$ and $S_O$ is turned to ON and a signal turning from the "H" level to the "L" level is inputted in that state of permitting interrupts, processing enters an interrupt INT$_1$ as shown in FIG. 3, and executes the flow of step #88 and the subsequent steps.

Even if any of the interrupts INT$_1$, INT$_2$ and CDINT is applied in the halt state, the clock oscillator is enabled, and the clock signal thereof is sent through the contact $\phi$ also to the IC card.

Figure 6:
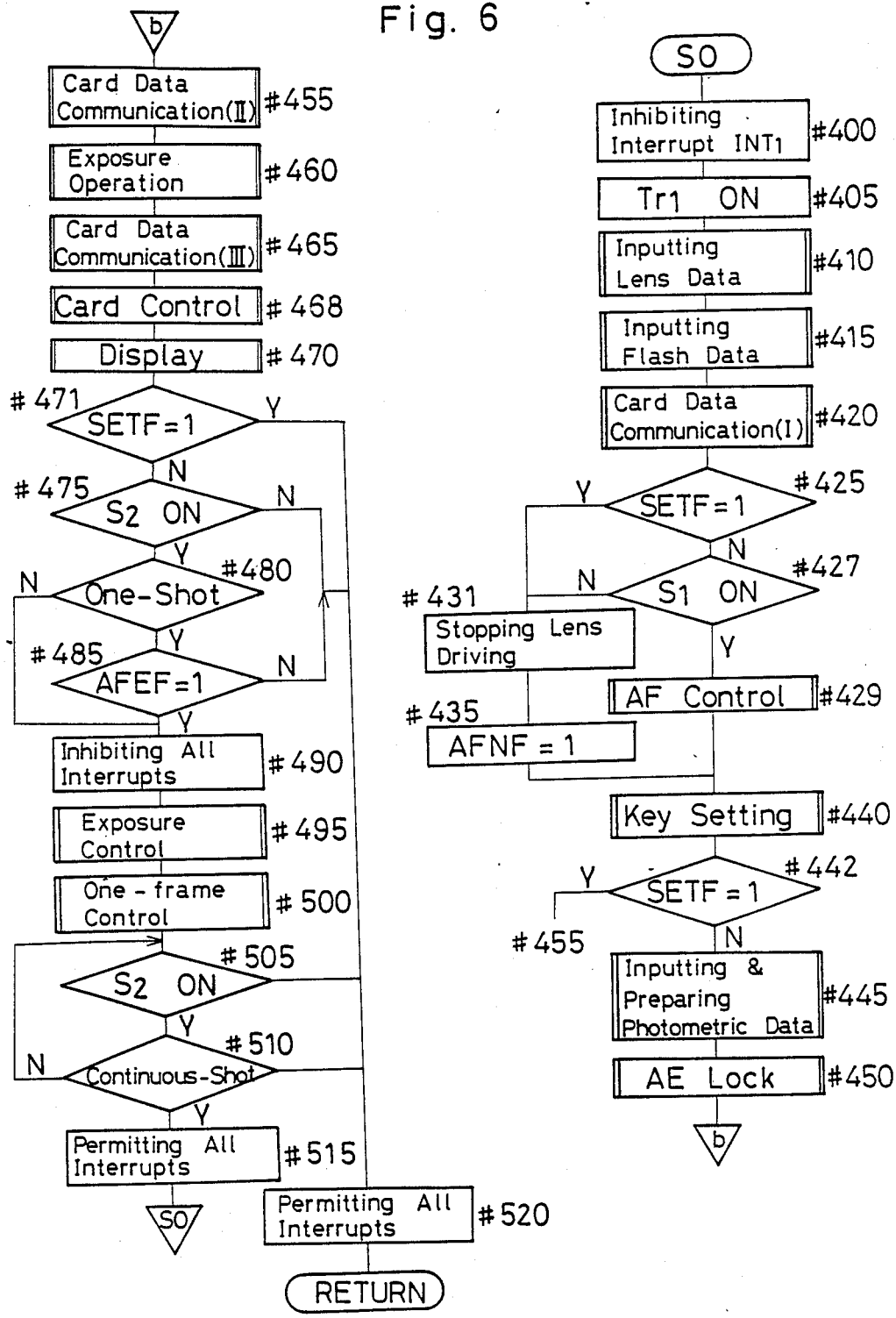

Next, description is made on the above-mentioned routine SO according to FIG. 6.

Figure 7:
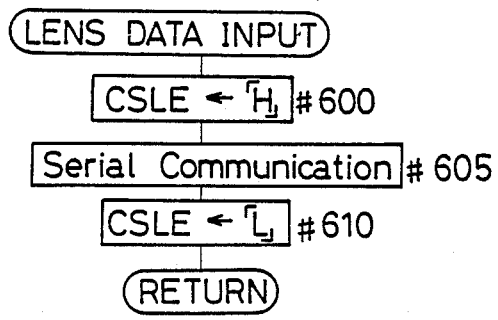
FIG. 7 is a flowchart showing a routine of lens data input.

First, the interrupt INT$_1$ to the flow of the routine SO is inhibited (#400). This is because if the interrupt INT$_1$ in FIG. 3 is applied in the middle of the control according to the flow of the routine SO, control operation does not proceed forward. Next, by setting the terminal PW of the micro-computer $\mu C$ to the "H" level in step #405, the low level is applied to the base of the PNP transistor Tr$_1$ through an inverter IN$_1$, and thereby this transistor Tr$_1$ is turned on, and power is supplied to the photometric circuit LM, the AF circuit AF$_{CT}$ and the like. Next, information peculiar to the interchangeable lens is inputted from the lens circuit LE to the micro-computer $\mu C$ (#410). This routine is shown in FIG. 7, being explained as follows. First, a terminal CSLE is set to the "H" level (#600), and serial communication is performed to input information from the lens (#605). This information includes attachment/non-attachment of the lens, an open F number Av$_O$ of the lens, a maximum diaphragm aperture value (Avmax), distance information, focal length information, a coefficient of converting the quantity of defocus into the quantity of lens drive (hereinafter referred to as "K value") and the like. When input of such lens information is completed, the terminal CSLE is set to the "L" level (#610), and processing returns.

Reverting to FIG. 6, at step #415, the micro-computer $\mu C$ inputs information from the electric flash apparatus ST. This information includes three kinds of information, namely, a guide number GN showing the quantity of light emission, whether or not charging is completed, whether forced light emission or auto light emission (this is described later). Here, description is made on operation of a communicating method of that information. First, FIG. 9(a) is a circuit diagram of the electric flash apparatus ST, and FIG. 9(b) is a circuit diagram of the interface IF, and further FIG. 8 is a flowchart of data input from the electric flash apparatus.

Figure 8:
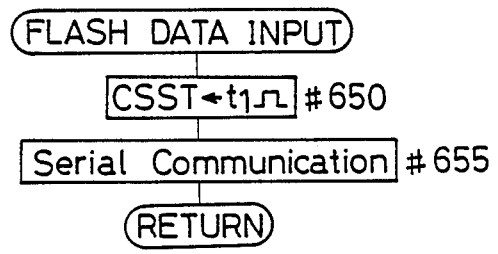
FIG. 8 is a flowchart showing a routine of flash data input.
Figure 9A:
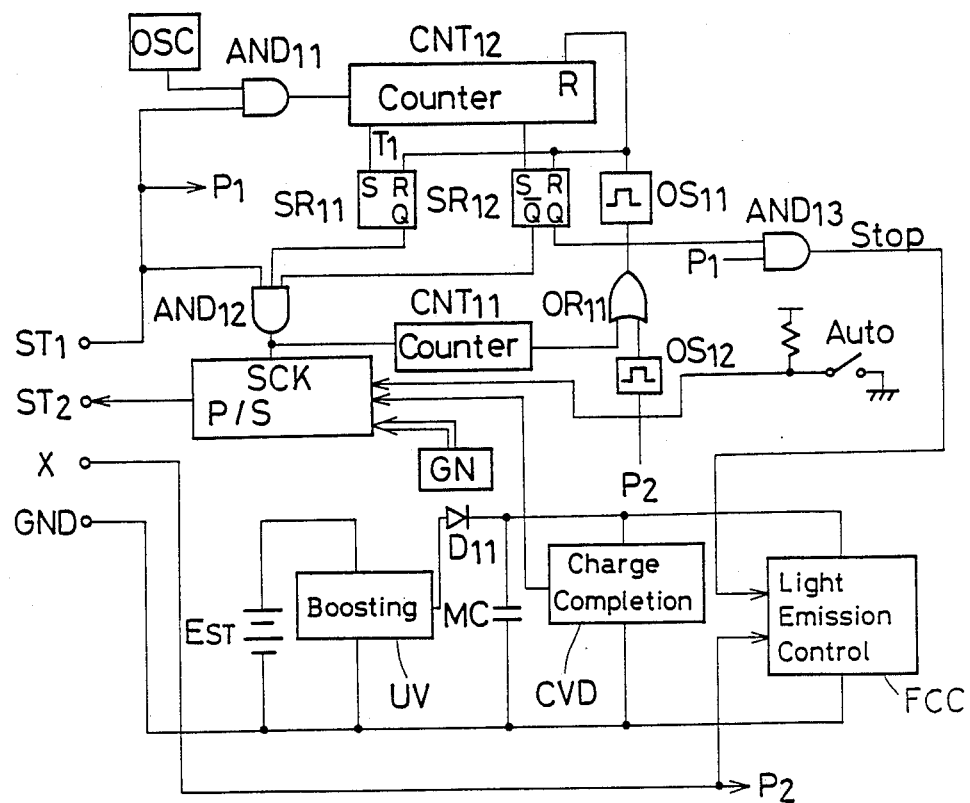
FIG. 9(a) is a circuit diagram of an electric flashlight apparatus.

In FIG. 8, the micro-computer $\mu C$ sets a terminal CSST to the "H" level for a certain time $t_1$, and outputs this signal to the electric flash apparatus ST (#650). The electric flash apparatus ST detects the time $t_1$ of this signal, recognizes to be the data output mode, and outputs data in synchronism with the clock signal from the micro-computer (#655).

Figure 9B:
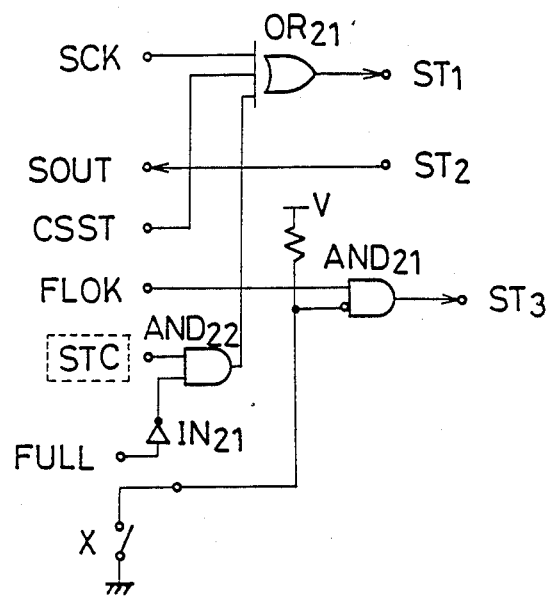
FIG. 9(b) is a circuit diagram of an interface thereof.

The interface circuit IF as shown in FIG. 9(b) transfers a signal of the terminal CSST of the micro-computer $\mu C$ to a terminal ST$_1$ of the electric flash apparatus through an OR circuit OR$_{21}$. At this time, the signals inputted to the OR circuit OR$_{21}$ are all of the "L" level. In the electric flash apparatus ST, a signal from the terminal ST$_1$ is inputted to an AND circuit AND$_{11}$, and consequently the AND circuit AND$_{11}$ is put in the enabled state, and outputs a signal comprising pulses from an oscillating circuit OSC to a counter CNT$_{12}$. The counter counts the signal, and thereby measures the time $t_1$. When the time $t_1$ is counted, a terminal T$_1$ is set to the "H" level, and an RS flip-flop SR$_{11}$ is set. At this time, an RS flip-flop SR$_{12}$ is kept reset intact, and an output $\overline{Q}$ thereof is of the "H" level. Accordingly, an AND circuit AND$_{12}$ is put in the enabled state.

Next, the micro-computer $\mu C$ outputs a clock signal SCK for serial communication. This clock signal SCK is outputted to the terminal ST$_1$ of the electric flash apparatus ST through the OR circuit OR$_{21}$ of the interface circuit IF. In the electric flash apparatus ST, the inputted clock signal SCK is inputted to a terminal for clock signal of a parallel/series converting circuit P/S through the AND circuit AND$_{12}$. This parallel/series converting circuit P/S outputs the guide number GN, a signal showing the state of charge completion, and a signal showing forced light emission or auto light emission in synchronism with the clock signal. A counter CNT$_{11}$ of the electric flash apparatus ST counts the inputted clock signal SCK, and on counting a predetermined required number, outputs the "H" level to an OR circuit OR$_{11}$. This signal is inputted to a reset terminal of a counter CNT$_{12}$ through the OR circuit OR$_{11}$ and a one-shot circuit OS$_{11}$, and therefore the counter is reset. The above-mentioned counter CNT$_{11}$ comprises a counter which is reset on counting a predetermined number of clock pulses.

The above-mentioned electric flash apparatus has, in addition to the above-mentioned circuit elements, a battery E$_{ST}$ for the power source, a boosting circuit UV for boosting the voltage of the battery E$_{ST}$ to a voltage required for flashlight emission, a rectifying diode D$_{11}$ rectifying the voltage outputted from this boosting circuit UV, a main condenser MC storing energy required for flashlight emission, a charging voltage detecting circuit CVD detecting the charging voltage of the main condenser MC and a light emission controlling circuit FCC controlling start and stop of light emission.

Figure 5B:
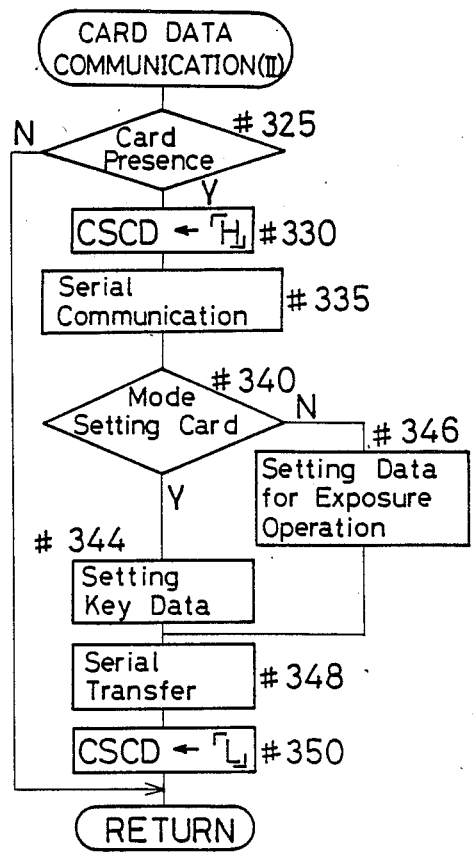
Figure 5C:
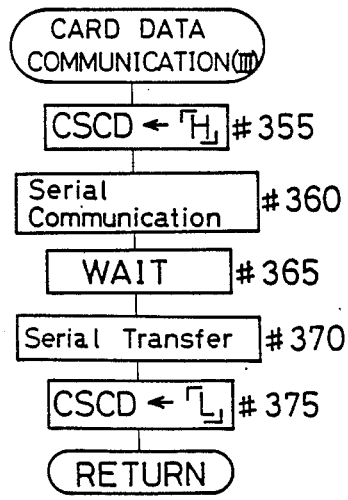

Reverting to FIG. 6, after performing input of the above-mentioned flash data, the micro-computer μC performs the card data communication I with the IC card CD to discriminate the kind of the IC card CD (#420). This card data communication I has been already described in reference to FIG. 5, and therefore the description thereof is omitted here. After this card data communication, judgment is made at step #425 on whether or not a flag SETF showing that the IC card is attached and the data setting mode is set has been set. Here, where the flag SETF has not been set, whether or not the AF starting switch $S_1$ has been turned to ON is judged by the level of a terminal $IP_6$ (#427). Where the above-mentioned switch $S_1$ has been turned to ON ($IP_6$="L" level), control of AF is performed (#429). On the other hand, when the flag SETF has been set, or the switch $S_1$ is in the OFF state ($IP_6$="H" level), a signal of stopping an AF driving motor is outputted to the lens controlling circuit LECN to stop lens driving in order to inhibit AF operation (#431), and a flag AFNF showing that AF is not performed is set (#435). By inhibiting the AF control and preferentially performing data setting when the data setting mode has thus been set, the AF operation is not performed even if the AF starting switch $S_1$ is depressed by mistake during data setting.

Figure 10A:
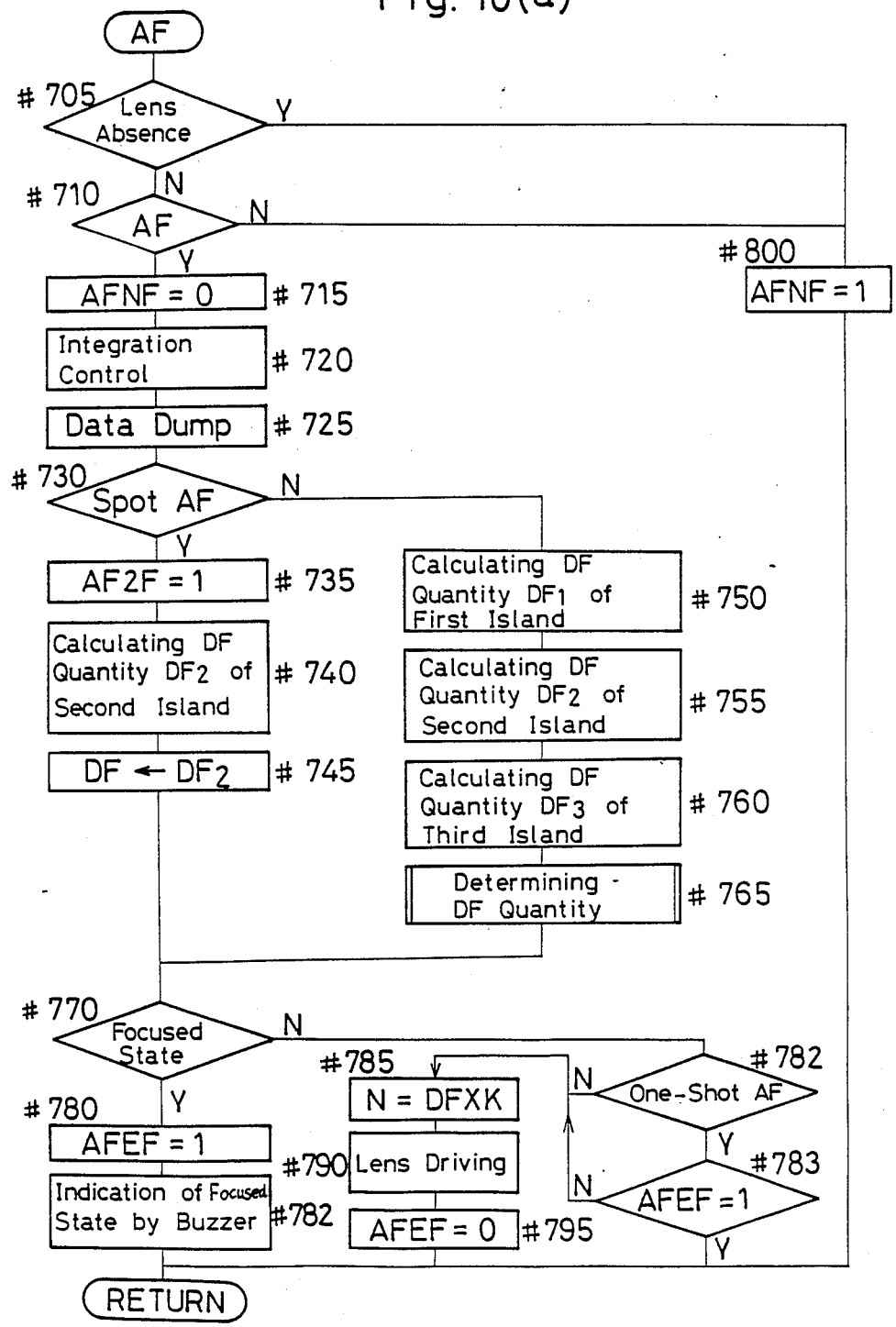
FIG. 10(a) is a flowchart showing a AF routine and FIG. 10(b) is a flowchart showing a routine determining the quantity of defocus in the flowchart shown in FIG. 10(a).
Figure 10B:
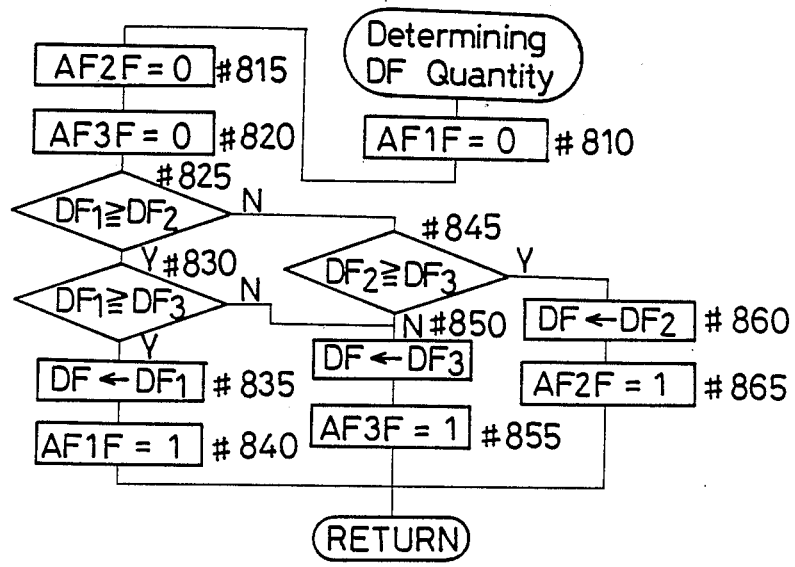
Figure 11:
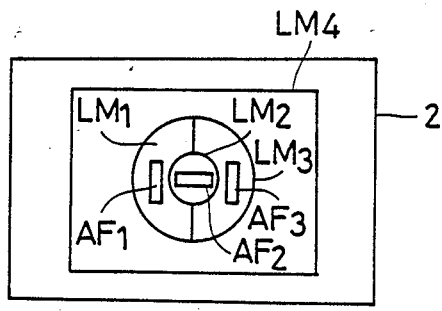
FIG. 11 is a view showing the distance measuring range and the photometric range in the photographing image plane.

Here, description is made on the above-described AF control based on flowcharts as shown in FIG. 10(a) and FIG. 10(b) in reference to FIG. 11 showing the focus condition detecting range in the photographing image plane. Photometric range is also described in this description.

First, in FIG. 11, an outside rectangle 2 shows the photographing image plane. Symbols $LM_1$ to $LM_4$ therein show photometric ranges, and symbols $AF_1$ to $AF_3$ show focus condition detecting ranges. Description is made for the focus condition detecting range. In the camera, change-over of spot/multi-spot AF can be made, and when the spot AF is selected, the AF is performed based on information on a subject in the focus condition detecting range $AF_2$, and when the multi-spot AF is selected, the AF is performed so that a subject nearest to the camera is focused by selecting one range corresponding to the nearest subject from among the above-mentioned three ranges $AF_1$ to $AF_3$. Accordingly, on the multi-spot AF, the area for detecting the focus condition is larger or wider than that on the spot AF. Hereinafter, the $AF_1$ is referred to as the first island, the $AF_2$ as the second island, and the $AF_3$ as the third island, respectively.

Description is made for AF control as shown in a flowchart of FIG. 10(a). First, it is judged whether or not the lens has been attached based on a signal inputted from the lens to the micro-computer μC (#705). Next, where the lens has been attached, it is judged in accordance with the level of a terminal $IP_{10}$ whether or not the focus condition adjusting mode is the AF mode (#710). Then, where the lens has not been attached in step #705, or the mode is not the AF mode in step #710 (namely, manual focusing mode, $IP_{10}$="H" level), the flag AFNF showing that AF is not performed is set (#800), and processing returns.

On the other hand, when the AF mode is selected ($IP_{10}$="L" level), the flag AFNF for showing that AF is not performed is reset (#715). The micro-computer μC controls storage (integration) of charges generated in a plurality of CCD, which is prepared for detecting focus condition with respect to each island, responding to the quantity of incident light (#720). After completing the integration, the micro-computer inputs data obtained by A-D-converting the value of integration (#725). Then, it is judged whether or not the mode is the spot AF (judged based on function data $Fb_2$) in step #730, and if the spot AF is selected ($Fb_2$=1), a flag AF2F for showing that AF is performed based on the second island is set, and a quantity of defocus $DF_2$ of the second island is calculated from the inputted data, and a value obtained by this calculation is set as the quantity of defocus for driving the lens (#735-#745).

On the other hand, where the multi-spot AF mode is selected, the quantities of defocus of the first, the second and the third islands are calculated respectively, and the quantity of defocus for a subject nearest to the camera is determined among the above-mentioned quantities (#750-#765). FIG. 10(b) shows a subroutine of determining this quantity of defocus. For FIG. 10(b), it should be noted that the quantity of defocus is represented with negative sign in the case of front focus, and the quantity is represented with positive sign in the case of rear focus, and the absolute values thereof represent the magnitudes of defocus. It is possible to determine the quantity of defocus of the subject nearest to the camera by detecting the largest quantity of defocus among the quantities of defocus of the three islands. The main subject is considered to be located in that island corresponding to the largest quantity of defocus.

In FIG. 10(b), first, the micro-computer μC resets flags AF1F to AF3F showing the island, detects the island of the largest quantity of defocus, sets the detected quantity of defocus of the island as the quantity of defocus for driving the lens, and sets one of the above-described flags AF1F to AF3F responding to that island, and returns (#810-#865).

Reverting to FIG. 10(a), the micro-computer μC judges whether or not the subject is in the focused state (or infocus state) based on the quantity of defocus for driving the lens (#770), and when it is in the focused state, sets a flag AFEF showing the focused state (#780). Then, a buzzer BZ is sounded for predetermined time to notify this (#782), and processing returns. When the subject is not in the focused state in step #770, judgment is made based on data $Fb_8$ (as described later) on whether the mode is one-shot AF (when focused once, the lens driving thereafter is stopped, and at this time focus condition detection may be also stopped) or continuous AF (follows the subject after focusing, and lens driving is performed continuously responding to the obtained quantity of defocus) (#782). In the case of one-shot AF ($Fb_8$=0), it is judged whether or not the flag AFEF showing the focused state has been set in step #783, and if it has been set, processing returns. Where it has not been set or in the case of continuous AF ($Fb_8$=1), processing proceeds to step #785, and control of lens driving is performed. In step #785, a quantity N of lens drive is calculated by multiplying the quantity of defocus DF by the value K, and subsequently, the lens is driven in step #790, and the flag AFEF showing the focused state is reset in step #795, and processing returns. In addition, the lens drive in this step #790 is performed in a manner that the lens driving circuit LECN drives the lens based on a value corresponding to the above-mentioned quantity N·K of lens drive.

Reverting to FIG. 6 again, the micro-computer μC controls changes of various data by operations of various key switches (#440).

Figure 12:
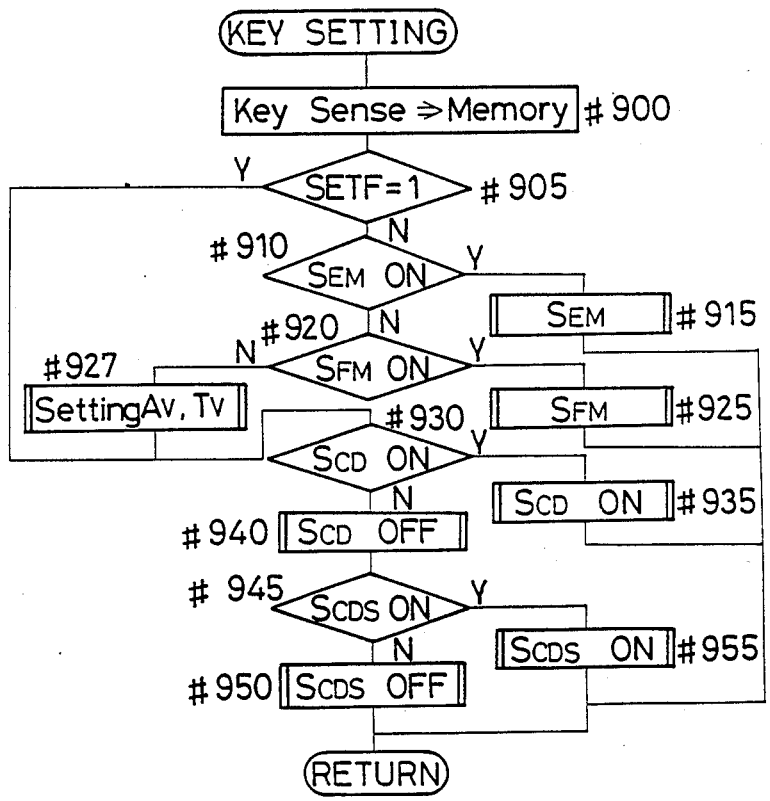
FIG. 12 is a flowchart showing a setting routine of keys installed in the camera.

This is described based on FIG. 12. First, the state of each key switch is detected, and is stored in a memory (#900). Next, judgment is made on whether or not the flag SETF showing the card setting mode has been set (#905). And when the flag SETF has been set, processing proceeds to step #930 so that an exposure mode change and a function change are not performed. When the flag SETF has not been set, processing proceeds to step #910, and the micro-computer μC judges whether or not the exposure mode changing switch $S_{EM}$ has been turned to ON. Here, when the switch $S_{EM}$ has been turned to ON, processing proceeds to a subroutine of this change (#915), and returns (as detailed later). When the above-mentioned switch $S_{EM}$ has not been turned to ON, processing proceeds to step #920, and the micro-computer μC judges whether or not the function changing switch $S_{FM}$ has been turned to ON. Then, when this switch $S_{FM}$ has been turned to ON, processing proceeds to a subroutine of this change (#925), and returns.

Here, FIG. 13 and FIG. 14 respectively show the above-mentioned two subroutines, which are described as follows. First, in the case of the exposure mode change, processing proceeds in a sequence of P→A→S→M→P (return) cyclically every time the up switch $Sup_1$ or $Sup_2$ is turned to ON, and proceeds in a sequence reverse to the above-mentioned upward direction of P←A←S←M←P cyclically every time the down switch $Sdn_1$ or $Sdn_2$ is turned to ON, and the change is made responding to the exposure mode set by the IC card CD, and the mode not selected is jumped over.

Figure 13:
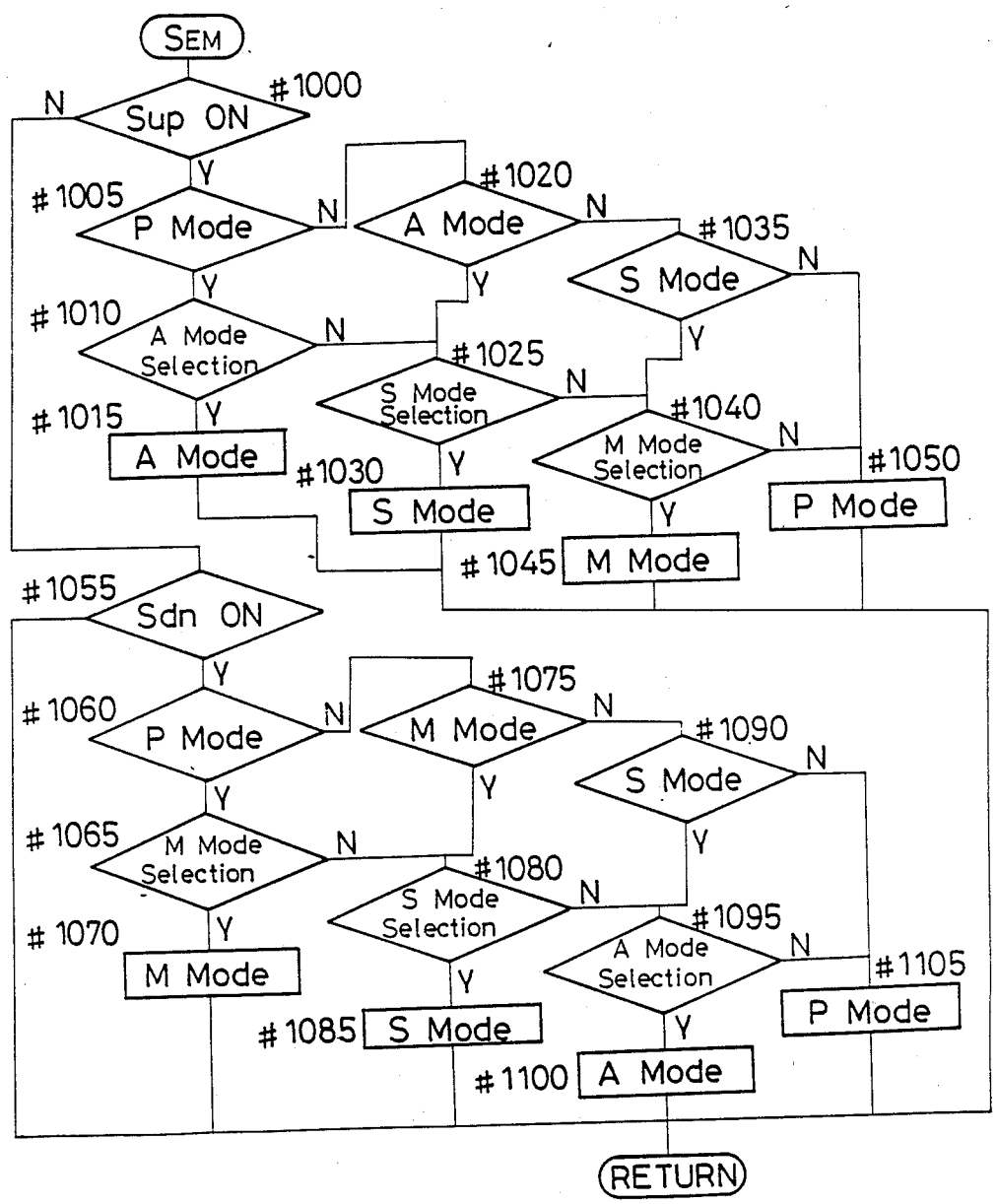

This is described in reference to FIG. 13. In step #1000, the micro-computer μC judges whether or not the up switch $Sup_1$ or $Sup_2$ has been turned to ON, and when it has not been turned to ON, processing proceeds to step #1055. When it has been turned to ON, processing proceeds to step #1005, and $Fb_0$ and $Fb_1$ of the function data Fbn of the RAM are checked up, and judgment is made on whether or not the P mode has been set at present as the controlled exposure mode, and where it has been set, processing proceeds to step #1010, and whether or not the A mode has been selected by the IC card is judged through $MSb_6$ to $MSb_8$ of the $E^2$PROM (refer to Table 4), and if it has been selected, the exposure mode is changed from P to A, and the function data $Fb_0$ and $Fb_1$ are also changed from (0, 0) to (0, 1) in step #1015, and thereafter processing returns. In the above-mentioned step #1010, when it is judged that the A mode has not been selected by the IC card, processing proceeds to step #1025, and it is judged whether or not the S mode has been selected, and when the S mode has not been selected, processing further proceeds to step #1040, and it is judged whether or not the M mode has been selected. Thus, any mode selected by the card is searched for in sequence. Then, if any selected mode exists, it is set. Then, when the A, S and M modes have not been selected, that is, only the P mode has been selected forcibly (#1050).

Hereinafter, likewise, when the A mode has been set as the controlled exposure mode ($Fb_0$, $Fb_1 = 0, 1$), it is judged whether or not the S mode has been selected by the IC card, and when it has not been selected, it is judged whether or not the M mode has been selected, and the exposure mode is changed to the selected mode, and bits $Fb_0$ and $Fb_1$ are changed, and processing returns (#1020 to #1030).

Now, when the S mode has been set as the controlled exposure mode ($Fb_0$, $Fb_1 = 1, 1$), it is judged whether or not the M mode has been selected by the IC card, and where it has been selected, the M mode is set, and where it has not been selected, the P mode is set, and processing returns (#1035–#1045). When the S mode is not set as the exposure mode in step #1035, that is, when the M mode is set, next the P mode is set (#1050). This is because the P mode has been selected without fail in this embodiment.

When the down switch $Sdn_1$ or $Sdn_2$ has been turned to ON in step #1055, control is performed like the above-described up switch $Sup_1$ or $Sup_2$ except that the changing direction of the exposure mode differs, and therefore description thereon is omitted.

In addition, when both of the switches Sup and Sdn are in the OFF state, processing returns without performing anything.

Figure 14A:
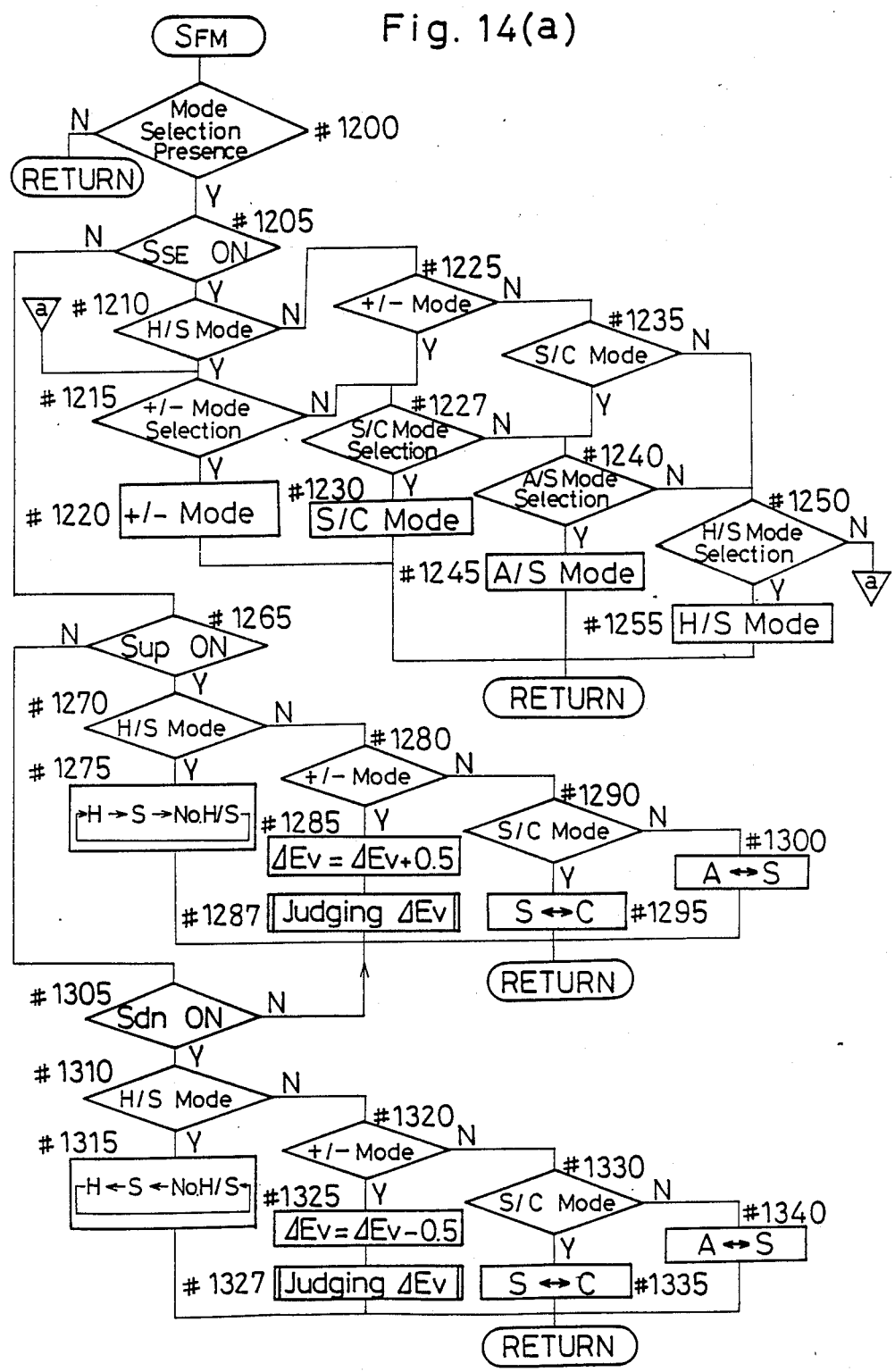

Next, description is made on the control when the function changing switch $S_{FM}$ is turned to ON in reference to FIG. 14(a). The micro-computer μC detects by bits $MSb_0$–$MSb_3$ of the $E^2$PROM whether at least one function has been selected among the above-mentioned four functions, namely, highlight/shadow (H/S), exposure adjustment (±), one-shot/continuous-shot (S/C) and spot AF/multi-spot AF (S/A). And where none of these bits has been set, it is assumed that no mode selection has been made, and processing returns (#1200). Where at least one bit has been set, it is assumed that at least one mode has been selected, and processing proceeds to the flow of step #1205 and subsequent steps wherein data is to be changed. The micro-computer μC judges whether or not the switch $S_{SE}$ selecting the function to be changed has been turned to ON, and when it has been turned to ON, search of the function to be changed proceeds in a sequence of H/S→±→S/C→S/A→H/S (return) cyclically, and jumps the function which has not been selected by the IC card. In step #1210, when the function to be changed shows the H/S mode ($CDb_0$, $CDb_1$, $CDb_2$ of RAM data as shown in Table 5 = 0, 0, 0), whether or not the ± mode has been selected by the IC card is judged based on the bit $MSb_1$ of the $E^2$PROM, and when the ± mode has been selected, the data change mode of the ± mode is set, and data $CDb_0$, $CDb_1$, $CDb_2 = 0, 0, 1$ is set (#1220), and then processing returns. When the ± mode has not been selected, processing proceeds to step #1227, and it is judged whether or not the S/C mode has been selected based on $MSb_2$, and when this has not been selected also ($MSb_2=0$), processing proceeds to step #1240, and whether or not the A/S mode has been selected is judged based on $MSb_3$, and when this has not been selected also ($MSb_3=0$), processing further proceeds to step #1250, and whether or not the H/S mode has been selected is judged ($MSb_0$). Now, in the embodiment at least the H/S mode has been selected, and therefore $CDb_0$, $CDb_1$, $CDb_2 = 0, 0, 0$ is set to change the function of the H/S mode. When the S/C mode and the A/S mode have been selected, $CDb_0$ to $CDb_2$ are set to set them as the modes to be changed. Hereinafter, likewise, judgment is made on whether or not the mode following the mode presently set as the mode of the function to be changed (if the H/S mode set, then the ± mode, if the ± mode set, then the S/C mode, if the S/C mode set, then the S/A mode, and if the S/A mode set, then the H/S mode) has been selected by the card, and if it has been selected, the mode is set as the mode to be changed, and when it has not been selected, the function selected by the IC card is searched for in a sequence of H/S→±→S/C→S/A→H/S..., and the selected function is assumed to be the function to be changed, and data $CDb_0$ to $CDb_2$ are set, and processing returns.

As is understood from the above, the mode which has not been selected in advance by the card is jumped over as to the change of the mode. For example, where two modes, ± and S/C, which can be changed are selected, the flow goes to step #1225 when the function change switch $S_{FM}$ is depressed. And when the ± mode is presently set, processing proceeds to step #1227, and the S/C mode becomes the mode to be changed. This means that the triangle cursor moves from ± to S/C on the display. Subsequently, when the function change switch $S_{FM}$ is depressed again, the flow goes to step #1235, and then proceeds sequentially to step #1215 through the step #1240 and #1250, and the ± mode becomes the mode to be changed, and the cursor on the display moves to ±. In this case, the H/S mode and the A/S mode have not been selected, therefore being jumped over substantially as to the setting of the mode to be changed.

In step #1205, where the switch $S_{SE}$ has not been turned to ON, processing proceeds to step #1265. In step #1265, it is judged whether or not the up switch $Sup_1$ or $Sup_2$ has been turned to ON, and when it has been turned to ON, what is the function to be changed now is judged based on data $CDb_0$ to $CDb_2$. If it is the H/S mode, the mode which has been set now is detected based on data $Fb_6$ and $Fb_7$, and data $Fb_6$ and $Fb_7$ are set to move to the next mode (→H→S→ no H/S in a cyclic order) (#1270, #1275), and processing returns.

If the function is of the ± mode, 0.5 is added to a quantity of exposure adjustment ΔEv in step #1285, and processing proceeds to a subroutine for judging the magnitude thereof. FIG. 14(b) shows this subroutine. In FIG. 14(b), if the quantity of adjustment ΔEv is positive, data $Fb_4$, $Fb_5$=0, 1 is set as a positive side adjustment, and if it is a negative side adjustment, data $Fb_4$, $Fb_5$=1, 0 are set, and further if the adjustment is zero, data $Fb_4$, $Fb_5$=0, 0 are set as no adjustment, and processing returns (#1350–#1370).

Reverting to FIG. 14(a), in the case of the S/C mode, whether or not the present mode is of one-shot(s) or continuous-shot is judged based on data $Fb_3$, and the data is changed so that the mode becomes the other mode (#1295), and processing returns. When the mode is not any of the above-mentioned three modes (the H/S mode, the ± mode, and the S/C mode), that is, when present mode is the A/S mode, it is judged through data $Fb_2$ whether the present mode is of spot AF (S) or multispot AF (A), and the data $Fb_2$ is changed so that the mode becomes the other mode (#1300), and processing returns.

When the up switch $Sup_1$ or $Sup_2$ has not been turned to ON in step #1265, processing proceeds to step #1305, and it is judged whether or not the down switch $Sdn_1$ or $Sdn_2$ has been turned to ON, and when it has not been turned to ON, processing returns. Where it has been turned to ON, the flow is like the flow when the above-described up switch $Sup_1$ or $Sup_2$ has been turned to ON except that when the mode in the H/S mode is changed the sequence order of the change thereof is reverse (←H←S← no H/S←), and except that if the mode is ±, then 0.5 Ev is subtracted from the quantity of exposure correction ΔEv (#1310–#1340). Accordingly description thereon is omitted.

Reverting to FIG. 12, both of the exposure mode change switch $S_{EM}$ and the function changing switch $S_{FM}$ are in the OFF state, processing proceeds to step #927 and executes a subroutine of changing the diaphragm aperture value Av and the shutter speed Tv by the up switches $Sup_1$ and $Sup_2$ and the down switches $Sdn_1$ and $Sdn_2$.

Figure 21A:
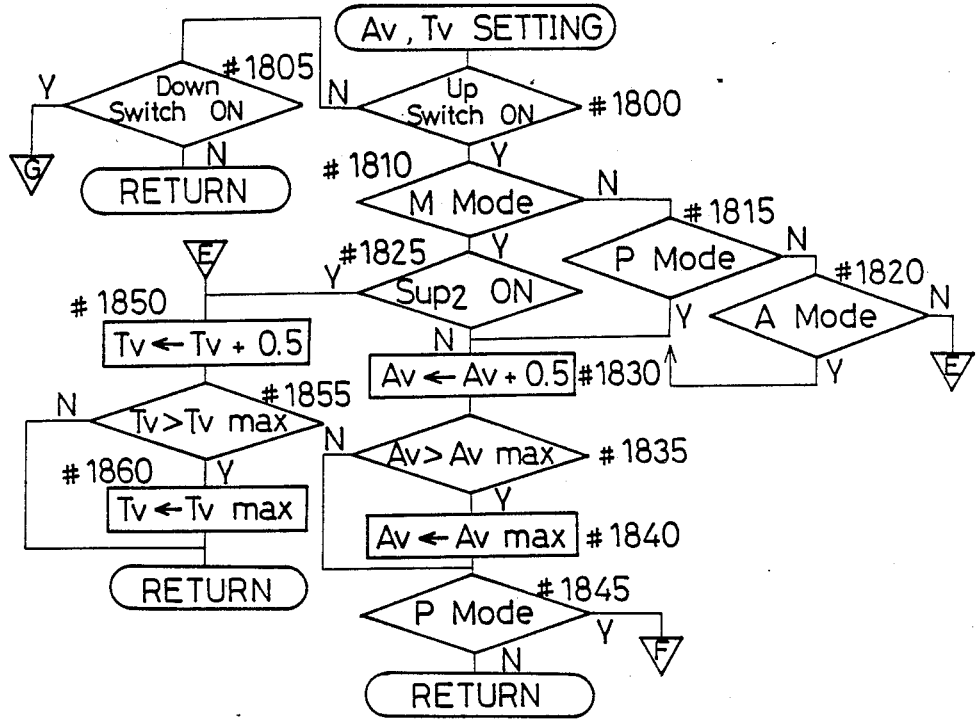
FIGS. 21(a) and 21(b) are flowcharts showing a routine setting the diaphragm aperture value and the shutter speed.
Figure 21B:
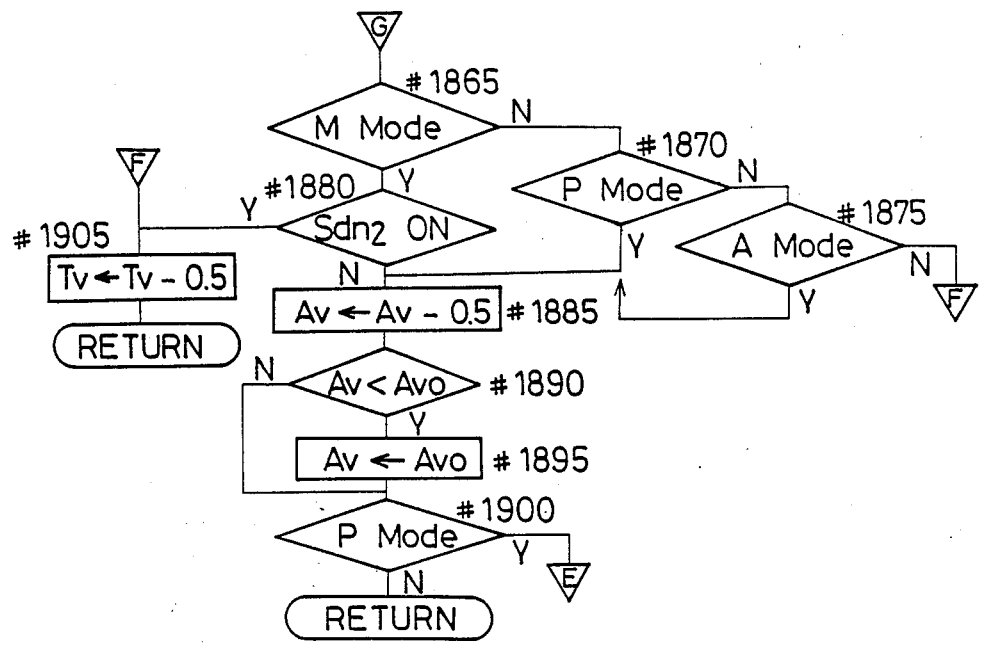
Figure 22:
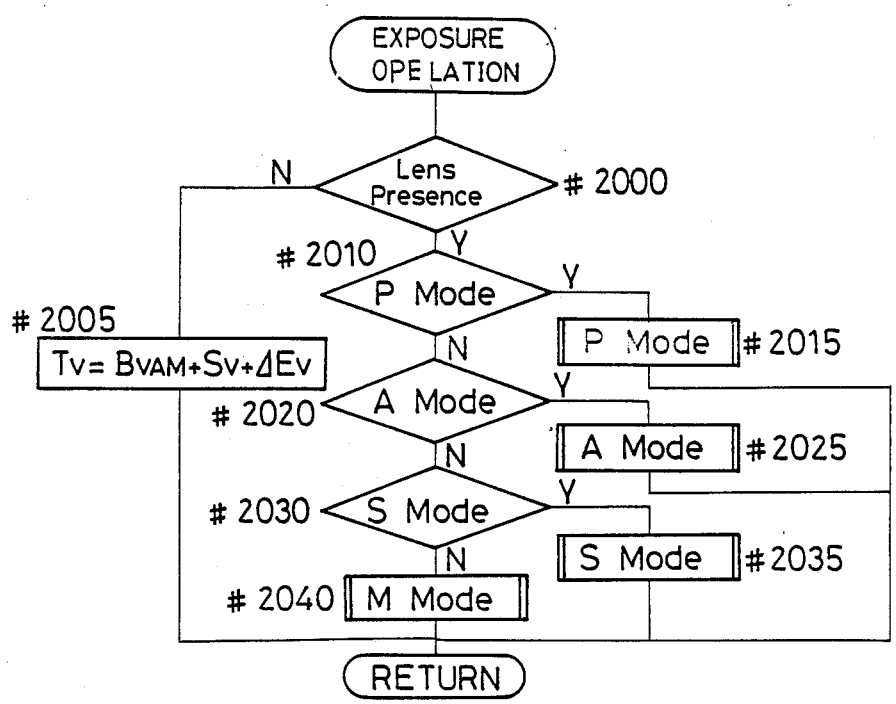
FIG. 22 is a flowchart showing a routine of exposure operation.

FIGS. 21(a) and 21(b) show this subroutine. In this subroutine, first, the micro-computer μC judges whether or not the up switch $Sup_1$ or $Sup_2$ has been turned to ON in step #1800, and when it has not been turned to ON, processing proceeds to step #1805, and it is judged whether or not the down switch $Sdn_1$ or $Sdn_2$ has been turned to ON, and when it has not been turned to ON, processing returns. When the up switch $Sup_1$ or $Sup_2$ has been turned to ON, processing proceeds from step #1800 to step #1810, and it is judged whether or not the M mode has been set. When the M mode has been set ($Fb_0$, $Fb_1$=1, 0), whether or not the second up switch $Sup_2$ has been turned to ON is judged (#1825). When it has been turned to ON, it is assumed that the shutter speed Tv is to be changed and 0.5 Ev is added to the present shutter speed Tv to set a new value of shutter speed Tv, and judgment is made on whether or not this new value exceeds a maximum shutter speed Tvmax controllable in the camera (#1850, #1855). When the new value exceeds this maximum value, the maximum shutter speed Tvmax is set as the shutter speed Tv (#1860), and when it does not exceed, processing returns while performing nothing.

When the second up switch $Sup_2$ has not been turned to ON, that is, when the first up switch $Sup_1$ has been turned to ON in step #1825, it is assumed to be the diaphragm aperture value change mode, and 0.5 Ev is added to the diaphragm aperture value Av in step #1830, and judgment is made on whether or not this value exceeds a maximum controllable diaphragm aperture value Avmax (#1835). When it exceeds the maximum diaphragm aperture value, the maximum diaphragm aperture value Avmax is set as the diaphragm aperture value Av (#1840), and processing proceeds to step #1845. When it does not exceed, processing proceeds to step #1845 without performing anything. In step #1845, whether or not the P mode has been set is judged, and when the P mode has been set, processing proceeds to step #1905 of the flowchart in FIG. 21(b), and the shutter speed Tv is reduced by 0.5 Ev. When the P mode has not been set, processing returns.

When the M mode has not been set in step #1810, processing proceeds to the flow of step #1815 and step #1820, and it is judged whether or not the P mode or the A mode has been set, and if the mode is either of the P mode and the A mode ($Fb_0$, $Fb_1$=0, 0 or 0, 1), processing proceeds to step #1830, and the micro-computer μC performs up control of the diaphragm aperture value Av. However, if the mode is neither of them, that is, it is the S mode ($Fb_0$, $Fb_1$=1, 1), processing proceeds to step #1850, and the micro-computer μC performs up control of the shutter speed Tv.

When the down switch $Sdn_1$ or $Sdn_2$ has been turned to ON in step #1805, processing proceeds to step #1865 in FIG. 21(b). And the micro-computer μC judges whether or not the M mode has been set, and when the M mode has been set ($Fb_0$, $Fb_1$=1, 0), it judges whether or not the second down switch $Sdn_2$ has been turned to ON (#1880). Where the second down switch $Sdn_2$ has been turned to ON, 0.5 Ev is subtracted from the shutter speed Tv. When the second down switch $Sdn_2$ is in the OFF state, 0.5 Ev is subtracted from the diaphragm aperture value Av in step #1885. Subsequently, in step #1890, judgment is made on whether or not this value is smaller than an open diaphragm aperture value $Av_0$, and when it is smaller, the diaphragm aperture value is set to the open diaphragm aperture value $Av_o$ (#1895). Subsequently, it is judged whether or not the P mode has been set in step #1900. In the above-mentioned step #1890, when the diaphragm aperture value Av is not smaller than the open diaphragm aperture value $Av_o$, processing skips step #1895 and goes to step #1900. If the P mode has been set in step #1900, processing proceeds to the up control flow (#1850 to #1860) of the diaphragm aperture value in FIG. 21(a) as described above, and if not the P mode, returns.

When the M mode has not been set in step #1865, whether the P mode or A mode has been set is judged sequentially in steps #1870 and #1875, and if the P mode or A mode has been set, processing proceeds to the flow of performing down control of the diaphragm aperture value of step #1885 and the subsequent steps, and if not so, the mode is assumed to be S mode, and processing proceeds to step #1905, and performs down control of the shutter speed.

Reverting to FIG. 12, after passing through the step #927 showing a subroutine of changing the diaphragm aperture value Av and the shutter speed Tv as described above, or after the judgment that the flag showing the card setting mode has been set in step #905, processing proceeds to step #930. In this step #930, judgment is made on whether or not the normally-opened switch $S_{CD}$ enabling/disabling the function set by the card has been turned to ON, and when it has been turned to ON, processing proceeds to a subroutine of card function enable/disable switch ON ($S_{CD}$ ON) in step #935.

This is described based on FIG. 15. First, in step #1400, whether or not the IC card CD has been attached to the camera body is judged based on data $CKb_o$, and when IC card has not been attached ($CKb_o = 0$), processing returns immediately. When the mode setting card has been attached, the card function enable/disable switch $S_{CD}$ is operated, and judgment is made on whether or not a flag CDF showing that processing has passed through this flow once has been set (#1405). When it has been set, it is assumed that changeover of enable/disable has been already finished, and processing returns. When it has not been set, processing proceeds to the following step #1410. In step #1410, the micro-computer sets this flag CDF, and subsequently judges a flag CDFNF showing that the card function is enabled or disabled in step #1415, and when it has not been set, it is set to enable the card function (#1420), and when it has been set, it is reset to disable the card function (#1425), and processing returns. Description on the flow when the card function enable/disable switch $S_{CD}$ is in the ON state in the judgment in step #930 in FIG. 12 has been made according to FIG. 15 as described above, but when the card function enable/disable switch $S_{CD}$ is in the OFF state in the above-mentioned step #930, processing proceeds to step #940.

Next, description is made on the flow of this step #940 in reference to FIG. 16. First, in step #1450, whether or not the IC card has been attached is judged, and when no IC card has been attached (data $CKb_o = 0$), processing returns, and when the IC card has been attached ($CKb_o = 1$), processing proceeds to step #1455, and the micro-computer μC judges whether or not the flag CDF showing that processing has passed once through the flow of the above-described step #1405 and the following steps in FIG. 15 has been set, and when this flag CDF has been set, the micro-computer μC resets this flag in step #1460 and returns, and when the flag CDF has not been set, processing returns intact.

Reverting to FIG. 12, next, the micro-computer μC judges ON or OFF of the card data setting switch $S_{CDS}$ in step #945, and when this switch is in the ON state or the OFF state, processing passes through step #955 or step #950 relating to control of each subroutine, and returns. This is shown in FIG. 17 and FIG. 18 to be explained.

Figure 17:
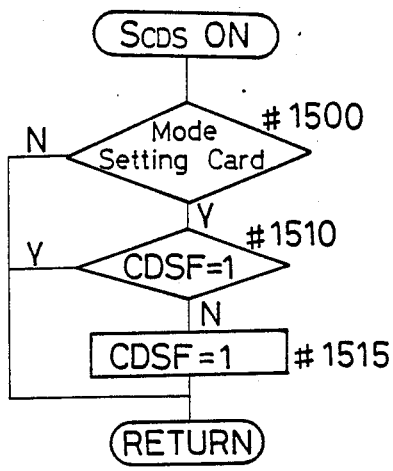

First, FIG. 17 shows a subroutine when the switch $S_{CDS}$ has been turned to ON, and in step #1500 thereof, the micro-computer μC judges whether or not the mode setting card has been attached, and when the card has not been attached ($CKb_1$ to $CKb_6 \neq 00_H$), processing returns immediately. When the mode setting card has been attached ($CKb_1$ to $CKb_6 = 00_H$), judgment is made on whether or not a flag CDSF showing that processing has passed through this flow once is set (#1510), and when the flag has not been set, this is set (#1515), and when the flag has been set, processing skips step #1515 and returns.

Figure 18:
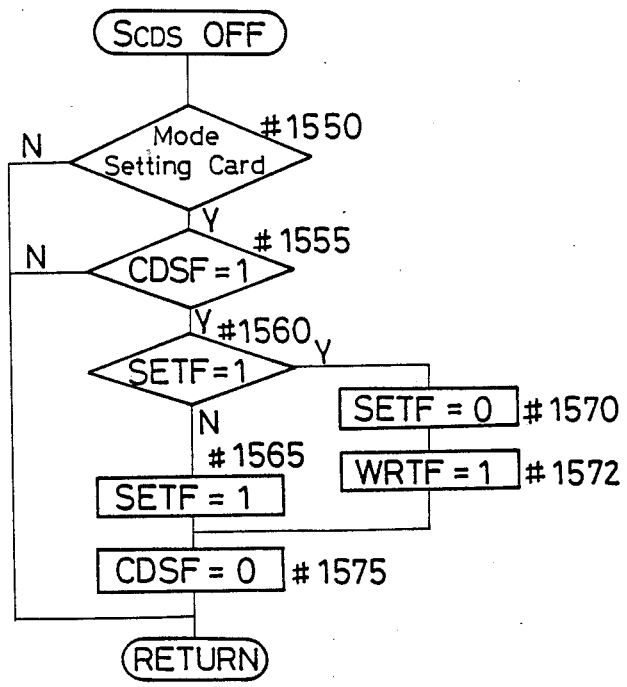

Next, description is made for a subroutine when the above-mentioned switch $S_{CDS}$ is in the OFF state as shown in FIG. 18. First, whether or not the mode setting card has been attached is judged in step #1550, and when it has not been attached ($CKb_1$ to $CKb_6 \neq 00_H$), processing returns. Even where it has been attached ($CKb_1$ to $CKb_6 = 00_H$), when the flag CDSF has not been set in step #1555, processing returns. The flag CDSF shows that the switch $S_{CDS}$ has been operated and the flow of this ($S_{CDS}$ ON) has been executed has been set. When the flag CDSF has been set, it is judged whether or not the flag SETF which indicates the state of the switch $S_{CDS}$ for determining the entering to data setting has been set in step #1560. When the flag SETF has been set, it is reset in step #1570, and subsequently in step #1572, a flag WRTF showing data write to the $E^2PROM$ is set. Then, the flag CDF is reset to release the data setting mode in step #1575. When the flag SETF has not been set, this flag SETF is set for transition to the data setting mode (#1565), and the flag CDSF is reset (#1575), and processing returns.

Figure 19:
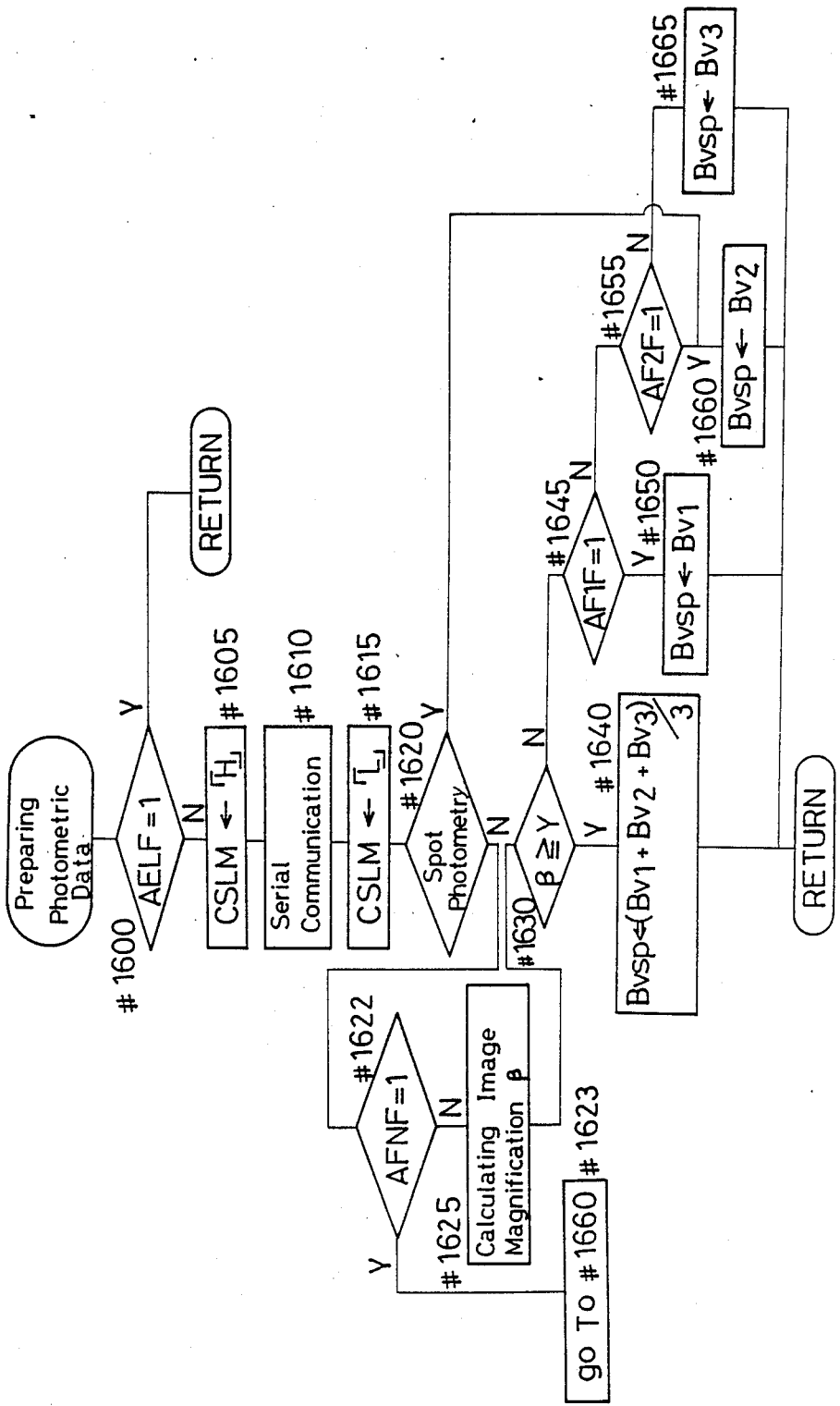
FIG. 19 is a flowchart showing a routine preparing photometric data.

On completing the control of setting as shown in FIG. 12 as described above, the micro-computer μC proceeds from step #440 to step #442 in FIG. 6, and judges whether or not the flag SETF showing attachment of the IC card and the data setting mode has been set. If it has been set, processing proceeds to step #455 and executes a routine of card data communication II as described later. If the flag SETF has not been set, processing proceeds to step #445, and photometric data is inputted into the micro-computer μC from the photometric circuit LM, and a spot photometric value which is obtained on $LM_2$ used for exposure is prepared. Here, description is made for the photometric value in reference to the photometric range as shown in FIG. 11 and the flowchart about photometric data of the micro-computer as shown in FIG. 19. In FIG. 19, first, the micro-computer μC judges whether or not the flag AELF showing AE lock has been set in step #1600, and when the flag AELF has been set, processing returns without performing renewal of the photometric value.

When the flag AELF has not been set, a terminal CSLM is set to the "H" level, and an instruction of output of photometric data is given to the photometric circuit LM, and serial communication is performed (#1605, #1610).

Luminance values $Bv_1$ to $Bv_4$ representative of four photometric ranges $LM_1$ to $LM_4$ as shown in FIG. 11 are inputted into the micro-computer μC by this communication. On completing the communication, the terminal CSLM is set to the "L" level (#1615).

Then, in the following step #1620, it is judged whether or not spot photometry has been selected, and when it has been selected ($Fb_{12}=1$), the luminance value $Bv_2$ of the photometric range $LM_2$ is set as a spot value Bvsp (#1660). When the mode is of multi-spot ($Fb_{12}=0$), processing proceeds from step #1620 to step #1622, and judgment is made on whether or not the flag AFNF showing that focus detection is impossible has been set, and when it has not been set, processing proceeds to the above-mentioned step #1660, and the small or narrow photometric range $LM_2$ at the center part is set as the spot value Bvsp, and processing returns. When the flag AFNF has been set, an image magnification β is calculated from β and focal length information inputted from the lens wherein β is ratio of focal length/distance based on distance information (#1625). Then, in the next step #1630, judgment is made on whether or not this image magnification β is not less than a predetermined value Y, and the magnitude of the subject occupying the photographing image plane is determined. If the calculated value is not less than the predetermined value, the subject is assumed to be large, and in step #1640, an average value of the luminance values $Bv_1$, $Bv_2$ and $Bv_3$ of the respective photometric ranges $LM_1$, $LM_2$ and $LM_3$ is regarded as a spot photometric value Bvsp, and processing returns.

Where the above-mentioned image magnification β is less than the predetermined value, the photometric range including the focus detection range used for detection of focus condition is set as the photometric value Bvsp of the main subject. In this embodiment, the focus detection range is discriminated by that which of the flags AF1F to AF3F showing the focus detection ranges has been set. So, if the flag AF1F has been set, the luminance value $Bv_1$ of the photometric range $LM_1$ is set, and if the flag AF2F has been set, the luminance value $Bv_2$ of the photometric range $LM_2$ is set, and if the third island $AF_3$ has been selected, the luminance value $Bv_3$ of the photometric range $LM_3$ is set respectively as the spot photometric value Bvsp (#1645–#1665).

Figure 20:
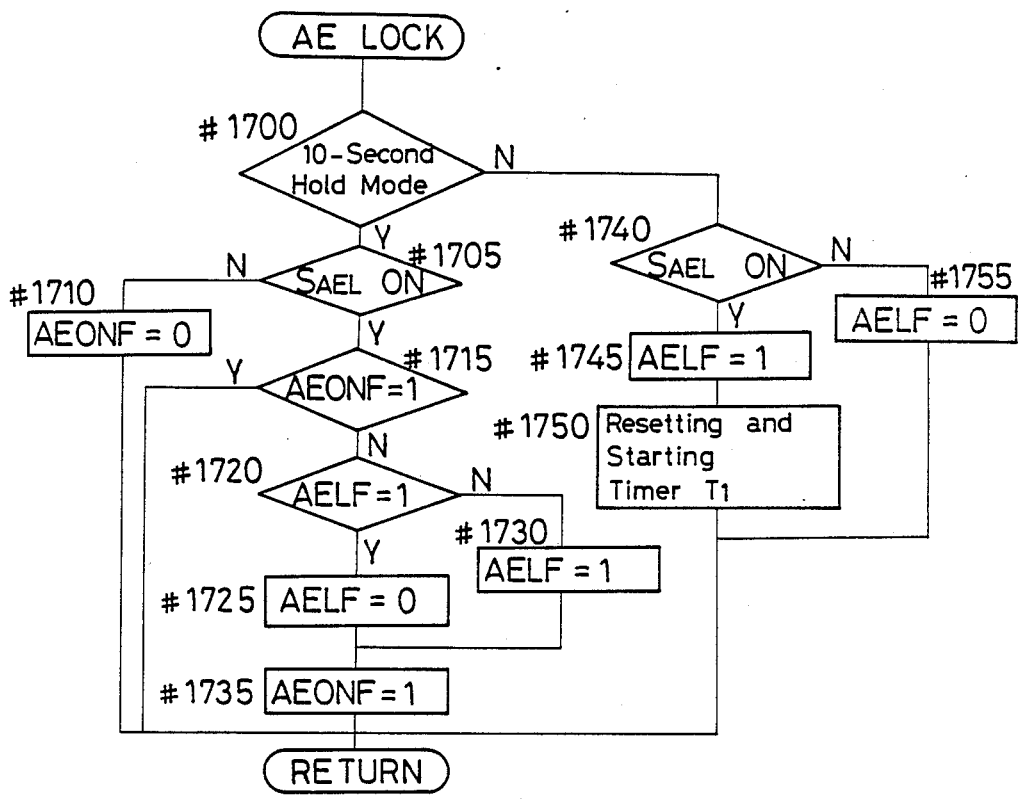
FIG. 20 is a flowchart showing a routine of AE lock.

On determining the spot photometric value in such a manner, in FIG. 6, processing proceeds to step #450, and performs the control relating to AE lock. This control is described in reference to a flowchart as shown in FIG. 20. It is noted that there are two modes; in the first mode once the AE locking switch $S_{AEL}$ is depressed, AE lock is applied and the AE lock is released by depressing the AE locking switch $S_{AEL}$ again or by releasing the power self-hold (10-seconds hold mode) and in the second mode the AE locked state is held only during depression of the AE locking switch, and these modes are selected by the IC card. In step #1700 of FIG. 20, first, the micro-computer μC judges which of the above-mentioned two modes has been set based on data $MSb_5$ of the $E^2PROM$, and when it is the first mode (the 10-second hold mode), proceeds to step #1705, and judges whether or not the AE locking switch $S_{AEL}$ has been turned to ON. Here, when the switch $S_{AEL}$ has not been turned to ON, the micro-computer μC resets a flag AEONF in step #1710 and returns. The flag AEONF shows that the AE locking switch has been operated and the flows of step #1705 and the subsequent steps have been executed.

When the AE locking switch $S_{AEL}$ has been turned to ON in step #1705, whether or not the above-mentioned flag AEONF has been set is judged in step #1715, and when it has been set, processing returns immediately. When it has not been set, processing proceeds to step #1720, and judgment is made on whether or not the flag AELF showing that AE lock operation is activated has been set. And when the flag AELF has not been set, it is assumed that an operation has been made to perform AE lock, and this flag is set (#1730) and processing proceeds to step #1735. When the flag AELF has been set, it is assumed that an operation has been made to release AE lock during operation, and the flag AELF is reset (#1725), and processing proceeds to step #1735. In step #1735, the flag AEONF is set. Thereafter processing returns.

In step #1700, when the mode is not the 10-second hold mode, in step #1740, judgment is made on whether or not the AE lock switch $S_{AEL}$ has been turned to ON, and when it has not been turned to ON, the flag AELF is reset (#1755). When it has been turned to ON, a flag $AELF_1$ is set (#1745), and the timer $T_1$ for holding power is reset and started (#1750), and processing returns. Thus, when the AE locking switch $S_{AEL}$ has been turned to ON, power is held for a certain time period.

In FIG. 6, on completing the control of this AE lock, the micro-computer μC performs a second-time communication with the card. This data communication is described in reference to FIG. 5(b). In step #325, the micro-computer μC judges whether or not the card has been attached, and where it has not been attached ($CKb_o=0$), processing of the micro-computer returns without performing data communication. Where the card has been attached, the terminal CSCD is set to the "H" level (#330), and data is outputted to the IC card CD (#335) to show that the IC card is the input side. Thereafter, in step #340, judgment is made on whether or not the IC card attached to the camera is the mode setting card. Where it is the IC card of data setting card ($CKb_o$–$CKb_6=00_H$), switch data stored in step #900 in FIG. 12 is set to a register (#344), and serial communication is performed (#348), and switch information is outputted to the IC card CD. Thereafter, the terminal CSCD is set to the "L" level (#350), and processing returns.

Where the card is the program card ($CKb_1$–$CKb_6=01_H$), data for exposure operation, flash data and lens data which are required for exposure operation are set (#346), and serial communication is performed (#348), and these data are outputted to the IC card. Thereafter the terminal CSCD is set to the "L" level (#350). The second-time data communication is thus completed, and processing returns.

In addition, the data for exposure operation include the photometric values $B_{VS}$ and $B_{VAN}$, a film speed Sv and data showing a positive or negative film. The lens data include the focal length data, the smallest aperture value Avo, and the maximum diaphragm aperture value Avmax. And the flash data include data showing forced flashlight emission or auto flashlight emission, data showing that flashing unit is not attached yet (including power-OFF), guide number GN and data of completion or non-completion of charging.

In FIG. 6, on completing the above-described data communication II, the micro-computer μC proceeds to step #460, and performs exposure operation.

Description is made for the flow of this control according to FIG. 22–FIG. 26. First, in the step #2000 of FIG. 22, the micro-computer μC judges whether or not the lens has been attached based on the inputted lens data. When the lens has not been attached, the micro-computer μC adds the film speed Sv and the exposure adjustment value ΔEv to the photometric value $B_{VAM}$ of the photometric range LM4 (in place of this, a value averaging the whole may be used), and thereby calculates the shutter speed Tv like the manner of stopped-down-aperture metering, and returns (#2005). Where the lens has been attached, it performs an exposure operation responding to each exposure mode (#2010–#2040). Then, description is made for exposure operation of the P mode according to FIGS. 23(a) to 23(c). First, in step #2100 in FIG. 23(a), the micro-computer μC discriminates the against-the-light state by judging whether or not the difference between the photometric value $B_{VAM}$ of the photometric range LM4 and the spot photometric value $B_{VSP}$ obtained in step #445 is not less than 2Ev (#2100). If the difference is not less than 2Ev, it is judged whether or not the electric flash apparatus has completed preparation of light emission (the main condenser has been fully charged) in step #2105. Where preparation of light emission has been completed, a terminal FLOK is set to the "H" level (#2110) to make flashlight photographing possible, and a control exposure value Ev is evaluated from the photometric value $B_{VAN}$ of the photometric range LM4 and the like using Ev=B $_{VAM}$+Avo+Sv−1+ΔEv (#2115). Here, the reason why 1 is subtracted is that the background is raised by 1Ev to pretend the counter light. The main subject is intended to be exposed properly by a flashlight from the electric flash apparatus. Then, processing proceeds to a subroutine of a program I for determining the diaphragm aperture value Av and the shutter speed Tv, and returns. This subroutine is explained according to FIG. 23(b). A control value Tvc of the shutter speed is set to a x-synchronizing speed of Tv=7 (ss=1/125) in step #2200, and the diaphragm aperture value Av is calculated by subtracting 7 (shutter speed) from the exposure value Ev (#2205). And then whether or not this diaphragm aperture value is larger than 7 (F=11) is judged in step #2210, and when this value Av is larger, the controlled diaphragm aperture value Avc is limited to 7, and processing returns (#2215). When the diaphragm aperture value Av is 7 or less, it is judged whether or not the calculated diaphragm aperture value Av is smaller than the open diaphragm aperture value Avo (#2220). When the calculated value Av is smaller, the open diaphragm aperture value Avo is set as the control diaphragm aperture value Avc (#2225). When the calculated value Av is not smaller, the calculated value Av is set as the control diaphragm aperture value Avc (#2230). After one of steps #2215, #2225 and #2230, processing returns.

Figure 23A:
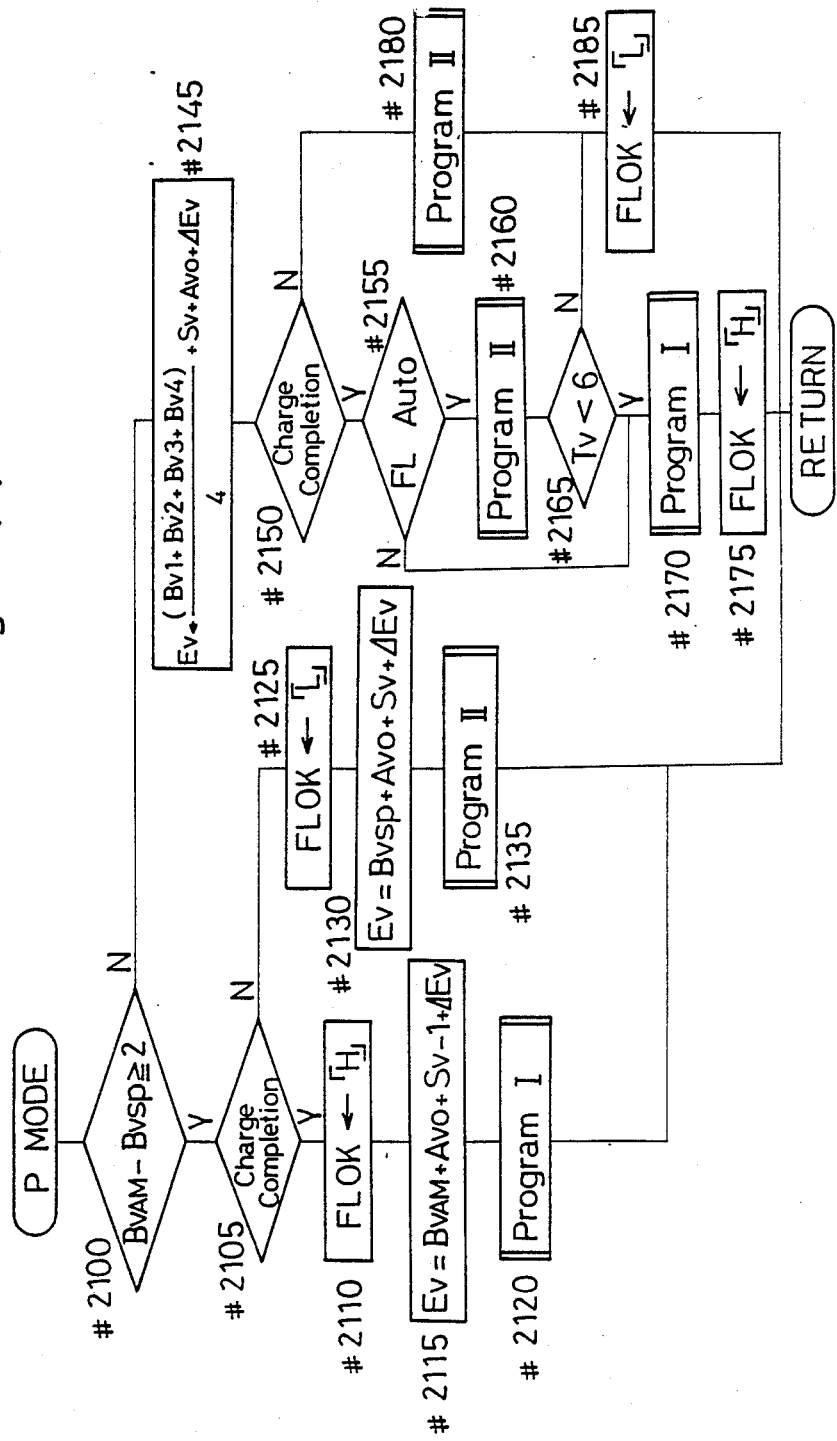
FIGS. 23(a) to 23(c), FIG. 24, FIG. 25 and FIG. 26 are flowcharts of the respective modes in the flowchart shown in FIG. 22.
Figure 23B:
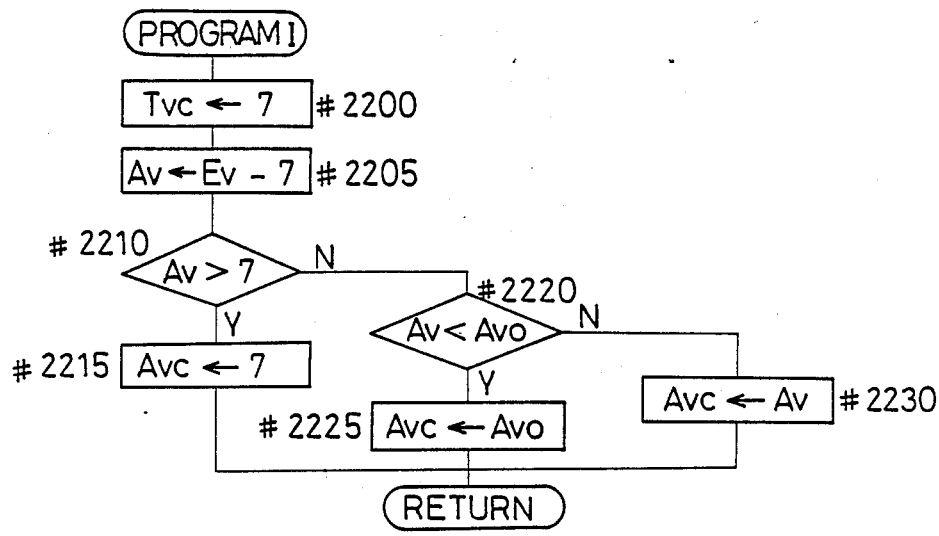

Reverting to FIG. 23(a), in step #2105, where the preparation of light emission of the electric flash apparatus FL has not been completed, the terminal FLOK is set to the "L" level (#2125). Then, in order to achieve a proper exposure of the main subject, the control exposure value Ev is evaluated by Ev=Bvsp+Avo+Sv+ΔEv using the spot value Bvsp of the photometric range and the like (#2130), and processing proceeds to a subroutine of a program II for evaluating the diaphragm aperture value Av and the shutter speed Tv, and returns.

Figure 23C:
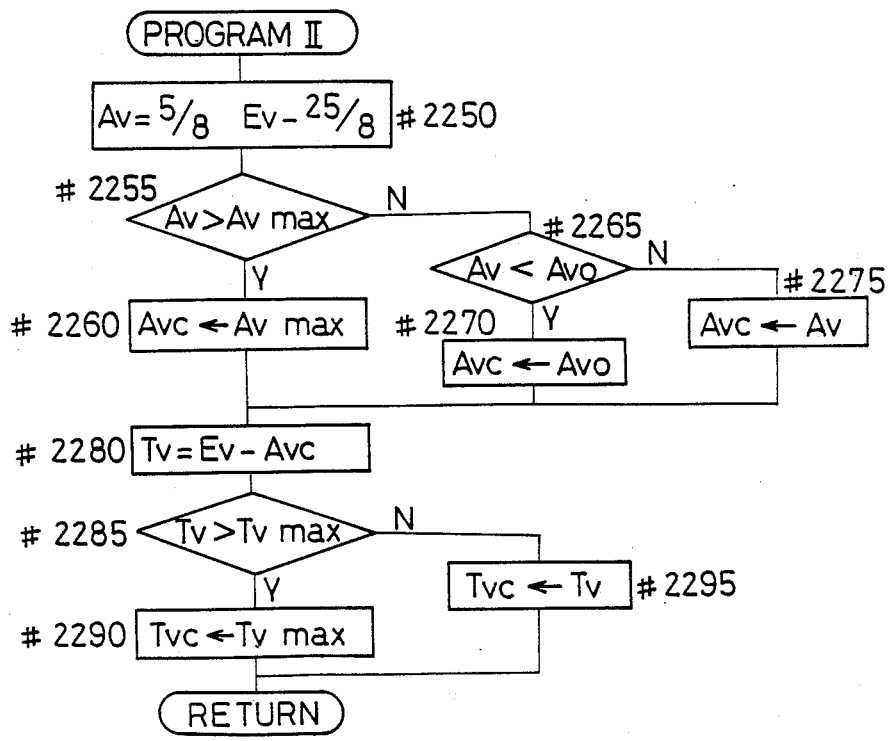

This subroutine is shown in FIG. 23(c) to be explained. First, in step #2250 of FIG. 23(c), the diaphragm aperture value Av is evaluated by Av=⅔Ev2⅓, and judgment is made on whether or not this diaphragm aperture value Av is larger than the maximum diaphragm aperture value Avmax of the lens (#2255). When the value Av is larger, the maximum diaphragm aperture value Avmax is set as the control diaphragm aperture value Avc (#2260), and processing proceeds to step #2280. When the diaphragm aperture value Av is not larger than the maximum diaphragm aperture value Avmax in step #2255, judgment is made on whether or not the diaphragm aperture value Av is smaller than the open diaphragm aperture value Avo (#2265), and when the value Av is smaller, the open diaphragm aperture value Avo is set as the control diaphragm aperture value Avc (#2270), and when the value Av is not smaller, the diaphragm aperture value Av is set as the control diaphragm aperture value Avc (#2275), and processing proceeds to step #2280, respectively.

In step #2280, the shutter speed Tv is calculated by subtracting the control diaphragm aperture value Avc from the exposure value Ev, and in the next step #2285, judgment is made on whether or not this value Tv is larger than a highest shutter speed Tvmax. When the value Tv is larger, the control shutter speed Tvc is limited to Tvmax (#2290), and when the value Tv is not larger, the shutter speed Tv is set as the control shutter speed, (#2295), and processing returns, respectively.

Reverting to FIG. 23(a), in step #2100, when the difference $B_{VAM}$−Bvsp is less than 2, it is assumed not to be the against-the-light state, and processing proceeds to step #2145, and the exposure value Ev is calculated from the average photometric value (Bv$_1$+Bv$_2$+Bv$_3$+Bv$_4$)/4 of the photometric ranges LM$_1$–LM$_4$, and whether or not the flash apparatus has completed preparation for light emission is judged (#2150).

When it has completed preparation for light emission, processing proceeds to step #2155, and judgment is made on whether or not the mode is the auto flashlight photographing mode of automatically judging whether or not flashlight photographing should be performed. Here, when it is the auto mode, the diaphragm aperture value Av and the shutter speed Tv are determined by the above-mentioned program II (#2160), and thereafter judgment is made on whether or not this shutter speed Tv is less than the blurring warning speed (Tv=6, 1/60) (#2165). Then, when the speed Tv is less than the blurring warning speed, processing proceeds to step #2170 to perform flashlight photographing assuming to be a low speed. When the mode is not the auto mode in step #2155, processing proceeds also to step #2170 to perform forced light emission. Then the diaphragm aperture value Av and the shutter speed Tv at flashlight photographing are determined by the program I, and subsequently the terminal FLOK is set to the "H" level (#2175) to make flashlight photographing possible.

However, when the preparation for light emission has not been completed, processing proceeds step #2150 through step #2180 to perform photographing by normal light, and the diaphragm aperture value Av and the shutter speed Tv are determined by the program II, and subsequently the terminal FLOK is set to the "L" level (#2185), and processing returns. Also, in the step #2165, when the shutter speed Tv is 6 or more (not less than the tuning speed), processing proceeds to step #2185 likewise, and returns.

Figure 24:
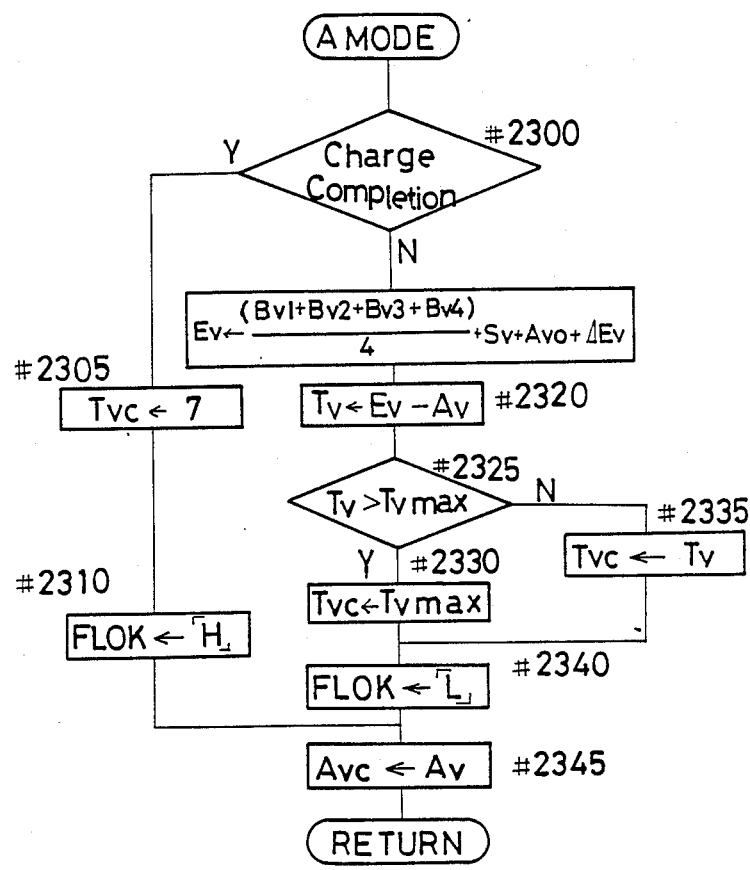

Next, description is made for a flowchart of determining the diaphragm aperture value Av and the shutter speed Tv in the A mode according to FIG. 24. First, judgment is made on whether or not the electric flash apparatus has completed preparation for light emission, and if preparation for light emission has been completed, the control shutter speed Tvc is set to 7 (1/125), the terminal FLOK is set to the "H" level, and the set diaphragm aperture value Av is set as the control diaphragm aperture value Avc, and processing returns (#2300-#2310 and #2345). When preparation for light emission has not been completed, the exposure value Ev is calculated as shown in step #2315 from the average photometric value and the like. The value obtained by subtracting the set diaphragm aperture value Av from this exposure value Ev is set as the shutter speed Tv (#2320). Then, in the next step #2325, judgment is made on whether or not this shutter speed Tv is larger than the maximum controllable speed Tvmax. When the speed Tv is higher, the maximum shutter speed Tvmax is set as the control shutter speed Tvc, and when it is not higher, the calculated shutter speed Tv is set as the control shutter speed Tvc (#2325-#2335), and processing proceeds to step #2340. In step #2340, the terminal FLOK is set to the "L" level, and in the following step #2345, the set diaphragm aperture value Av is set as the control diaphragm aperture value Avc.

Figure 25:
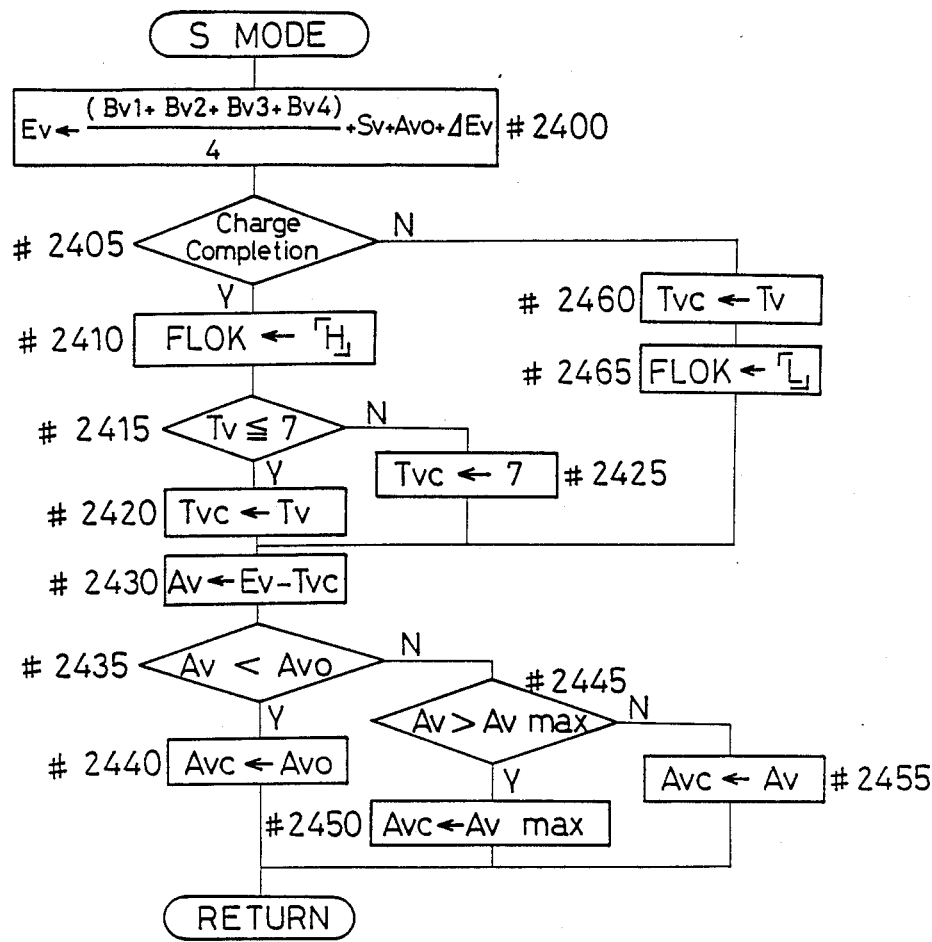
Figure 26:
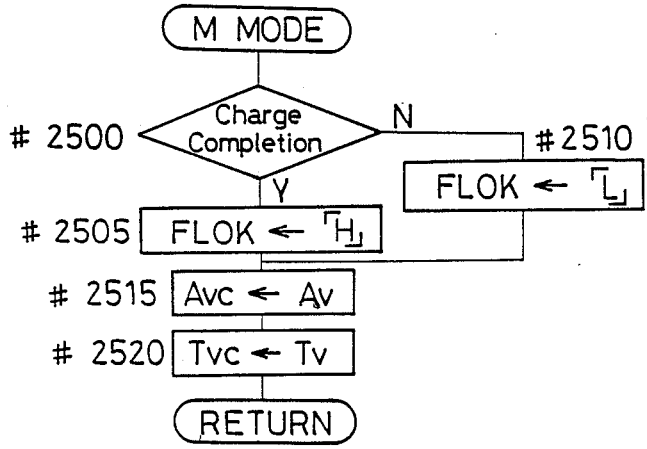

Next, description is made on control in the S mode based on FIG. 25. First, in step #2400, the exposure value Ev is evaluated from the average photometric value and the like, and in step #2405, judgment is made on whether or not preparation for light emission has been completed, and when preparation for light emission has been completed, the terminal FLOK is set to the "H" level (#2410).

Next, in step #2415, whether or not the shutter speed Tv is 7 or less is judged, and if it is 7 or less, the set shutter speed Tv is set as the control shutter speed Tvc (#2420), and if it exceeds 7, the tuning speed 7 is set as the control shutter speed Tvc (#2425), and processing proceeds to step #2430, respectively.

In step #2430, the diaphragm aperture value Av is calculated by subtracting the control shutter speed Tvc from the calculated exposure value Ev, and judgment is made on whether or not this diaphragm aperture value Av is smaller than the smallest aperture value Avo (#2435). When the value Av is smaller, the open diaphragm aperture value Avo is set as the control diaphragm aperture value Avc (#2440), and processing returns. On the other hand, where the diaphragm aperture value Av is not smaller than the smallest aperture value Avo, whether or not it is larger than the maximum diaphragm aperture value Avmax is judged (#2445), and when it is larger, the maximum diaphragm aperture value Avmax is set as the control diaphragm aperture value Avc (#2450), and when it is not larger, the calculated diaphragm aperture value Av is set as the control diaphragm aperture value Avc, and processing returns.

In step #2405, when preparation for light emission has not been completed, the set shutter speed Tv is set as the control shutter speed Tvc (#2460), and the terminal FLOK is set to the "L" level (#2465), and processing proceeds to step #2430, executing the flow of this step and the subsequent steps.

Next, when the mode is the M mode (refer to FIG. 26), whether or not preparation for light emission has been completed is judged in step #2500. When it has not been completed, the terminal LFOK is set to the "L" level, and when it has been completed, the terminal FLOK is set to the "H" level, and processing proceeds to step #2515 respectively. In this step #2515, the diaphragm aperture value Av set in advance is set as the control diaphragm aperture value Avc, and in the following step #2520, the shutter speed Tv is set as the control shutter speed Tvc, and processing returns.

Reverting to FIG. 6, on completing exposure operation (#460), the micro-computer μC performs a third-time data communication with the IC card CD (#465). A flowchart of this data communication is explained based on FIG. 5(c). First, the terminal CSCD is set to the "H" level (#355), and the micro-computer μC performs serial communication with the IC card CD to inform the IC card that the IC card is the output side (#360). Here, it waits for a time (#365), and inputs data from the IC card CD by performing serial communication (#370), and on completing this data communication, it sets the terminal CSCD to the "L" level, and returns.

In this flow, the data sent from the mode setting card differs from the data sent from the program card. In the case of the mode setting card, the data include mode setting data ($CKb_8$-$CKb_{22}$ in Table 7) and display controlling data ($CKb_7$) determining whether or not display is to be performed, while in the case of the program card, the data include in $CKb_{23}$ through $CKb_{47}$ ① the control shutter speed C·Tvc, ② the control diaphragm aperture value C·Avc, ③ with/without flashlight emission, ④ full/non-full emission of adjusted flashlight and ⑤ control/non-control by the card and so on.

Figure 27:
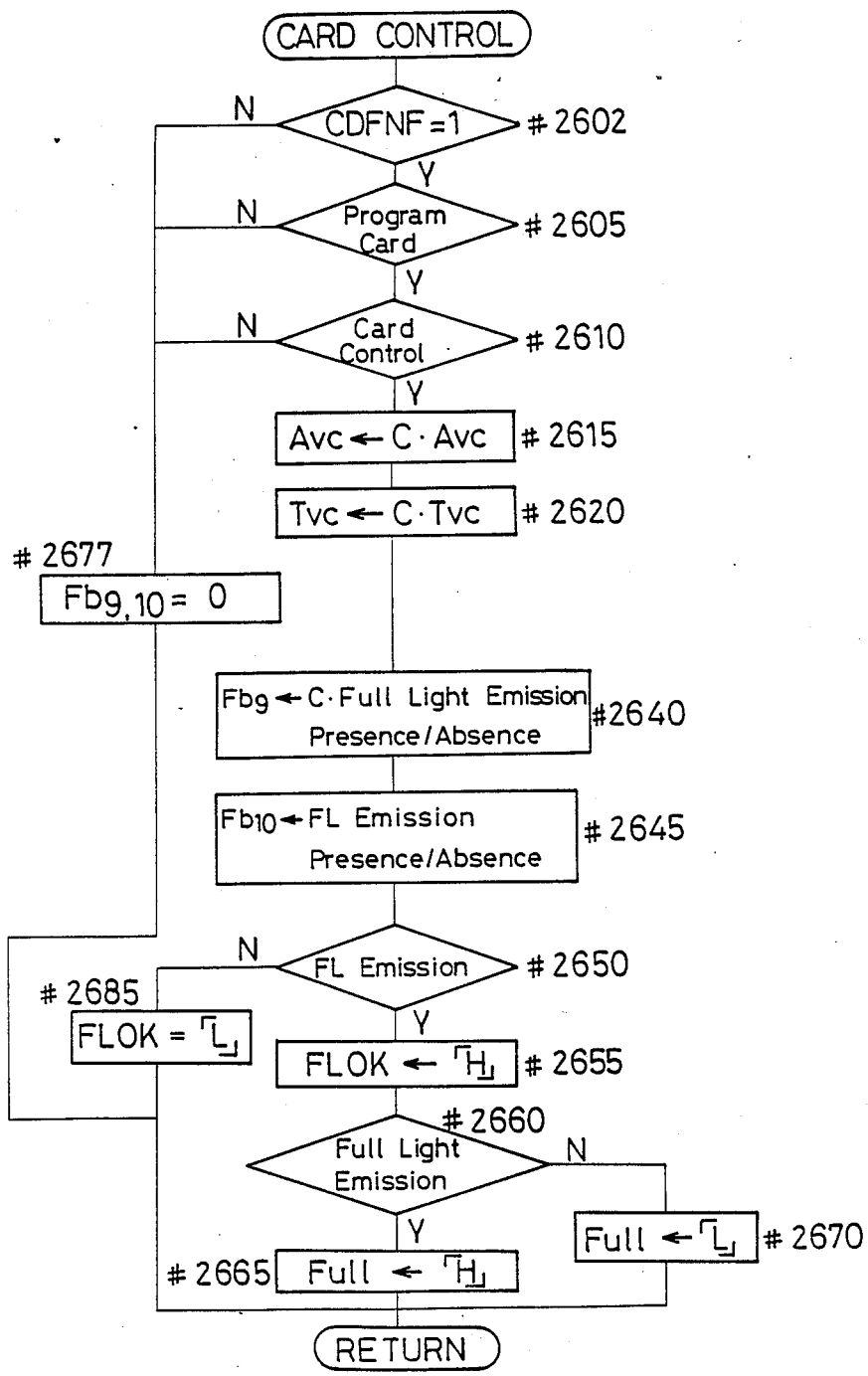
FIG. 27 is a flowchart showing a routine of control by the IC card (particularly the program card).

In FIG. 6, on completing this card data communication III, the micro-computer μC executes the flow of the card control in step #468. Based on the inputted data, this flow shows judgment on whether or not control of the camera by the IC card (in this case, the program card) is to be performed and operation of the camera in performing this control. This is shown in FIG. 27 to be explained. First, in step #2602, the micro-computer μC judges whether or not the card function has been selected, and when the card function has been selected (CDFNF=1), processing proceeds to step #2605. On the other hand, when the card function has not been selected (CDFNF=0), function bits $Fb_9$ and $Fb_{10}$ are set to 0 respectively in step #2677, and processing returns. When the card function has been selected, next, judgment is made on whether or not the program card has been attached (#2605). Where the program card has been attached ($CKb_1$-$CKb_6$=$01_H$), judgment is made on whether or not the camera is controlled by the IC card based on the data inputted from the IC card CD (#2610). Then, where the card is not the program card ($CKb_1$-$CKb_6 \neq 01_H$), or where the camera is not to be controlled by the IC card ($CKb_{23}$=0), processing proceeds to step #2677.

Where it is judged that the camera is controlled by the IC card ($CKb_{23}$=1), the control diaphragm aperture value Avc, the control shutter speed Tvc, full/non-full light emission, with/without flashlight emission are determined respectively based on the data inputted from the IC card (#2615-#2645). Subsequently, whether or not the mode is of flashlight emission is judged based on the inputted data (#2650), and when the mode is not of flashlight emission, the terminal FLOK is set to the "L" level (#2685), and processing returns. When the mode is of flashlight emission, the terminal FLOK is set to the "H" level (#2655), and whether or not the mode is of full light emission is judged (#2660). Then, when the mode is of full light emission, a terminal Full is set to the "H" level in step #2665, and processing returns. When the mode is not of full light emission, the terminal Full is set to the "L" level (#2670), and processing returns.

Figure 28:
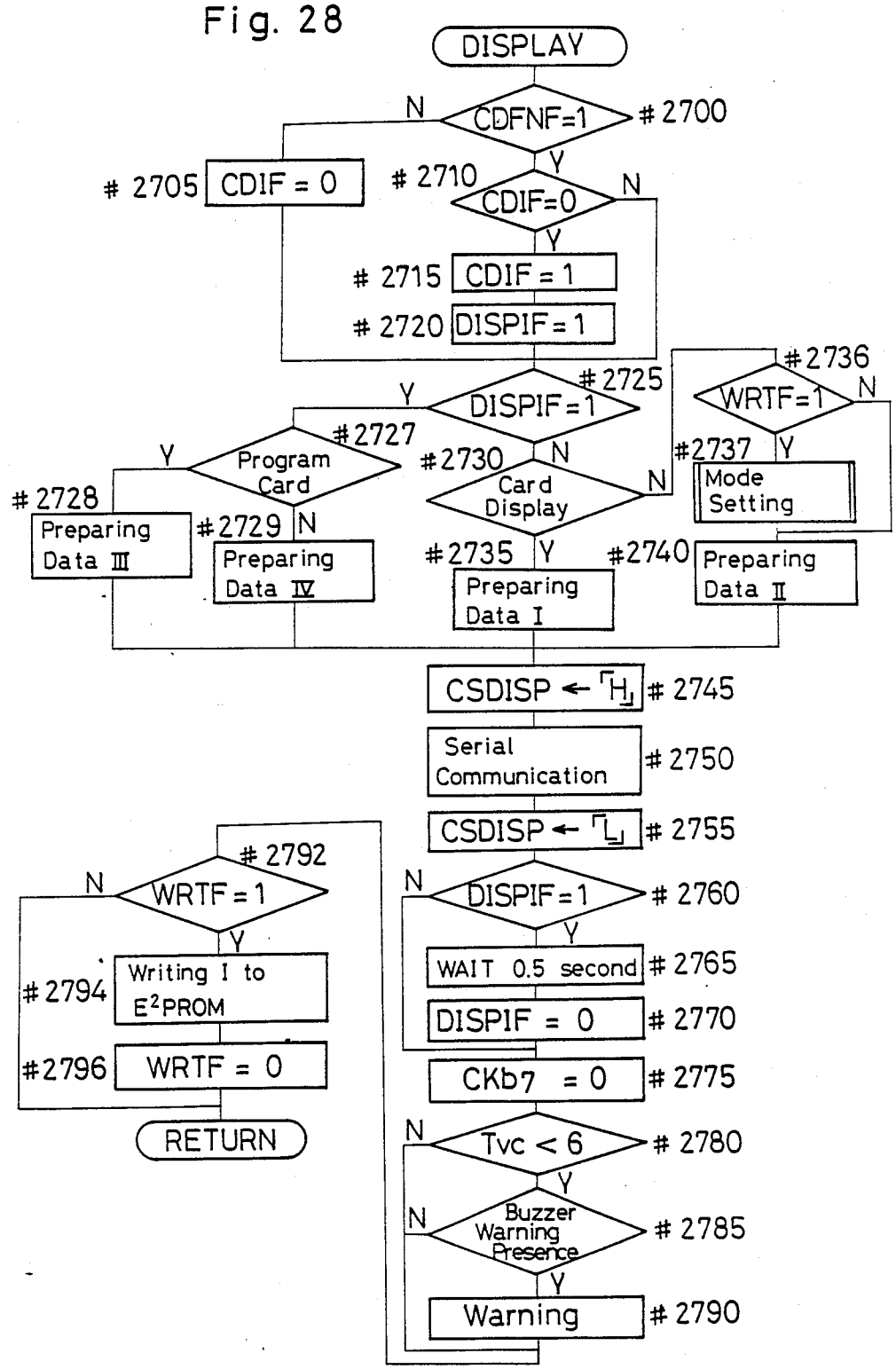
FIG. 28 is a flowchart showing a routine of display.

On completing the above-described subroutine (#468) in FIG. 6, processing proceeds to control of display (#470), and this is shown in FIG. 28 to be explained.

First, in step #2700, the micro-computer $\mu C$ judges whether or not the flag CDFNF has been set. The flag shows whether or not the card function is actuated. When the flag has been set, in next step #2710, the micro-computer judges whether or not the flag CDIF showing that processing has passed once through the following steps #2710–#2720 has been set. Here, when the flag CDIF has not been set, this is set in step #2715, and a flag DISPIF is also set in step #2720, and processing proceeds to step #2725. The flag DISPIF is provided for performing display of the function added by the card for predetermined time when the state that the card function is not actuated is changed to the actuated state. When the card function is not actuated (CDFNF=0), the flag CDIF is reset in step #2705, and processing proceeds to step #2725. When this flag CDIF has been set, processing proceeds from step #2710 to step #2725 without performing anything.

In step #2725, whether or not the above-mentioned flag DISPIF has been set is judged, and when it has been set, whether or not the kind of the card is the program card is judged in step #2727. In the case of the program card, data showing a display "PRO" as data of the display part of the shutter speed and data showing a display "CARD" indicating that the card is actuated are prepared in step #2728. In addition, the display in this case is as shown in FIG. 34(b).

Where the card is not the program card, that is, where it is the mode setting card or no card is attached, the function by the card which has been set in the camera is read from the $E^2PROM$, and display data corresponding to content as shown in FIG. 34(a) is prepared in step #2729. In addition, display data and display content are changed responding to the set content.

Where the flag DISPIF has not been set in step #2725, it is judged whether or not display control by the card is performed in the next step #2730. Here, where display control by the IC card CD is performed (CKb$_7$=1), display data responding to the mode setting data inputted into the micro-computer $\mu C$ from the IC card is prepared (#2735).

When a card display control signal from the IC card is not inputted (CKb$_7$=0) in step #2730, processing proceeds to step #2736, and the micro-computer judges whether or not the write flag WRTF showing a load to the $E^2PROM$ has been set. When the write flag WRTF has been set, that is, when the mode of data setting by the card has been completed, processing proceeds to a subroutine of mode setting (#2737), and further proceeds to step #2745 via step #2740 preparing display data II.

Figure 30:
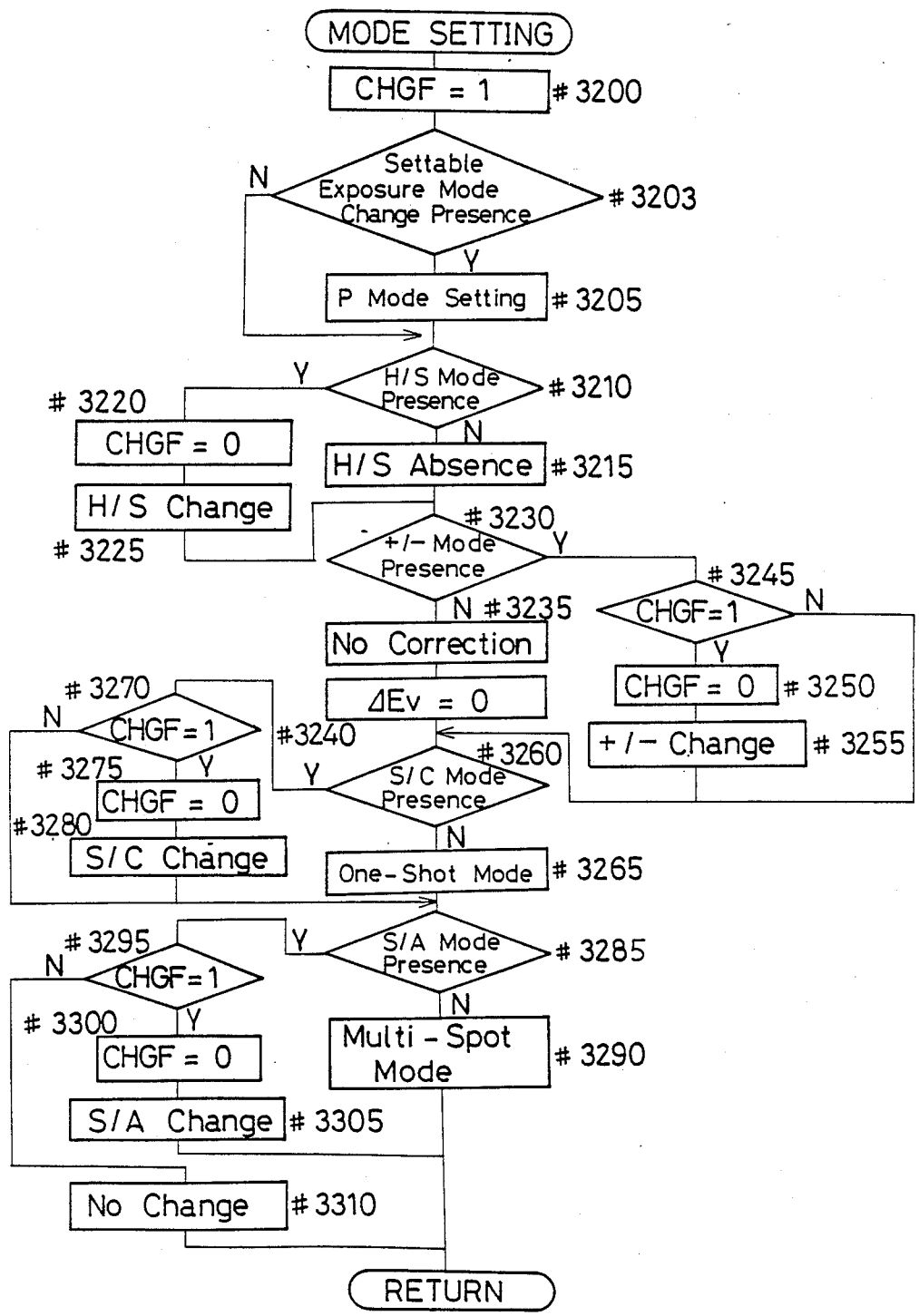
FIG. 30 is a flowchart showing a routine of mode setting.

A subroutine of the above-mentioned mode setting is shown in FIG. 30 to be explained. Here, judgement is made on whether or not the mode set at present is included in the modes to be selected by the IC card CD anew, and where it is not included, the mode is changed to another selected mode. For example, where the A mode has been excluded from selection of the exposure mode by the IC card, it is not proper to perform the display and control of the A mode, therefore this is prevented.

Now, in the flow of FIG. 30, first the micro-computer $\mu C$ sets a flag CHGF which is reset when the changeable mode for selecting one exposure mode is present (#3200), and judges whether or not the exposure mode which can be set has been changed by comparing data MSb$_6$–MSb$_8$ of the $E^2PROM$ with data CKb$_{12}$–CKb$_{18}$ inputted from the IC card CD (#3203). And where they differ (that is, where that exposure mode has been changed), data Fb$_0$, Fb$_1$ are set to 0, 0 (#3205) to forcedly change the exposure mode to the P mode, and processing proceeds to step #3210.

Subsequently, in step #3210, whether or not the H/S mode exists is judged, and when it exists (CKb$_8$=1), the above-mentioned flag CHGF is reset (#3220), and changing data CDb$_0$–CDb$_2$ are set to (0, 0, 0) as H/S change mode in step #3225, and processing proceeds to step #3230.

Where the H/S mode does not exist (CKb$_8$=0), data Fb$_6$ and Fb$_7$ are set to 0, 0 (H/S not change), and processing proceeds to step #3230.

In step #3230, whether or not the ± mode exists is judged, and when it exists (CKb$_9$=1), whether or not the flag CHGF has been set is judged in step #3245, and when the flag has been set, the flag is reset (#3250), and the changing data CDb$_0$–CDb$_1$ are set to ± change (0, 0, 1) in step #3255, and processing proceeds to step #3260.

When the flag CHGF has not been set in step #3245, processing skips steps #3250 and #3255 respectively and proceeds directly to step #3260.

In step #3230, when the ± mode does not exist (CKb$_9$=0), the function data Fb$_4$ and Fb$_5$ are set to 0, 0 regarding as no adjusting (#3235), and a quantity of adjustment of exposure is set to zero ($\Delta E=0$) in step #3240, and processing proceeds to step #3260.

In step #3260, whether or not the S/C mode exists is judged, and when it exists (CKb$_{10}$=1), whether or not the flag CHGF has been set is judged in step #3270. When the flag has been set, this flag is reset (#3275), and further regarding as S/C change, changing data CDb$_0$–CDb$_2$ are set to 0, 1, 0 is step #3280, and processing proceeds to the following step #3285.

When the flag CHGF has not been set, processing skips steps #3275 and #3280 and proceeds directly to step #3285. In step #3260, when the S/C mode does not exist (CK10$_{10}$=0), the function data Fb$_3$ is set to 0 in step #3265 to set the one-shot mode, and processing proceeds to step #3285. In step #3285, it is judged whether or not the S/A mode exists, and when it exists (CKb$_{11}$=1), it is judged whether or not the flag CHGF has been set in step #3295. When the flag CHGF has been set, the flag CHGF is reset (#3300), and further in the next step #3305, regarding as S/A change, the changing data CDb$_0$–CDb$_2$ are set to 0, 1, 1, and processing returns. When the flag CHGF has not been set in the previous step #3295, no changeable mode is assumed to exist, and the changing data CDb$_0$–CDb$_2$ are set 1, 0, 1 (#3310), and processing returns.

Also, where the S/A mode does not exist in step #3285 ($CKb_{11}=0$), the function data $Fb_2$ is set to 0 to set the multi-spot AF mode (A) in step #3290, and processing returns.

Figure 29:
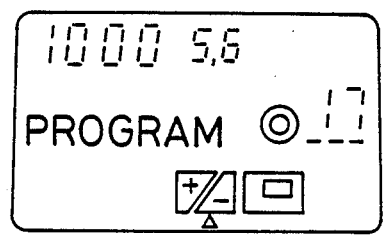
FIG. 29 is a view showing an example of display in a certain step in the flowchart shown in FIG. 28.

In FIG. 28, the above-described mode setting (#2737) is performed, and subsequently data preparation II (#2742) is performed. The data preparation II prepares display data for preforming normal display not based on the card (for example, FIG. 2(u)). Where no card function is actuated, character "CARD" is deleted as shown in FIG. 29. After data preparations have been performed in all cases of the respective steps #2728, #2779, #2735 and #2742, processing proceeds to step #2745. In step #2745, the terminal CSDISP is set to the "H" level to perform data communication with the display controlling circuit, and subsequently, serial communication (camera is output side) is performed in step #2750, and after the communication has been completed, the terminal CSDISP is set to the "L" level (#2755).

Next, in step #2760, judgement is made on whether or not the flag DISPIF has been set, and when the flag has been set, processing waits for 0.5 second (#2765). For this time period, display of the data prepared in the above-mentioned steps #2728 and #2729 is performed.

In the next step #2770, the flag DISPIF is reset, and processing proceeds to step #2775. When the flag DISPIF has not been set in the above-mentioned step #2760, processing skips steps #2765 and #2770, and proceeds to step #2775. In step #2775, data $CKb_7$ is set to 0 release the display control by the IC card once.

Next, it is judged whether or not the control shutter speed Tvc is less than 6 (1/60) in step #2780, and if it is less than 6, judgement is made on whether or not the mode performing buzzer warning has been selected (#2785). Where this mode has been selected ($MSb_9$–$MSb_{12}=0_H, 2_H, 4_H, 6_H, 8_H, A_H, C_H, E_H$), pulses of a predetermined frequency are outputted for a certain time form a terminal OBZ to perform a warning by a buzzer BZ (#2790), and processing proceeds to step #2792.

Where the control shutter speed Tvc is 6 or more or in the case of the mode performing no buzzer warning ($MSb_9$–$MSb_{12}=1_H, 3_H, 5_H, 7_H, 9_H, B_H, D_H, F_H$), processing proceeds to step #2792 without performing a buzzer warning.

In step #2792, judgement is made on whether or not the flag WRTF has been set, and if it has been set, the function is written to the $E^2PROM$ (#2794). This flag WRTF indicates whether or not the data equivalent to the inputted mode setting data must be written to $MSb_0$–$MSb_{12}$ of the $E^2PROM$. Then, in the following step #2796, processing resets this flag WRTF, and returns. When the flag WRTF has not been set in step #2792, processing immediately returns.

In FIG. 6, on completing the above-described display control (#470), in step #471, the micro-computer μC judges whether or not the flag SETF showing that the IC card has been attached and the data setting mode has been set, and if the flag has been set, it skips to step #520 to set the all-interrupt-permitted state, and returns. If the above-mentioned flag has not been set, the micro-computer μC proceeds to step #475, and judges whether or not the release switch $S_2$ has been turned to ON, and when the switch has not been turned to ON ($IP_7$="H"), it returns. When the switch $S_2$ has been turned to ON ($IP_7$="L"), it is judged whether one-shot AF or not (#480). Here, in the case of one-shot AF, in step #485, judgement is made on whether or not the flag AFEF showing in-focus has been set, and if it has not been set, processing returns via the above-mentioned step #520.

When the flag AFEF has been set, or when the mode is not in one-shot AF mode but in the continuous AF mode, all interrupts to this flow are inhibited in step #490, and exposure control is performed in the next step #495 (as described later), and thereafter control of one-frame winding-up of the film is performed in step #500 (as described later). Subsequently, whether or not the release switch $S_2$ is in the ON state is judged in step #505, and in the case of the ON state ($IP_7$="L"), it is judged whether or not the mode is of continuous-shot in step #510. Here, in the case of the continuous-shot mode ($Fb_3=1$), all interrupts are permitted in step #515, and proceeds to the routine SO. When the mode is not in continuous-shot mode ($Fb_3=0$), processing returns to step #505, and waits until the release switch $S_2$ is turned to OFF, and when it is turned to OFF, permits all interrupts in step #520, and returns.

Figure 31:
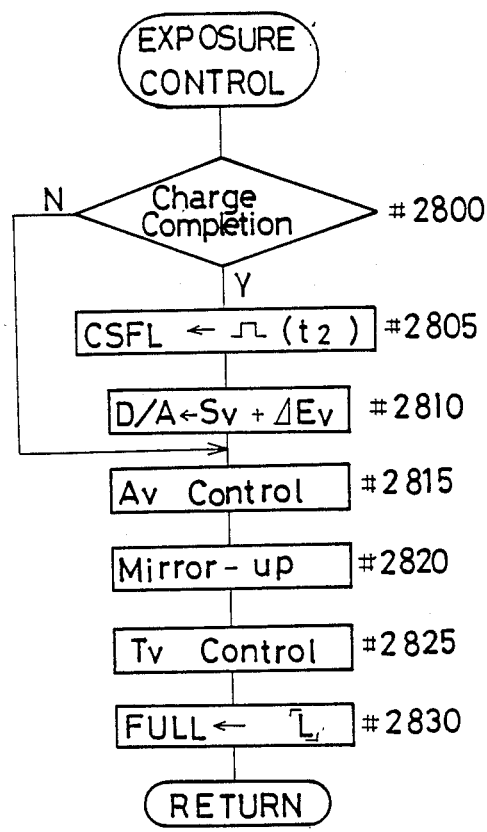
FIG. 31 is a flowchart showing a routine of exposure control.

Next, a subroutine of exposure control in the above-mentioned step #495 is shown in FIG. 31 to be explained. First, in step #2800, based on the data inputted from the flash apparatus ST, judgement is made on whether or not charging has been completed, and when charging has been completed, the terminal CSST is set to the "H" level in step #2805 for a time $t_2$ to show the exposure mode. Then, as the quantity of light adjustment, the film speed Sv and the amount of adjustment of exposure ΔEv are calculated, and these quantities are outputted to the light adjusting circuit STC after D-A conversion into analog data (#2810).

In the next step #2815, diaphragm aperture control is performed based on the control diaphragm aperture value Avc, and mirror-up control is performed (#2820), and thereafter control of the shutter speed is performed based on the control shutter speed Tvc (#2825), and further the full light emission signal terminal Full is set to the "L" level (#2830), and processing returns.

Here, description is made on operation of the interface circuit for flashlight emission based on FIG. 9(b). At flashlight photographing, the terminal FLOK is set to the "H" level, and on completing a run of the first curtain of the shutter, the X contact is turned to ON, and a light emission start signal is outputted from an AND circuit $AND_{21}$ to the electric flash apparatus ST, and the flash apparatus ST inputs this signal and starts light emission. When the mode is not the full light emission mode, the "H" level is outputted to the AND circuit through an inverter $IN_{21}$, and when a pulse signal showing completion of light adjustment from the light adjusting circuit STC is inputted, an AND circuit $AND_{22}$ outputs this signal to the flash apparatus through an OR circuit $OR_{21}$. The electric flash apparatus ST inputs this signal and stops flashlight emission. In the case of the full light emission mode, the "L" level is inputted to the AND circuit $AND_{22}$, and the AND circuit $AND_{22}$ is put in the non-operating state, and inhibits passage of a light adjust signal, and therefore, a signal for stopping flashlight emission is not outputted to the electric flash apparatus ST.

Figure 32A:
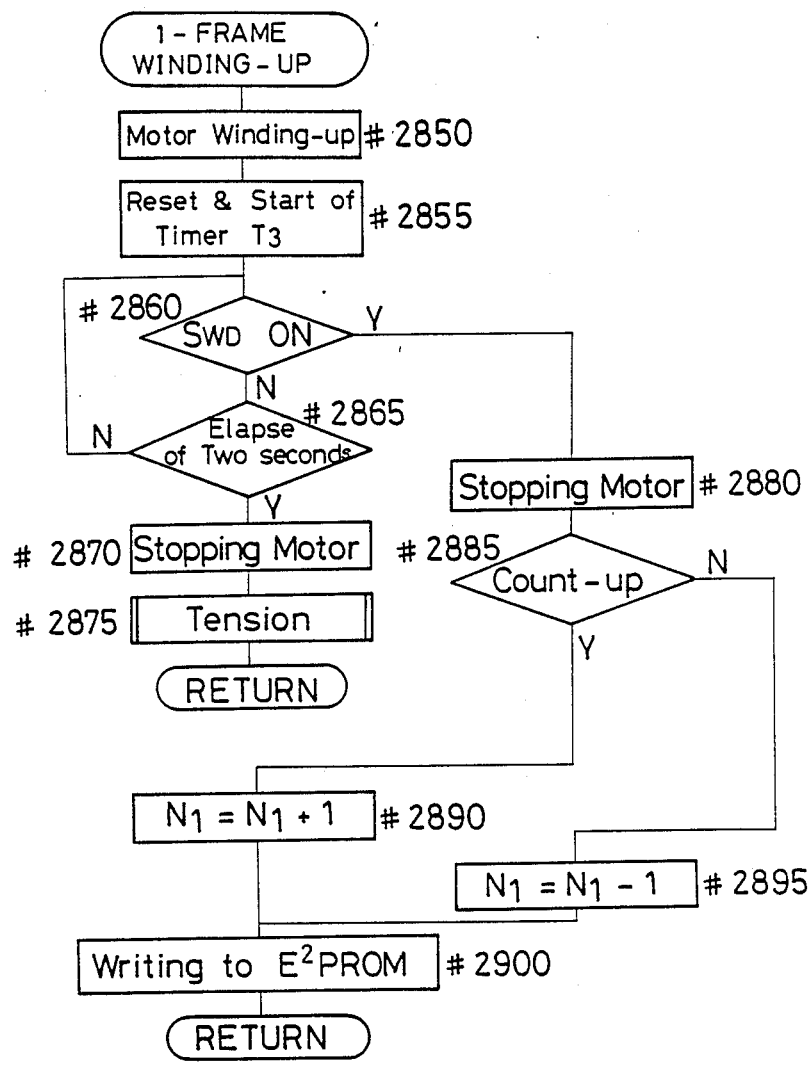
FIGS. 32(a) and 32(b) are flowcharts relating to one-frame winding-up of a film.
Figure 32B:
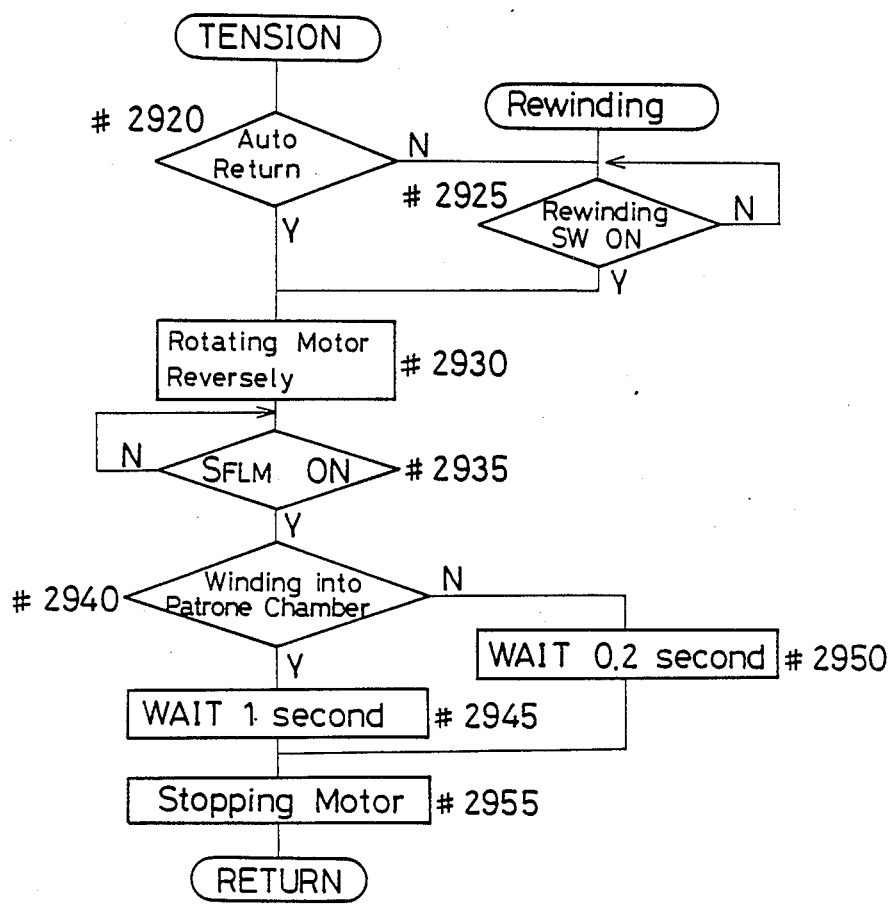

FIGS. 32(a) and (b) show flowcharts of control of one-frame winding-up of the film as shown in step #500 in FIG. 6. Description thereon is made as follows. In FIG. 32(a), the micro-computer μC outputs a film wind-up signal to a motor controlling circuit MD, and resets and starts a timer $T_3$ (#2850, #2855). This timer is for detecting that the film is wound up to the final frame and the film tenses up. In step #2860, the micro-computer $\mu C$ judges whether or not the switch $S_{WD}$ showing that one frame has been wound up has been turned to ON. Here, where it has not been turned to ON, the micro-computer $\mu C$ judges whether or not two seconds has elapsed in this state in step #2865. And where two seconds has elapsed, it performs control of stopping the motor (#2870), and assumes that the film tenses up, and performs control for this tension of the film (#2875), and returns. A subroutine for the above-mentioned tension is shown in FIG. 32(b) to be explained. In step #2920, judgement is made on whether or not auto return (the film is automatically wound bace after it tenses up) has been selected, and when it has been selected ($MSb_9-MSb_{12}=0_H-3_H$, $8_H-B_H$, here $_H$ also designated hexadecimal number), a signal of reverse rotation of the motor is given to the motor controlling circuit MD, and processing waits until the film detecting switch $S_{FLM}$ is turned to ON. Subsequently, when the switch $S_{FLM}$ is turned to ON, judgement is made on whether or not the film is to be wholly wound into the patrone chamber, and where the film is wound into the patrone chamber ($MSb_9-MSb_{12}$ of the $E^2PROM=2_H$, $3_H$, $6_H$, $7_H$, $A_H$, $B_H$, $E_H$, $F_H$), processing waits for one second (#2945), and performs motor stop control (#2955), and then returns.

Where the whole film is not to be wound into the patrone chamber ($MSb_9-MSb_{12}$ of the $E^2PROM=0_H$, $1_H$, $4_H$, $5_H$, $8_H$, $9_H$, $C_H$, $D_H$), processing waits for 0.2 seconds, stops the motor, and returns (#2950).

When the mode is not of auto return ($MSb_9-MSb_{12}=4_H-7_H$, $C_H-F_H$) in the above-mentioned step #2920, processing proceeds to step #2925 in which it waits until the rewinding switch $S_{RW}$ is turned to ON, and when it is turned to ON, processing proceeds to the above-mentioned step #2930.

Reverting to FIG. 32(a), in step #2860, when a one-frame switch $S_{WD}$ is turned to ON, in step #2880, contol of stopping the motor is performed. And thereafter in the next step #2885, judgement is made on whether or not a counter of quantity of film frames is of count-up type. Here, where it is of count-up type ($MSb_9-MSb_{12}=0_H-7_H$), the count number $N_1$ of a counter showing the quantity of exposed film frames is increased by 1 in step #2890, and processing proceeds to step #2900. On the other hand, where it is of count-down type ($MSb_9-MSb_{12}=8_H-F_H$), the count number $N_1$ showing the remaining quantity of film frames is decreased by 1 in step #2895, and processing proceeds to step #2900. In step #2900, this quantity of film frames $N_1$ is written to $MSb_{13}-MSb_{18}$ of the $E^2PROM$.

Figure 33:
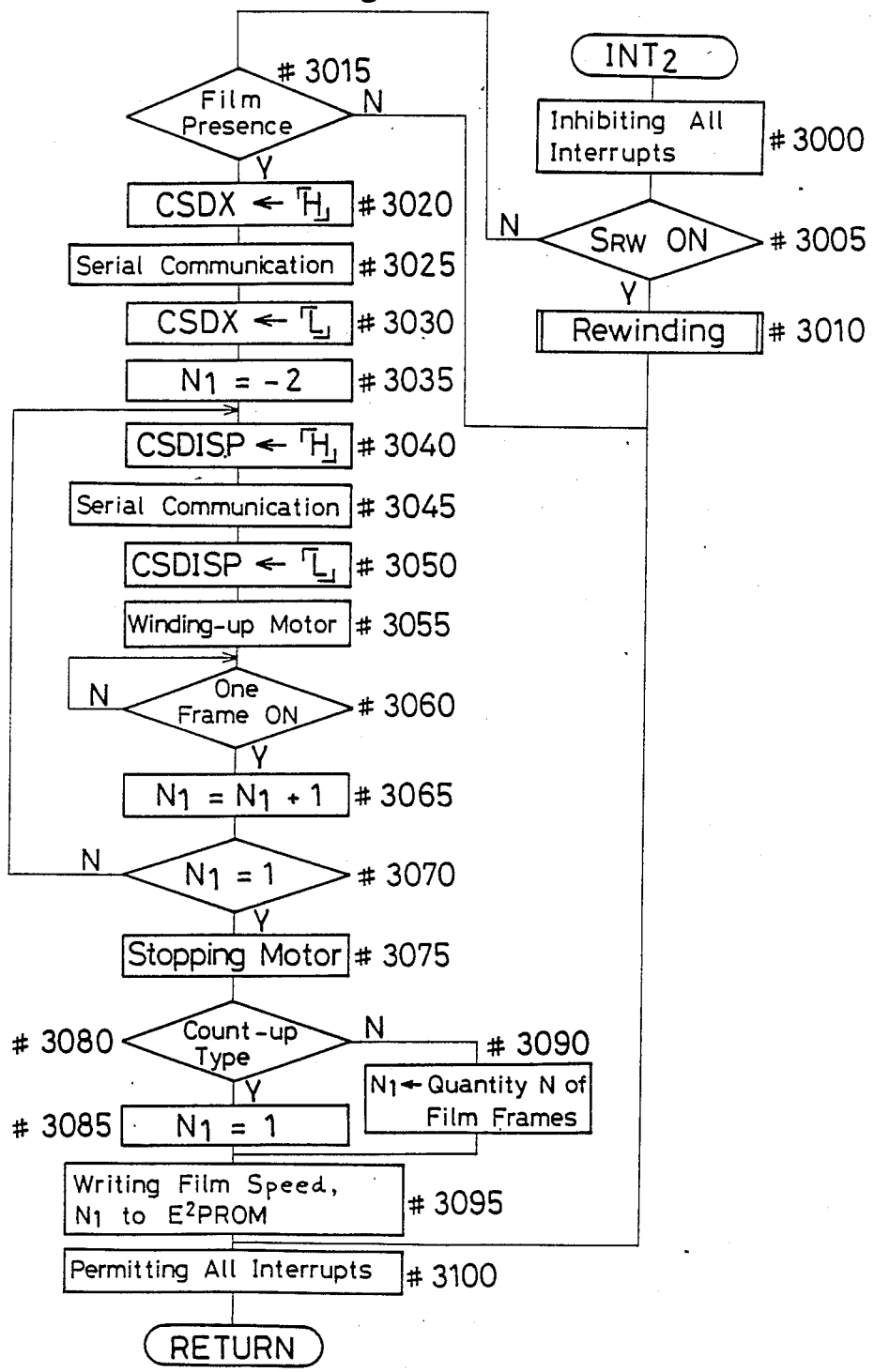
FIG. 33 is a flowchart showing a routine of an interrupt relating to closing a rear lid.

Next, when the rear lid close detecting switch $S_{RC}$ or the rewinding switch $S_{RW}$ is operated, a pulse signal is inputted to a terminal $INT_2$, and the micro-computer $\mu C$ executes an interrupt $INT_2$ as shown in FIG. 33. In the flow in FIG. 33, first, the mircor-computer $\mu C$ inhibits an interrupt to this flow (#3000), and thereafter in step #3005, detects whether or not the rewinding switch $S_{RW}$ has been turned to ON. Where it has been turned to ON, the micro-computer $\mu C$ executes a routine of rewinding as shown in FIG. 32(b) to perform a rewinding operation, permits an interrupt (#3010, #3100), and returns. When the rewinding switch $S_{RW}$ has not been turned to ON, the rear lid close detect switch $S_{RC}$ is assumed to be turned to ON, and processing proceeds to step #3015, and judgement is performed on whether or not the film exists. Where no film exists, accordingly where the film detecting switch $S_{FLM}$ is in the OFF state, processing proceeds to step #3100 without performing initial loading. On the other hand, where the film exists (that is, where the switch $S_{FLM}$ is in the ON state), a terminal CSDX is set to the "H" level, and serial communication is performed with a film speed reading circuit DX and thereby film speed data Sv and the quantity of exposed film frames N are inputted into the micro-computer $\mu C$, and on completing the communication, the terminal CDSX is set to the "L" level (#3020-#3030). Then, the number $N_1$ is set to $-2$ (#3035). Subsequently the terminal CSDISP is set to the "H" level, and serial communication is performed with the display controlling circuit DISPC (#3045). In the serial communication, data for displaying only the data showing the quantity of film frames $N_1$ is outputted from the micro-computer $\mu C$, and on completing the serial communication, the terminal CSDISP is set to the "L" level (#3050). The numeric value of the quantity of film frames $N_1$ is displayed using two seven-segment digits. Next, the micro-computer $\mu C$ outputs a signal instructing winding-up of the film to a wind-up controlling circuit (#3055), and waits until winding-up of one frame ends (#3060). Here, when the one-frame switch $S_{WD}$ is turned to ON, the micro-computer $\mu C$ adds 1 to the quantity of film frames $N_1$ (#3065), and judges whetther or not the numeric value has become 1 (#3070), and if it has not become 1, returns to step #3040. IF it has become 1, processing proceeds to step #3075, and the motor is stopped, and in step #3080, it is judged whether or not the film counter is of count-up type. Where it is of count-up type, in step #3085, numeral 1 is set as $N_1$, and where it is not of count-up type, the quantity N of the exposed film frames read in step #3039 is set as $N_1$, and processing proceeds to step #3095. Then, in step #3095, the above-mentioned $N_1$ and the film speed are written to predetermined addresses of the $E^2PROM$, and after the write has been completed, all interrupts are permitted (#3100), and processing returns.

In the above, description has been made on the operation of the micro-computer $\mu C$ of the camera side of this embodiment using various flowcharts, and next, description is made on control of the IC card attached to this camera using flowcharts. In addition, the mode setting card and the program card are described in a separated manner. The micro-computer $\mu C_2$ incorporating the $E^2PROM$ is incorporated in the IC card CD.

First, description is made on the mode setting card. When the IC card CD is attached to the cameral body, power $V_{DD}$ is supplied to the IC card CD, and as described above, the micro-computer $\mu C$ of the camera is interrupted, and the clock signal is sent in the IC card CD, and the micro-computer $\mu C_2$ of the IC card side is put in the drive-possible state.

Figure 35A:
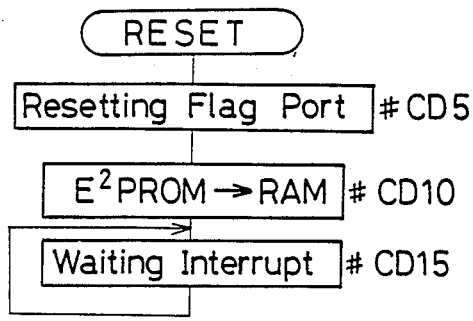
FIGS. 35(a) to 35(k) are flowcharts showing various routines of the IC card.

In the IC card side, by attaching the IC card to the camera body, a signal changing from the "L" level to the "H⇌" level is supplied to a terminal RE, and the micro-computer $\mu C_2$ executes a flow as shown in FIG. 35(a). In this FIG. 35(a), the micor-computer $\mu C_2$ first resets the flag output port (#CD5), and resets bits $CCKb_0-CCKb_2$ of the RAM to 0, 0, 0, transfers data of the $E^2PROM$ ($CMSb_0-CMSb_{11}$) shown in Table 8 to bits responding to the $CCKb_3-CCKb_{14}$ of the RAM shown in Table 9, and waits an interrupt (#CD15).

For the content of data of this $E^2PROM$, data like data ($MSb_0-MSb_3$, $MSb_5-MSb_{12}$) of the $E^2PROM$ of the camera can be written thereto.

When a signal CSBCK showing data communication request is sent from the camera, the micro-computer $\mu C_2$ of the IC card executes an interrupt INT, and this is shown in FIG. 35 (b) to be explained. In step #CD50, the micro-computer $\mu C_2$ controls the IC card to perform serial communication with the camera, and inputs data from the camera in synchronism with the clock signal SCK sent from the camera, and judges one out of the data communications I, II and III (#CD55). In the case of the data communication I, first, data showing the kind of the IC card (mode setting or program) is set (the mode setting card in this case), and the data is outputted in synchronism with the clock signal SCK (#CD60), and an interrupt is waited (#CD63). In the case of the data communication II, processing proceeds from step #CD70 to step #CD75, and data sent from the camera (key switch data in this case) is inputted in synchronism with the clock signal SCK. Based on this inputted data, a routine of data setting is executed (#CD75), and any interrupt is waited (#CD63).

Figure 35B:
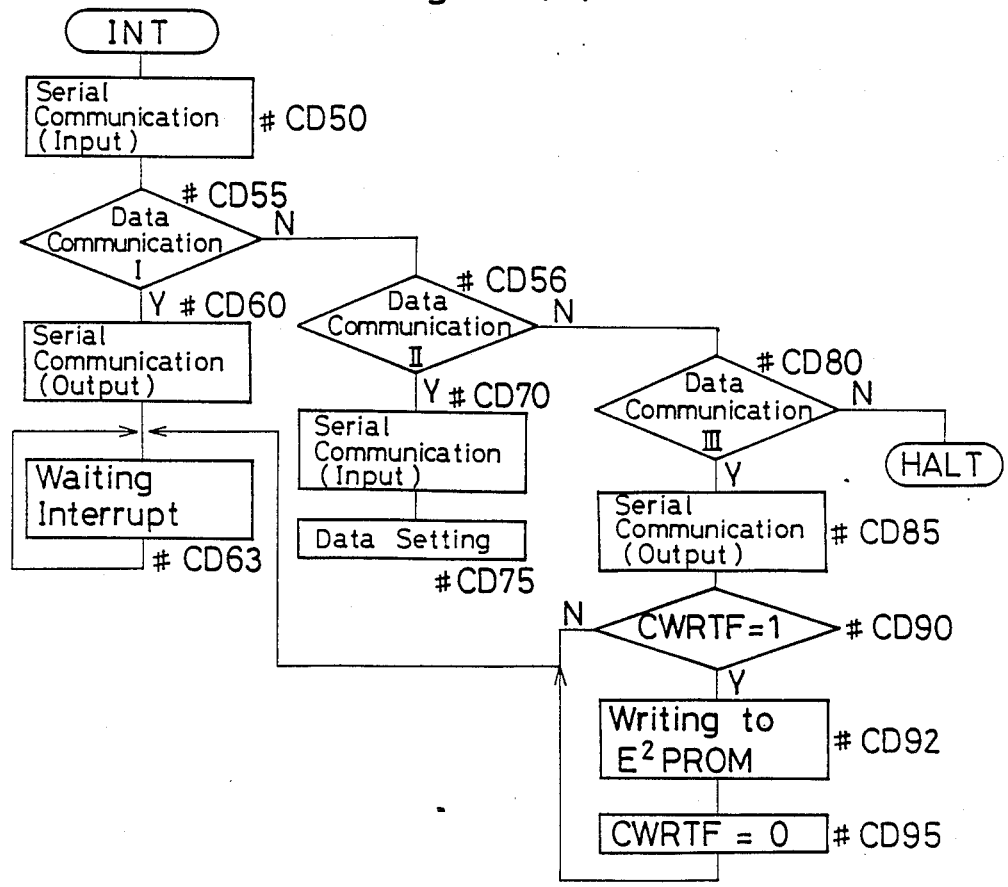
Figure 35C:
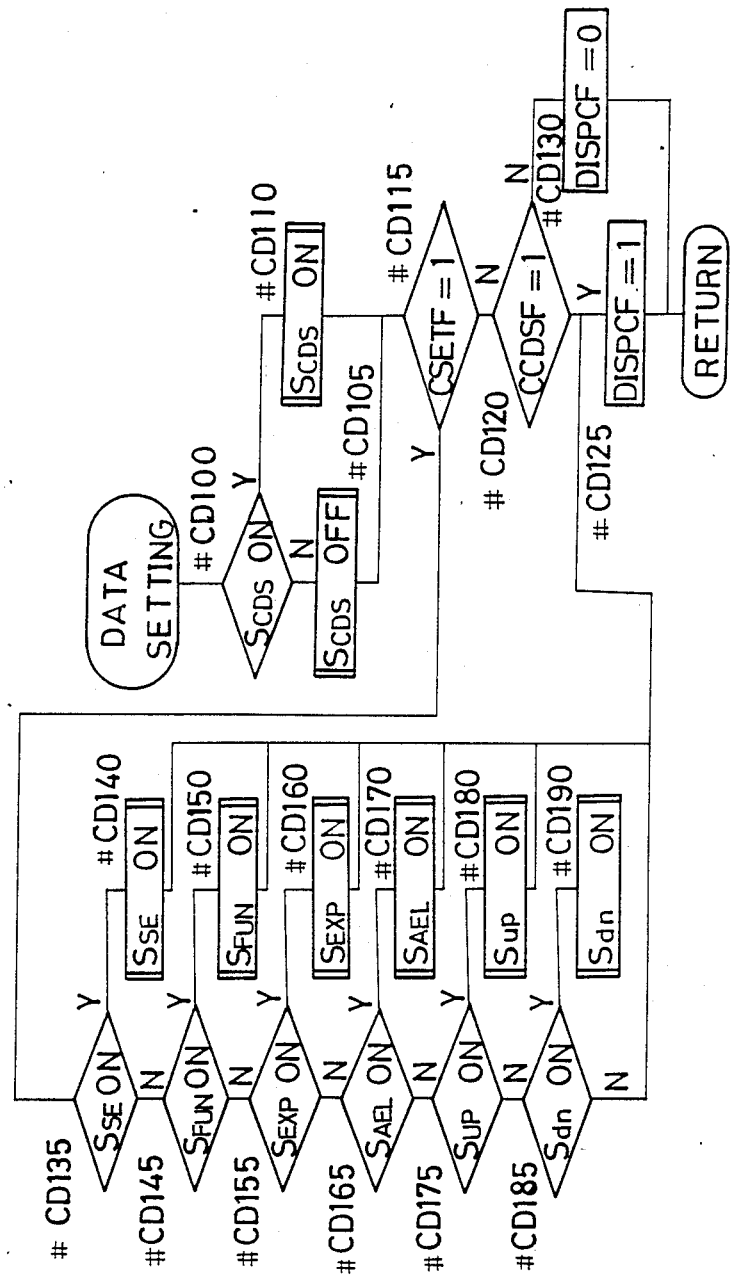
Figure 35D:
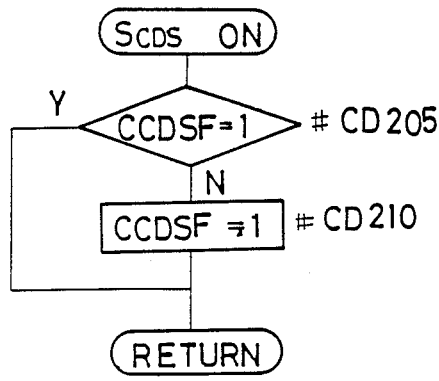

This routine of data setting is shown in FIG. 35(c) to be explained. It is judged whether or not the card data setting switch $S_{CDS}$ has been turned to ON in step #CD100, and it is executed to control [$S_{CDS}$ ON] in step #CD110 or control [$S_{CDS}$ OFF] in step #CD105 responding to ON or OFF of this switch $S_{CDS}$. FIGS. 35(d) and 35 (e) show flows of the respective controls [$S_{CDS}$ ON] and [$S_{CDS}$ OFF]. These controls are the same as the controls [$S_{CDS}$ ON] and [$S_{CDS}$ OFF] of the flows as shown in FIG. 17 and FIG. 18 except that the steps of judging the mode setting card, step #1500 and step #1550 do not exist (these are unnecessary in the card side).

In addition, a character C affixed to the head of the flag symbol is for discriminating from the flag of the camera side, and the function of this flag is the same as the function of the flag without the character C.

Reverting to FIG. 35(c), in step #CD115, whether or not the set flag CSETF has been set is judged. Where it has not been set, processing proceeds to step #CD120, and judgement is made on whether or not a flag CCDSF set when processing passes through the flow of [$S_{CDS}$ ON] once and does not pass through the flow of [$S_{CDS}$ OFF] has been set.

In this embodiment, processing enters the changing mode in the OFF state of the card data setting switch $S_{CDS}$, and when the flag CSETF has not been set in step #CD115, this represents that although setting change has not been completed yet, the switch $S_{CDS}$ has been turned to ON.

When the flag CCDSF has been set, the display control flag CCDSF is set (#CD125), and when the flag CCDSF has not been set, it is reset (#CD130), and processing returns.

With setting or resetting of this display control flag DISPCF, it is determined whether or not the display of the camera should be displayed for the data setting mode [step #2730 in FIG. 28]. In step #CD115, when a flag CSETF has been set, any flow [$S_{SE}$ ON], [$S_{FUN}$ ON], [$S_{AEL}$ ON], [Sup ON] or [Sdn ON] responding to an operation of any of the above-mentioned switches $S_{SE}$, $S_{FUN}$, $S_{XP}$, $S_{AEL}$, Sup and Sdn is executed, and processing proceeds to step #CD125 (#CD135–#CD190).

Hereinafter, description is made for the flows responding to operation of these switches.

Figure 35F:
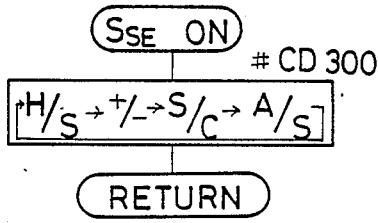
Figure 35E:
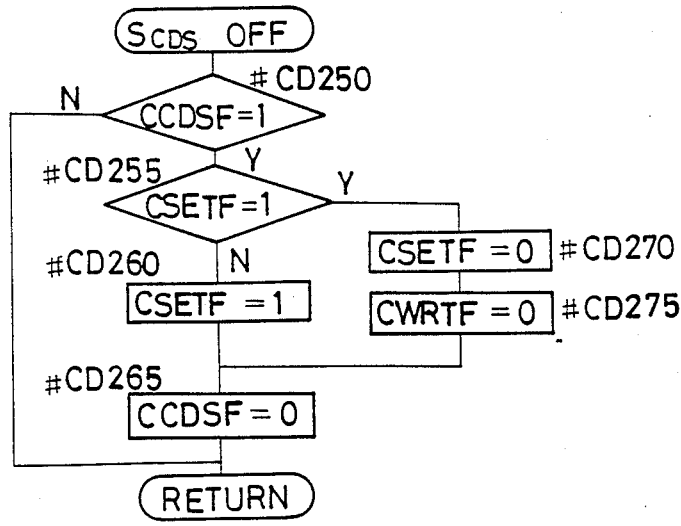

First, seletion of the changing mode by the change data selecting switch $S_{SE}$, as shown in FIG. 35(f), proceeds to the position next to the position responding to bits $CCKb_0$–$CCKb_2$ of the RAM at that time. At this time, simultaneously, the above-mentioned bits $CCKb_0$–$CCKb_2$ are also changed (#CD300), and processing returns.

Figure 35G:
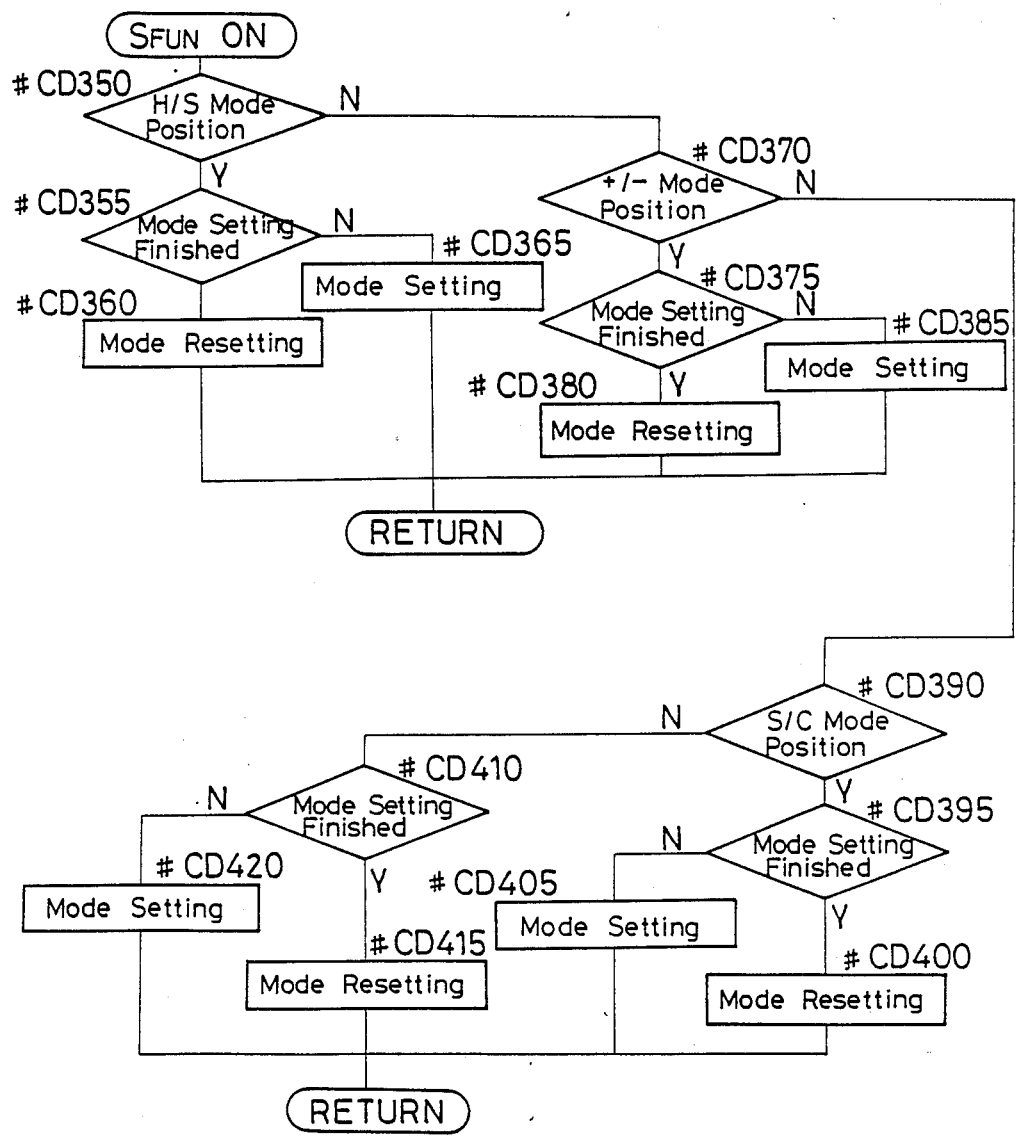

Selection of possible change of the mode by the changing data enable/disable changing-over switch $S_{FUN}$ is performed in a manner of switch $S_{SE}$, as shown in FIG. 35(g), if the mode corresponding to the selected changing mode has been set (change possible, bit=1), the mode is reset (change no, bit=0), and if the mode has not been set, it is set respectively, and processing returns. This means that the micro-computer $\mu C_2$ sets (=1) or reset (=0) $CCKb_3$–$CCKb_6$. Needless to say, judgement in step #CD410 is performed with respect to the S/A mode.

Figure 35H:
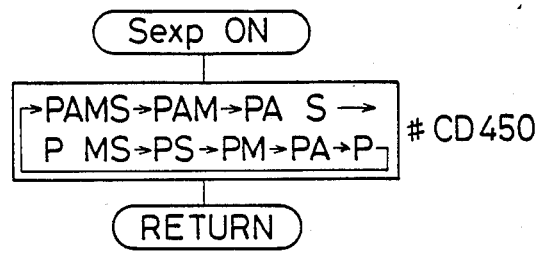

Next, selection of the exposure mode which can be selected by the exposure mode combination selecting switch $S_{EXP}$, as shown in FIG. 35(h), proceeds by one and changes the state of bits $CCKb_7$–$CCKb_9$ every time this switch $S_{EXP}$ is operated.

Figure 35I:
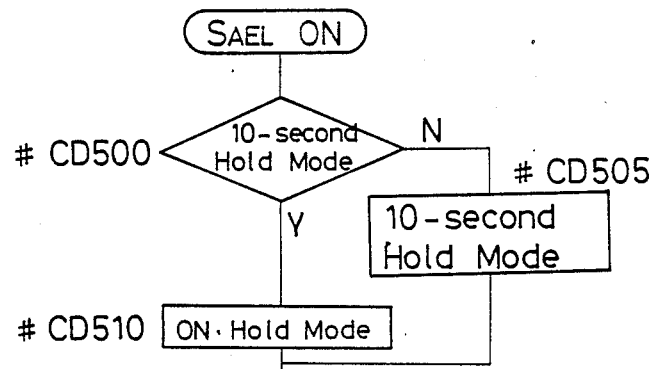

Selection of the AE lock mode by operation of the AE locking switch $S_{AEL}$ is made in a manner that the bit $CCKb_{14}$ is changed so that AE locks for the period of ON of the switch $S_{AEL}$ and AE lock state is changed-over every time the switch $S_{AEL}$ is depressed between locked and unlocked states as shown in FIG. 35(i).

Figure 35J:
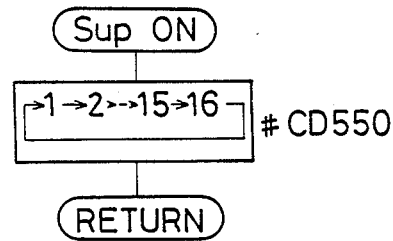
Figure 35K:
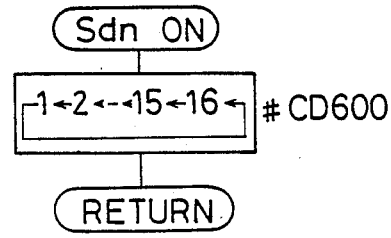

Selection of the modes as shown in Table 2 by each operation of the up switch Sup and the down switch Sdn is made in a manner that, as shown in FIGS. 35(j) and 35(k), from the present step corresponding to bits $CCKb_{10}$–$CCKb_{13}$, count-up is performed by operating the up switch Sup, and count-down is performed by operating the down switch Sdn, and bits $CCKb_{10}$–$CCKb_{13}$ are changed in response to this counting.

In FIG. 35(c), when the card data setting switch $S_{CDS}$ is turned to ON in step #CD100 and processing proceeds in a sequence of steps #CD110→#CD115→#CD120→#CD125, processing of the micro-computer $\mu C$ in the camera body proceeds from step #2730 to step #2735 in FIG. 28 based on a card display control signal from the mode setting card (in the card side, this signal is outputted when a flag DISPCF is 1). And display of the functions which can be set by the card, and are possessed by the camera (for example, display as shown in FIG. 38 (b)) is performed in place of display in photographing shown in FIG. 38(a).

Figure 38A:
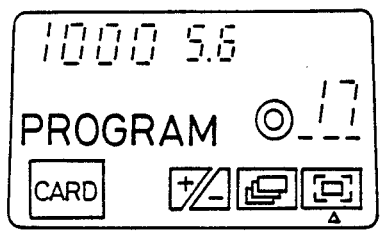
FIGS. 38(a) to 38(i) are views showing examples of display.
Figure 38B:
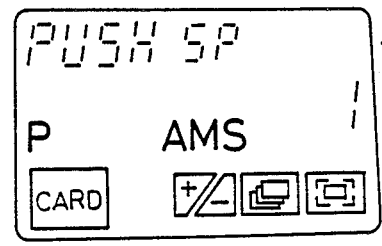
Figure 38C:
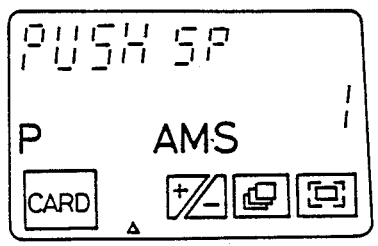
Figure 38D:
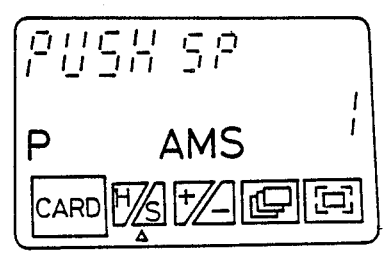

If the change data selecting switch $S_{SE}$ is depressed once, the triangle cursor 1 comes to the position of H/S (note that this is not set at present, and therefore H/S is not displayed) [FIG. 38(c)]. If the change data enable/disable changing-over switch $S_{FUN}$ is depressed once in this state, the H/S function is changed, and the character "H/S" is displayed as shown in FIG. 38(d).

Figure 38E:
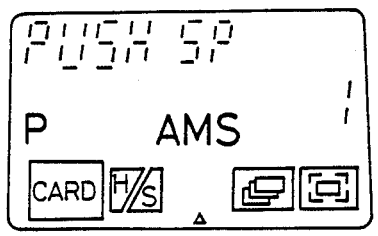

Next, if the change data selecting switch $S_{SE}$ is depressed and, for example, the change data enable/disable changing-over switch $S_{FUN}$ is also depressed once in sequence, the ± function is deleted, and display is performed as shown in FIG. 38(e).

Figure 38F:
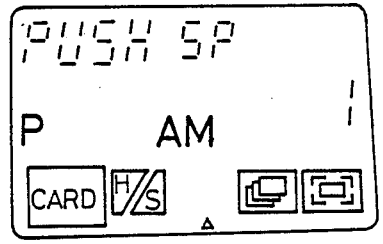
Figure 38G:
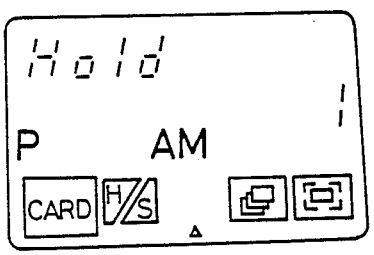

Next, if the exposure mode combination selecting switch $S_{EXP}$ is depressed once, display is changed from PAMS to PAM as shown in FIG. 38(f). Here, if the AE locking switch $S_{AEL}$ is depressed once, display is changed from PUSH SP to HOLD.

Figure 38H:
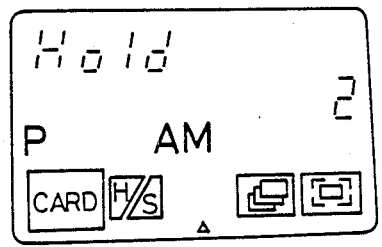

Further, if the up switch Sup is depressed once, display is changed from 1 to 2 as shown in FIG. 38(h).

Figure 38I:
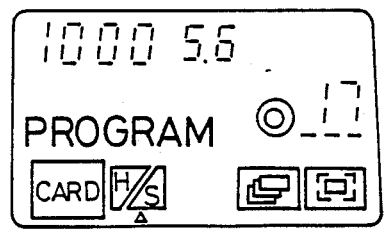

Next, when the card data setting switch $S_{CDS}$ is turned to ON once and then turned to OFF, output of the card display control signal from the card is stopped. In accordance with this, processing of the camera proceeds from step #2730 to step #2736. At this time the flag WRTF showing the data transporting to the $E^2$-PROM has been set. Display therafter (all operations of the above-mentioned mode change are assumed to be performed) is changed from the display as shown in FIG. 38(h) to the display as shown in FIG. 38(i).

Reverting to FIG. 35(b), when it is judged in step #CD80 that the data communication is III, serial communication (in this case, the card side is output) is performed in step #CD85, and thereby the IC card function data $CCKb_0$–$CCKb_{14}$ and a signal DISPCF are given to the camera side. Then, whether or not a write flag CWRTF showing the data transporting to the $E^2$-PROM has been set is judged in step #CD90, and if it has not been set, processing proceeds to step #CD63, and waits any interrupt, and if it has been set, the function data $CCKb_3$–$CCKb_{14}$ are written to bits responding to the data content in bits $CMSb_0$–$CMSb_{11}$ of the $E^2$PROM (#CD92), and the write flag CWRTF is reset (#CD95). The processing proceeds to step #CD63, and waits any interrupt.

In the above-mentioned step #CD80, where the data communication is not III, it is assumed to be a sleep signal, and processing is put in the halted state.

Next, description is made for the case of the program card. In this embodiment, the program card provides an effective sport program when a scene of a sport is wanted to be photographed as described above.

Figure 36A:
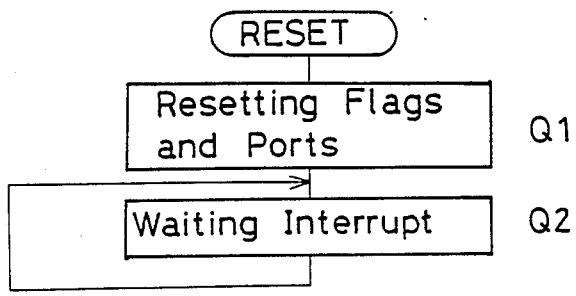
FIGS. 36(a) to 36(c) are flowcharts relating particularly to the program card.
Figure 36B:
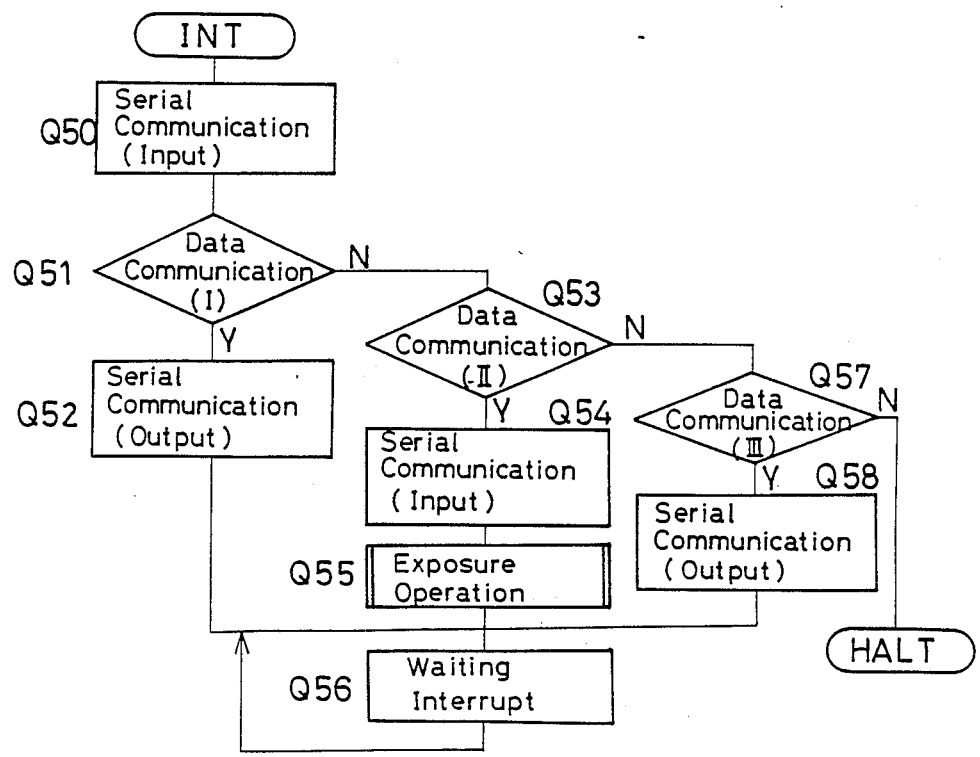

Now, when the IC card CD as the program card is attached to the camera, a signal changing from the "L" level to the "H" level is inputted to a terminal RESET of the micro-computer $\mu C_2$ of the card side and the micro-computer $\mu C_2$ executes a flow of RESET as shown in FIG. 36(a), and resets flags and I/O ports of the micro-computer $\mu C_2$ in step Q1 and waits any interrupt (Q2). When a signal CSBCK is inputted from the camera, an interrupt is applied, and flow INT as shown in FIG. 36(b) is executed, the micro-computer $\mu C_2$ of the IC card performs data communications along the clock signal SCK sent from the camera (Q50). The data at this time is for indicating the kind of communication to the card side from the camera. The micro-computer $\mu C_2$ of the IC card inputs this data and discriminates the kind of communication (Q51). In the case of the data communication I, the micro-computer $\mu C_2$ outputs data showing to the camera side the kind of the card (here, the program card) and data showing respectively that thee Af mode is "continuous" and the photometric zone is "multi-spot" (Q52). Then processing proceeds to step Q56, and waits an interrupt.

Here, this program card presupposes the sport scene, and it is therefore desirable to select the continuous AF which is in forcus all the time to correspond to a quickly moving subject, the multi-spot photometric zone having a wide photometric range for the same reason, and the wide-multi-spot AF zone to focus a moving subject. However, change-over to one-shot AF, single-shot photometric zone, and single-spot distance measuring zone is made possible considering the case where the photographer intends to sharply focus only on the main subject.

Prior to description on an embodiment of a specific flowchart of exposure operation, summary of control of this card is explained.

Figure 37:
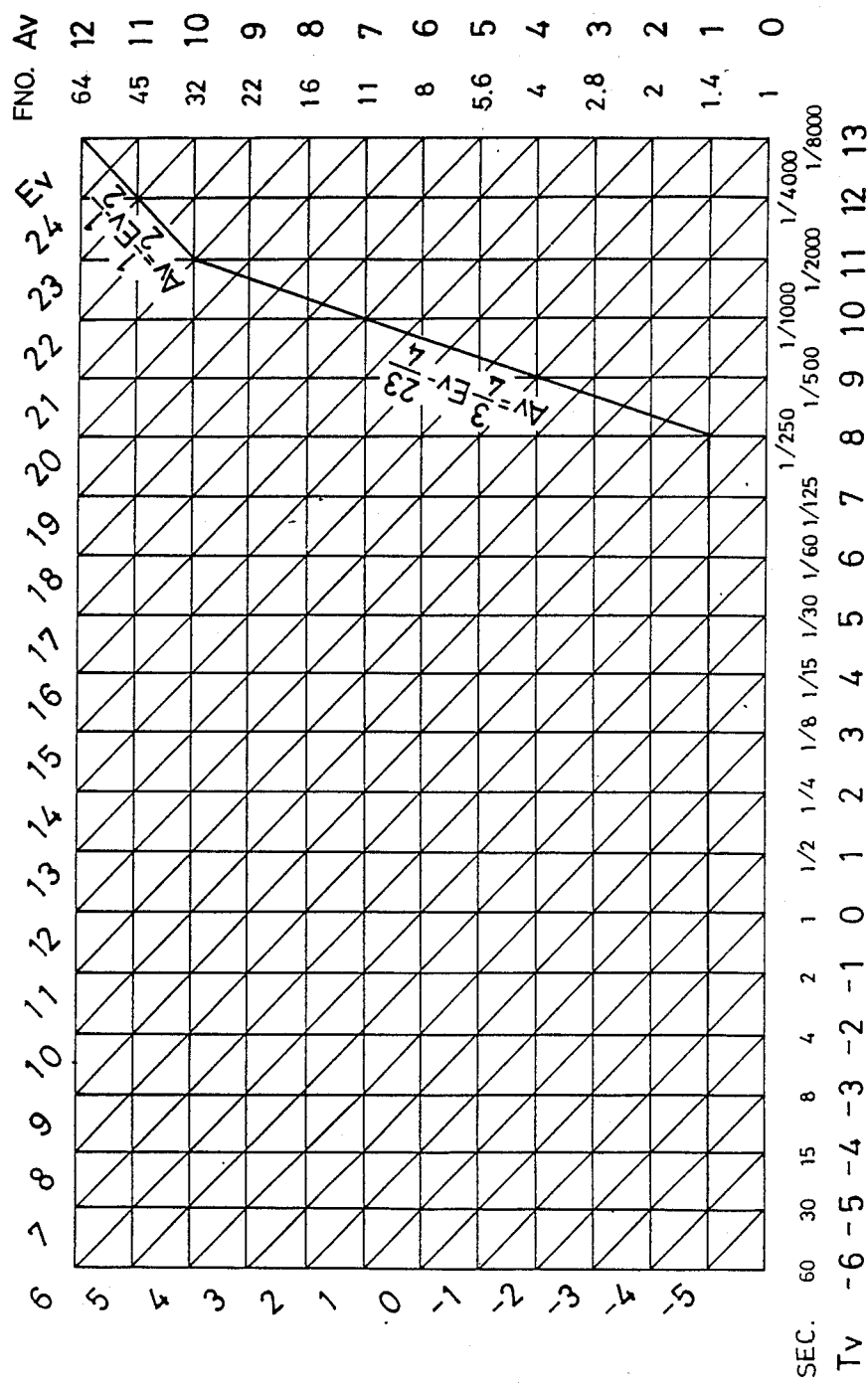
FIG. 37 is a program line diagram relating to the program card.

The card for outdoor sports and athletic meeting
[Content]
A moving subject can be photographed at at comparatively bright place at a high shutter speed without blurring.
[Control]
A program line diagram in FIG. 37 shows the contents of control of the card for outdoor sports and athletic meeting. This control is performed as follows.

(A) The diaphragm aperture value of a lens Av is calculated by the following equations.

$$Av = (3/4) \cdot Ev - 23/4 \quad \text{if } Ev < 21$$
$$Av = (1/2) \cdot Ev - 1/2 \quad \text{if } Ev \geq 21$$

This means that if $Ev < 21$, the diaphragm aperture is opened a little excessively to fasten the shutter speed Tv. Accordingly, calculation of $Av = (\frac{3}{4}) \cdot Ev - 2\frac{3}{4}$ is performed.

In the case of $Ev \geq 21$, the shutter speed Tv is considered to be sufficiently high, and therefore calculation of $Av = (\frac{1}{2}) \cdot Ev - \frac{1}{2}$ is performed to smoothly change both of Av and Tv.

Next, a comparison is taken between the open diaphragm aperture valve Avo and Av. When the calculated value is smaller thant Avo, the diaphragm aperture value cannot be set to that value, therefore being corrected to Avo.

Next, the shutter speed Tv is calculated by the following equations.

$$Tv = Ev - Av \quad \text{if } Av \geq Avo$$
$$Tv = Ev - Avo \quad \text{if } Av < Avo$$

(B) Where the film is a negative film, the shutter speed Tv is corrected to increase the shutter speed Tv.

Because the negative film has a wide latitude, for a high shutter speed, actual exposure is reduced by about 1Ev from the normal exposure.

The reversal film (positive) has a narrow latitude, and therefore no reduction is made.

There is a relationship between the calculated value in (A) and the adjusted value as showing in table below.

| Value of Tv evaluation by (A) | Adjusted value of Tv |
| --- | --- |
| Tv ≧ 9 | Tv' = Tv |
| 8 ≦ Tv < 9 | Tv' = 9 |
| Tv < 8 | Tv' = Tv + 1 |

(C) Others
The above-mentioned controls (A) and (B) are performed when a lens having a focal length of 70 mm or more is attached. The first reason is that in sports photographing, the distance from a subject is considered comparatively long. The second reason is that where the telephotolens is not used, the image magification of the subject becomes small, and the probability of causing blurring by moving the lens to follow the small subject, and therefore no control is substantially required to be performed.

In this control, flash is set to forced OFF, and automatic flashlight emission is not performed. The reason is that this program card purposes photographing at a comparatively bright place, and the distance from the subject is considered comparatively long, and therefore an operation of flashlight conceivably has not so much effect as expected.

Also, in this control, if the switch of flash is turned to forced ON mode, no control is performed. The reason is that in this control, no flashlight emission is performed for the above-mentioned reason, and therefore performing control in the forced-ON state is against the photographer's will of performing flashlight emission.

Figure 36C:
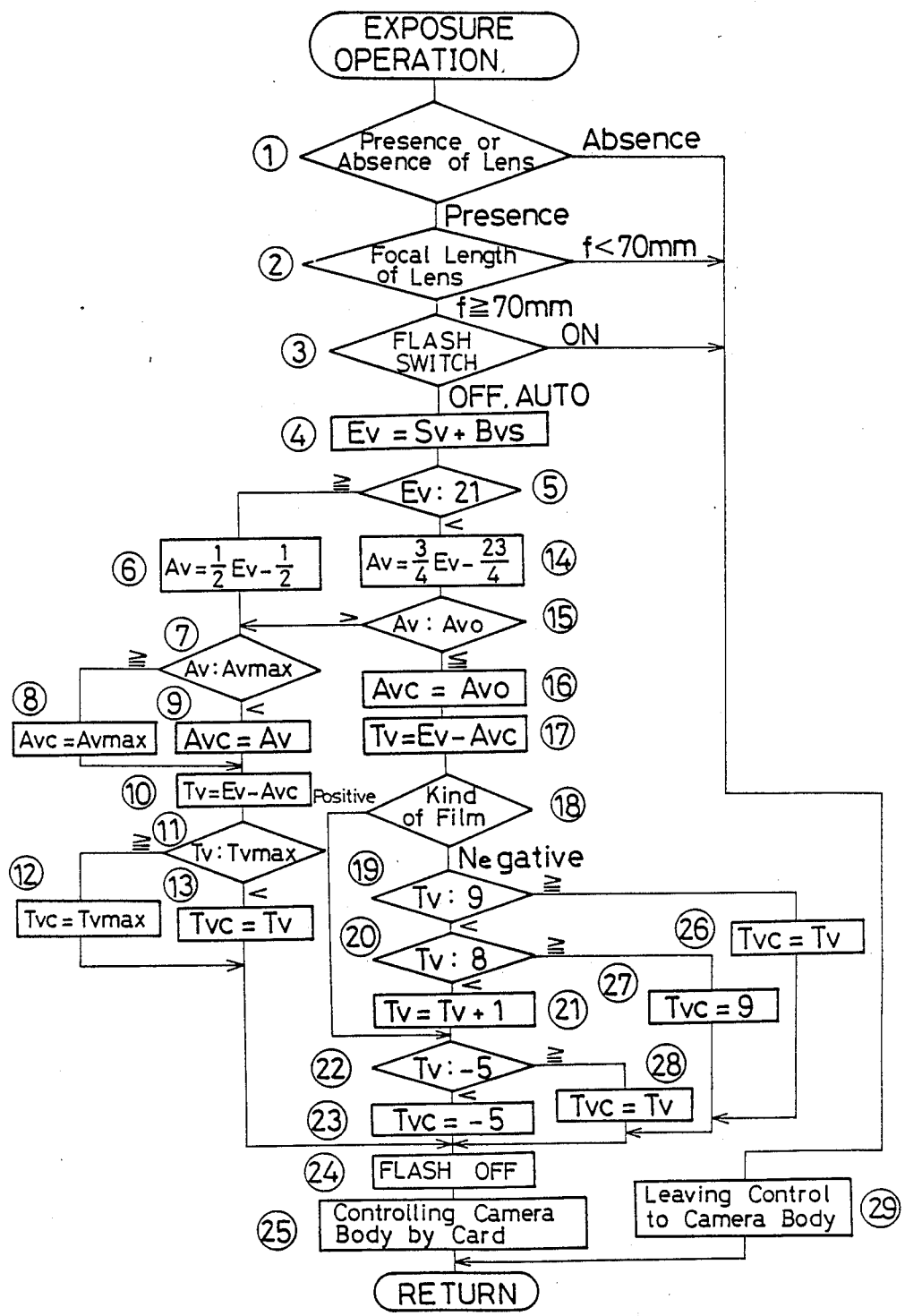

Next, a flowchart of exposure operation of the above-mentioned program card is shown in FIG. 36(c) to be explained. In this FIG. 36(c), first, in step ①, the micro-computer $\mu C_2$ of the program card judges from the inputted data whether or not the lens exists. Here, where the lens has not been attached to the camera body, lens data of the open diaphragm aperture value Avo and the like do not come to the IC card CD. Accordingly, no exposure calculation can be performed, and therefore processing proceeds to step ㉙, and exposure control is left to the camera side. When the lens has been attached, processing proceeds to step ② to find out the focal length of the lens from the inputted data. In the case of the lens having a focal length of less than 70 mm, control of the card is not performed for the above-described reason, and therefore in this case also, processing jumps to step ㉙, and leaves the exposure control to the camera. In the case of the lens having a focal length of 70 mm or more, in step ③, the state of forced flashligh emission switch is found out from the inputted data. When the forced flashlight emission switch is in the ON state, the card does not perform control for the above-described reason, and therefore processing jumps to step ㉙.

On the other hand, when the above-mentioned switch is in the OFF state, in the next step ④, the exposure value Ev is calculated by adding the spot luminance Bvs and the film speed Sv of the inputted data. Then, the content of control is changed depending on the exposure value Ev. For the above-described reason, if Ev<21, Av is evaluated by the equation Av=($\frac{3}{4}$)·Ev−2$\frac{3}{4}$ in step ⑭. If Ev≧21, Av is evaluated by the equation Av=($\frac{1}{2}$); Ev−$\frac{1}{2}$ in step ⑥.

A comparison is taken between Av calcuated in step ⑥ and the maximum diaphragm aperture value Avmax in the next step ⑦. Then if Av≧Avmax, the less cannot be stopped down any more, and therefore the diaphragm aperture value Avc for the camera body control is set as Avmax in step ⑧.

On the other hand, if Av<Avmax, Avc=Av is set in step ⑨. After the diaphragm aperture value Avc has been calculated in such a manner, in step ⑩, the shutter speed Tv is calculated based on an equation Tv=Ev−Avc.

In the next step ⑪, a comparison is taken between this shutter speed Tv and the highest shutter speed Tvmax of the camera. Here, if Tv≧Tvmax, processing proceeds to step ⑫, and the shutter speed Tvc for the camera body control is set as Tvmax. If Tv<Tvmax, processing proceeds to step ⑬, and Tvc=Tv is set.

If Ev<21 in the above-mentioned step ⑤, Av is calculated by the equation shown in step ⑭, and thereafter processing proceeds to step ⑮. In step ⑮, a comparison is taken between Av calculated in step ⑭ and the open diaphragm aperture value Avo. Here, if Av>Avo, processing goes to the above-mentioned step ⑦ to take a comparison between Av and Avmax. If Av≦Avo, the diaphragm aperture value of the lens cannot be opened any more, and therefore, processing proceeds to step ⑯, and the diaphragm aperture value Avc is set as Avo. Then, in step ⑰, the shutter speed Tv is calculated by the equation Tv=Ev−Avc.

For the above-described reason, if the film is a negative film, correction of the shutter speed Tv has to be performed, and therefore the kind of the film is discriminated in step ⑱. As a result, when the film is a reversal (positive) film, processing proceeds to step ㉒.

On the other hand, in the case of the negative film, processing proceeds to step ⑲, and judges whether or not the shutter speed Tv is smaller than 9. Then, if Tv ≧9, the shutter speed Tvc is set as Tv in step ㉖. If Tv<9, processing proceeds to step ⑳, and judges whether or not the shutter speed Tv is 8 or more.

Here, if Tv≧8, Tvc=9 is set (step ㉖), and if Tv<8, a correction of Tv=Tv+1 is made, and processing proceeds to the next step ㉒. In step ㉒, a comparison for limiting the lowest value to Tv=−5 (30 seconds) is taken to prevent shutter speed Tv from becoming extremely slow.

Here, if Tv<−5, Tvc=−5 is set (step ㉓), and if Tv ≧−5, Tvc=Tv is set (step ㉙).

For the above-described reason, control of flashlight is not performed, and therefore, in step ㉔, bits putting flash in the OFF state are set. Thereafter processing proceeds to step ㉕, and the values calculated by the program card are used for controlling the camera, and processing returns.

On completing the flow of these exposure operations, processing returns to the flow of FIG. 36(b), and waits any interrupt.

Here, when any interrupt is applied from the camera side, and at this time, if it is the data communication III, data on whether or not the camera control by the data of the operated diaphragm aperture value CAvc and shutter speed CTvc and data on whether or not the camera control by the card is performed are prepared together with data of non-forced full light emission (Fb9=0), inhibit of forced light emission (Fb10=0) and reset of the adjustment of flash light CFΔEv. These data are outputted to the camera side by serial communication. In addition, except for this communication, the microcomputer $\mu C_2$ of the card stops communicating.

In the above-described embodiment, IC card, as an accessory, is suggested to construct a system adding and changing the functions of the camera body in associated with the camera body. However, the whole system may be constructed with the camera body and the selecting switches thereof irrespective of the accessory.

The following Table 1 through Table 10 are tables of the switches, the functions thereof, various data which are cited in the description on above-described embodiment.

Although the present invention has been fully decribed by way of example with reference to the accompanying drawings, it is to be noted here that various changes and modifications will be apparent to those skilled in the art. Therefore, unless otherwise such changes and modifications depart from the scope of the present invention, they should be construed as being included therein.

TABLE 1

| Symbols of switches | Switches | Functions |
|---|---|---|
| $S_{RE}$ | Battery | When battery is attached, resets |

TABLE 1-continued

| Symbols of switches | Switches | Functions | | |
|---|---|---|---|---|
| | attachment switch | the micro-computer μC. | | |
| $S_{EM}$ | Exposure mode changing switch | Changes exposure mode (P,A,M,S) in cooperation with up switch Sup or down switch Sdn. | | |
| $S_{FM}$ | Function changing switch | Changes function in cooperation with up switch Sup or down switch Sdn. | | |
| $S_{CD}$ | Card function enable/disable switch | Enables/disables card function when card is attached. | | |
| $S_{CDS}$ | Card data setting switch | Sets/resets data setting mode performing mode change or data setting when card is attached. | | |
| $S_0$ | Photometric switch | Starts photometry, display and the like (excluding AF). | | |
| $S_1$ | AF switch | Starts AF. | | |
| $S_2$ | Release switch | Starts photographing operation. | | |
| $S_{WD}$ | One-frame switch | ON when one frame of film is wound up. | | |
| $S_{AEL}$ | AE locking switch | Performs AE lock. | | |
| $S_{AF/M}$ | Focus condition adjusting mode changing-over switch | Changes-over AF and manual focus condition adjustment. | | |
| $S_{SE}$ | Change data selecting switch | Selects data to be changed. | | |
| $S_{FUN}$ | Change data enable/disable changing-over switch | Changes-over enable/disable of change data where mode setting card is attached, and data setting mode is set. | | |
| $S_{EXP}$ | Exposure mode combination selecting switch | Selects combination of exposure mode where mode setting card is attached, and data setting mode is set. | | |
| $S_{FLM}$ | Film detecting switch | Detects presence or absence of film. | | |
| $S_{RC}$ | Rear lid close detecting switch | Detects close of rear lid. | | |
| $S_{RW}$ | Rewinding switch | Starts rewinding. | | |
| $S_{CR}$ | IC card attachment switch | OFF when IC card is just attached. Applies reset to micro-computer of IC card. | | |
| X | X contact | ON after completing first-curtain running of shutter. Operates electric flash apparatus. | | |
| $Sup_1$ | Up switch 1 | In M mode | Up of diaphragm aperture value | |
| | | Except in M mode | Change-over of changing mode, Up function | |
| $Sup_2$ | Up switch 2 | In M mode | Up of shutter speed | |
| | | Except in M mode | Change-over of changing mode, Up function | |
| $Sdn_1$ | Down switch 1 | In M mode | Down of diaphragm aperture value | |
| | | Except in M mode | Change-over of changing mode, Down function | |
| $Sdn_2$ | Down switch 2 | In M mode | Down of shutter speed | |
| | | Except in M mode | Change-over of change mode, Down function | |

TABLE 2

| Selected Number | Film counter Count-up: O Count-down: X | Rewinding of film Auto-return: O Non-auto-return: X | Film leading end is, rewinded completely: O left-out of patrone: X | Blurring warning buzzer Operation: O Non-operation: X |
|---|---|---|---|---|
| 0 | O | O | O | O |
| 1 | O | O | O | X |
| 2 | O | O | X | O |
| 3 | O | O | X | X |
| 4 | O | X | O | O |
| 5 | O | X | O | X |
| 6 | O | X | X | O |
| 7 | O | X | X | X |
| 8 | X | O | O | O |
| 9 | X | O | O | X |
| 10 | X | O | X | O |
| 11 | X | O | X | X |
| 12 | X | X | O | O |
| 13 | X | X | O | X |
| 14 | X | X | X | O |
| 15 | X | X | X | X |

TABLE 3

Function Data ($Fb_n$) RAM

| Bits | | Contents |
|---|---|---|
| $Fb_0$ | $b_0b_1 = 00$ | P mode |
| | $b_0b_1 = 01$ | A mode |
| $Fb_1$ | $b_0b_1 = 10$ | M mode |
| | $b_0b_1 = 11$ | S mode |
| $Fb_2$ | $b_2 = 0$ | Multi-spot mode |
| | $b_2 = 1$ | Spot mode |
| $Fb_3$ | $b_3 = 0$ | One-shot mode |
| | $b_3 = 1$ | Continuous-shot mode |
| $Fb_4$ | $b_4b_5 = 0,0$ | No adjustment |
| $Fb_5$ | $b_4b_5 = 0,1$ | + adjustment |
| | $b_4b_5 = 1,0$ | − adjustment |
| $Fb_6$ | $b_6b_7 = 0,0$ | No H/S |
| $Fb_7$ | $b_6b_7 = 0,1$ | Highlight (H) |
| | $b_6b_7 = 1,0$ | Shadow (S) |
| $Fb_8$ | $b_8 = 0$ | One-shot AF |
| | $b_8 = 1$ | Continuous AF |
| $Fb_9$ | $b_9 = 0$ | Non-forced Full light emission |
| | $b_9 = 1$ | Forced Full light emission |
| $Fb_{10}$ | $b_{10} = 0$ | Non-forced light emission |
| | $b_{11} = 1$ | Forced light emission |
| $Fb_{12}$ | $b_{12} = 0$ | Multi-spot photometry (Auto) |
| | $b_{12} = 1$ | Spot Photometry |

TABLE 4

Mode Setting Data ($MSb_n$) $E^2$PROM

| Bits | | Contents |
|---|---|---|
| $MSb_0$ | $b_0 = 0$ | H/S mode NO |
| | $b_0 = 1$ | H/S mode EXIST |
| $MSb_1$ | $b_1 = 0$ | +/− mode NO |
| | $b_1 = 1$ | +/− mode EXIST |
| $MSb_2$ | $b_2 = 0$ | S/C mode NO |
| | $b_2 = 1$ | S/C mode EXIST |
| $MSb_3$ | $b_3 = 0$ | S/A mode NO |
| | $b_3 = 1$ | S/A mode EXIST |
| $MSb_4$ | $b_4 = 0$ | Mode setting unfinished |
| | $b_4 = 1$ | Mode setting finished |
| $MSb_5$ | $b_5 = 0$ | AE-locked during depression of the switch |
| | $b_5 = 1$ | 10-seconds hold mode |
| $MSb_6$ | 000 = PASM, 001 = PAM, 010 = PAS, | |
| $MSb_7$ | 011 = PSM, 100 = PA, 101 = PM, | |
| $MSb_8$ | 110 = PS, 111 = P | |
| $MSb_9$ | Number consisting of four bits of $b_9$–$b_{12}$ | |
| ∫ | corresponds to Selected No. in Table 2. | |
| $MSb_{12}$ | Example 0000 = No. 0 | |
| $MSb_{13}$ | Quantity of film frames | |
| ∫ | | |
| $MSb_{18}$ | From 0 to 63 | |

TABLE 4-continued

| Mode Setting Data (MSbn) E²PROM | |
|---|---|
| Bits | Contents |
| $MSb_{19}$ | Film sensitivity Iso 50~6400 |
| $\int$ | |
| $MSb_{24}$ | (Use from $00_H$ to $15_H$) ⅓Eo step |

TABLE 5

| Change Data ($CDb_n$) (RAM) | | | | |
|---|---|---|---|---|
| Bits | Contents | | | |
| $CDb_0$ | 000 | H/S change, | 001 | +/− change |
| $CDb_1$ | 010 | S/C change, | 011 | S/A change |
| $CDb_2$ | 100 | No change | | |

TABLE 6

| Card Communication Output Data ($CSb_n$) | | |
|---|---|---|
| Bits | | Contents |
| $CSb_0$ | $b_0, b_1 = 0,0$ | Serial communication (I) |
| $CSb_1$ | $b_0, b_1 = 0,1$ | Serial communication (II) |
| | $b_0, b_1 = 1,0$ | Serial communication (III) |
| | $b_0, b_1 = 1,1$ | Sleep sign |

TABLE 7

| Card Kind Data ($CKb_n$) RAM | | |
|---|---|---|
| Bits | | Contents |
| $CKb_0$ | $b_0 = 0$ | NO Card |
| | $b_0 = 1$ | Card EXIST |
| $CKb_1 \sim$ | $b_1 \sim b_6 = 00_H$ | Mode setting card |
| $CKb_6$ | $b_1 \sim b_6 = 01_H$ | Program card |
| $CKb_7$ | $b_7 = 0$ | Display by card is not performed. |
| | $b_7 = 1$ | Display by card is preformed. |
| $CKb_8$ | $b_8 = 0$ | H/S mode NO |
| | $b_8 = 1$ | H/S mode EXIST |
| $CKb_9$ | $b_9 = 0$ | +/− mode NO |
| | $b_9 = 1$ | +/− mode EXIST |
| $CKb_{10}$ | $b_{10} = 0$ | S/C mode NO |
| | $b_{10} = 1$ | S/C mode EXIST |
| $CKb_{11}$ | $b_{11} = 0$ | S/A mode NO |
| | $b_{11} = 1$ | S/A mode EXIST |
| $CKb_{12} \sim$ | 000 = PASM, 001 = PAM, 010 = PAS, | |
| $CKb_{14}$ | 011 = PSM, 100 = PA, 101 = PM, | |
| | 110 = PS, 111 = P | |
| $CKb_{15} \sim$ | Number consisting of four bits of $b_{15} \sim b_{18}$ | |
| $CKb_{18}$ | corresponds to selected No. in Table 2. | |
| $CKb_{19}$ | $b_{19} = 0$ | While pushing, AE-lock is performed. |
| | $b_{19} = 1$ | Whenever pushing, changes between AE-lock and normal AE. |
| $CKb_{20} \sim$ | 0,0,0 | H/S change, 0,0,1 +/− change |
| $CKb_{22}$ | 0,1,0 | S/C change, 0,1,1 S/A change |
| | 1,0,0 | No change |
| $CKb_{23}$ | $b_{23} = 0$ | Control by card is not performed. |
| | $b_{23} = 1$ | Control by card is performed. |
| $CKb_{24} \sim$ | Tvc data | |
| $CKb_{31}$ | | |
| $CKb_{32} \sim$ | Avc data | |
| $CKb_{39}$ | | |
| $CKb_{40}$ | 0,0 | Area selecting for AF is not forced. |
| $CKb_{41}$ | 1,0 | Multi-spot AF is forced. |
| | 1,1 | Spot AF is forced. |
| $CKb_{42}$ | 0,0 | AF mode is not forced. |
| $CKb_{43}$ | 1,0 | Continuous AF is forced. |
| | 1,1 | One-shot AF is forced. |
| $CKb_{44}$ | 0,0 | Photometric mode is not forced. |
| $CKb_{45}$ | 1,0 | Multi-spot photometry is forced. |
| | 1,1 | Spot photomety is forced. |
| $CKb_{46}$ | $b_{46} = 0$ | Emission of flashlight is forced. |
| | $b_{46} = 1$ | Emission of flashlight is not forced. |
| $CKb_{47}$ | $b_{47} = 0$ | Full emission of flashlight is not forced. |
| | $b_{47} = 1$ | Full emission of flashlight is forced. |

TABLE 8

| Setting Data ($CMSb_n$) E²PROM | | |
|---|---|---|
| Bits | | Contents |
| $CMSb_0$ | $b_0 = 0$ | H/S mode NO |
| | $b_0 = 1$ | H/S mode EXIST |
| $CMSb_1$ | $b_1 = 0$ | +/− mode NO |
| | $b_1 = 1$ | +/− mode EXIST |
| $CMSb_2$ | $b_2 = 0$ | S/C mode NO |
| | $b_2 = 1$ | S/C mode EXIST |
| $CMSb_3$ | $b_3 = 0$ | S/A mode NO |
| | $b_3 = 1$ | S/A mode EXIST |
| $CMSb_4$ | $b_4 = 0$ | AE-locked during depression of the switch |
| | $b_4 = 1$ | 10-seconds hole mode |
| $CMSb_5 \sim$ | 000 = PASM, 001 = PAM, 010 = PAS, | |
| $CMSb_7$ | 011 = PSM, 100 = PA, 101 = PM, | |
| | 110 = PS, 111 = P | |
| $CMSb_8 \sim$ | Number consisting of four bits of $b_8-b_{11}$ | |
| $CMSb_{11}$ | corresponds to Selected No. in Table 2. Example 0000 = No. 0 | |

TABLE 9

| IC card, Function Data | | |
|---|---|---|
| Bits | | Contents |
| $CCKb_0 \sim$ | 0,0,0 | H/S change, 0,0,1 +/− change, |
| $CCKb_2$ | 0,1,0 | S/C change, 0,1,1 S/A change, |
| | 1,0,0 | No change |
| $CCKb_3$ | $b_3 = 0$ | H/S mode NO |
| | $b_3 = 1$ | H/S mode EXIST |
| $CCKb_4$ | $b_4 = 0$ | +/− mode NO |
| | $b_4 = 1$ | +/− mode EXIST |
| $CCKb_5$ | $b_5 = 0$ | S/C mode NO |
| | $b_5 = 1$ | S/C mode EXIST |
| $CCKb_6$ | $b_6 = 0$ | S/A mode NO |
| | $b_6 = 1$ | S/A mode EXIST |
| $CCKb_7 \sim$ | 0,0,0 = PASM, 0,0,1 = PAM, 0,1,0 = PAS, | |
| $CCKb_9$ | 0,1,1 = PSM, 1,0,0 = PA, 1,0,1 = PM, | |
| | 1,1,0 = PS, 1,1,1 = P | |
| $CCKb_{10} \sim$ | Number consisting of four bits of $b_{10}-b_{13}$ | |
| $CCKb_{13}$ | corresponds to Selected NO. in Table 2. | |
| $CCKb_{14}$ | $b_{14} = 0$ | AE-locked during depression of the switch |
| | $b_{14} = 1$ | Whenever depressing, changes between AE-lock and normal AE. |

TABLE 10

| Flags | | Contents |
|---|---|---|
| BATF | F = 1 | Flow of initialization of battery attachment has been passed through once |
| | F = 0 | After initialization of battery attachment, switch has been operated once or predetermined processing has been finished without performing anything. |
| OPF | F = 1 | Where any of switches $S_{EM}, S_{FM}, S_{CD}, S_{CDS}, S_O$ is in ON state |
| | F = 0 | Where all of the above-mentioned five switches are in OFF state |
| AELF | F = 1 | AE lock function is turned on ON. |
| | F = 0 | AE lock function is turned to OFF. |
| SETF | F = 1 | Where IC card is attached, and data setting mode is set |
| | F = 0 | Where IC card is attached, and data setting mode is not set |
| AFNF | F = 1 | Where AF can not be performed |
| | F = 0 | Where AF can be performed |
| AF1F | F = 1 | Quantity of DF of first island is set as quantity of DF for lens driving. |
| | F = 0 | Quantity of DF of first island is not set as quantity of DF for lens driving. |
| AF2F | F = 1 | Quantity of DF of second island is set as quantity of DF for lens driving. |
| | F = 0 | Quantity of DF of second island is not set as quantity of DF for lens driving. |
| AF3F | F = 1 | Quantity of DF of third island is set as quantity of DF for lens driving. |
| | F = 0 | Quantity of DF of third island is not |

TABLE 10-continued

| Flags | | Contents |
|---|---|---|
| | | set as quantity of DF for lens driving. |
| AFEF | F = 1 | Focused state |
| | F = 0 | Non-focused state |
| CDF | F = 1 | When card function enable/disable switch $S_{CD}$ is in ON state, flow of $S_{CD}ON$ has been executed once. |
| | F = 0 | When CDF = 1, flow of $S_{CD}OFF$ has been executed. |
| CDFNF | F = 1 | Card function is enabled. |
| | F = 0 | Card function is disabled. |
| CDSF | F = 1 | Card data setting switch $S_{CDS}$ has been operated and flow of $S_{CD}ON$ has been executed once, but flow of $S_{CD}OFF$ has not been executed. |
| | F = 0 | In data setting mode, flow of $S_{CD}OFF$ has been executed. |
| AEONF | F = 1 | AE locking switch $S_{AEL}$ has been operated, and flow of step #1705 and subsequent steps has been executed once. |
| | F = 0 | When AE locking switch is turned to OFF |
| CDIF | F = 1 | Steps from #2710 to #2720 have been passed through once. |
| | F = 0 | Steps from #2710 to #2720 have never been passed through. |
| DISPIF | F = 1 | When card function is added (by $S_{CD}ON$), display is performed for a certain time. |
| | F = 0 | The above-mentioned display for a certain time is not performed. |
| WRTF | F = 1 | Data is written to $E^2PROM$. |
| | F = 0 | Data is not written to $E^2PROM$. |
| CHGF | F = 1 | Changeable function mode NO |
| | F = 0 | Changeable function mode EXIST |

What is claimed is:

1. Apparatus for winding and rewinding a roll of film loaded in cassette, comprising:
   means for winding the film frame by flame;
   means for detecting the completion of exposure of the roll of film which is wound by the winding means;
   means for rewinding the film automatically in response to the detection of the detecting means;
   first selecting means, including a first selecting member which is operable manually, for selecting in response to the operation of the first selecting member one of a first mode in which the operation of the rewinding means is permitted and a second mode in which the operation of the rewinding means is inhibited irrespective of the detection of the detecting means; and
   means for controlling the rewinding means in accordance with the mode selected by the first selecting means.

2. The apparatus of claim 1, further comprising an EEPROM which stores a first mode signal indicating said mode selected by the first selecting means.

3. The apparatus of claim 1, further comprising second selecting means for alternatively selecting either of a third mode in which the rewinding operation of the rewinding means is interrupted to leave the leading end of the film outside the cassette and a fourth mode in which the rewinding operation of the rewinding means is interrupted after the whole film is rewound into the cassette; and
   means for controlling the interruption for the operation of the rewinding means in accordance with the mode selected by the second selecting means.

4. The apparatus of claim 3, futher comprising an EEPROM which stores a first mode signal indicating said mode selected by the first selecting means.

5. The apparatus of claim 4, wherein said EEPROM further stores a second mode signal indicating said mode selected by the second selecting means.

6. The apparatus of claim 1, further comprising means, including a forcing member which is operable manually, for forcibly starting the rewinding operation of the rewinding means in response to the operation of the forcing member irrespective of said detection of the detecting means.

7. The apparatus of claim 6, further comprising second selecting means for alternatively selecting either of a third mode in which the rewinding operation of the rewinding means is interrupted to leave the leading end of the film outside the cassette and a fourth mode in which the rewinding operation of the rewinding means is interrupted after the whole film is rewound into the cassette; and
   means for controlling the interruption for the operation of the rewinding means in accordance with the mode selected by the second selecting means.

8. The apparatus of claim 7, further comprising an EEPROM which stores a first mode signal indicating said mode selected by the first selecting means.

9. The apparatus of claim 8, wherein said EEPROM further stores a second mode signal indicating said mode selected by the second selecting means.

10. The apparatus of claim 7, wherein the selection of said second selecting means is inhibited when said second mode is selected by said first selecting means.

* * * * *